United States Patent
Stratan et al.

(10) Patent No.: US 12,475,262 B2
(45) Date of Patent: Nov. 18, 2025

(54) SECURE PROVISIONING WITH HARDWARE VERIFICATION

(71) Applicant: Google LLC, Mountain View, CA (US)

(72) Inventors: Andrei Tudor Stratan, San Jose, CA (US); Randall R. Spangler, San Jose, CA (US)

(73) Assignee: Google LLC, Mountain View, CA (US)

( * ) Notice: Subject to any disclaimer, the term of this patent is extended or adjusted under 35 U.S.C. 154(b) by 260 days.

(21) Appl. No.: 18/245,678

(22) PCT Filed: Sep. 22, 2020

(86) PCT No.: PCT/US2020/052002
§ 371 (c)(1),
(2) Date: Mar. 16, 2023

(87) PCT Pub. No.: WO2022/066142
PCT Pub. Date: Mar. 31, 2022

(65) Prior Publication Data
US 2023/0342501 A1    Oct. 26, 2023

(51) Int. Cl.
*G06F 21/72*    (2013.01)

(52) U.S. Cl.
CPC ...... *G06F 21/72* (2013.01); *G06F 2221/2139* (2013.01)

(58) Field of Classification Search
CPC ........... G06F 21/70; G06F 21/72; G06F 21/73
See application file for complete search history.

(56) References Cited

U.S. PATENT DOCUMENTS 8,290,150 B2 * 10/2012 Erhart ................... H04L 9/3249
713/186
8,386,801 B2   2/2013 Devadas et al.
(Continued)

FOREIGN PATENT DOCUMENTS

FR            3037167        12/2016
WO         2022066142         3/2022

OTHER PUBLICATIONS

"International Preliminary Report on Patentability", Application No. PCT/US2020/052002, Mar. 28, 2023, 11 pages.

(Continued)

*Primary Examiner* — Daniel B Potratz
(74) *Attorney, Agent, or Firm* — Colby Nipper PLLC

(57) ABSTRACT

The present disclosure describes various aspects of secure provisioning with hardware verification. In some aspects, sensitive data are provisioned to an integrated circuit (IC) device through a provisioning process. Provisioning data for the IC device are divided into a plurality of fragments, and each fragment is encrypted in one of a plurality of cryptographic keys. Corresponding cryptographic keys are generated at the IC device. The encrypted fragments are transferred to the IC device in respective secure transfer operations, each including sending a seed value to the IC device, validating integrity data configured to characterize integrated circuitry within a portion of the IC device specified by the seed value, and transferring the encrypted fragment to the IC device in response to validating the integrity data. In response to completing the secure transfer operation, the IC device may reconstruct the provisioning data from the encrypted fragments and corresponding cryptographic keys.

27 Claims, 18 Drawing Sheets

(56) References Cited

U.S. PATENT DOCUMENTS

| | | |
|---|---|---|
| 9,203,617 B2 | 12/2015 | Ducharme et al. |
| 10,110,380 B2 | 10/2018 | Berg et al. |
| 12,339,974 B2 * | 6/2025 | Moran .................. G06F 21/602 |
| 2014/0064480 A1 | 3/2014 | Hartley et al. |
| 2020/0220713 A1 * | 7/2020 | Li ............................. H04L 9/14 |
| 2020/0374275 A1 * | 11/2020 | Chan ........................ H04L 9/14 |

OTHER PUBLICATIONS

"International Search Report and Written Opinion", Application No. PCT/US2020/052002, May 18, 2021, 15 pages.

\* cited by examiner

SECURE PROVISIONING WITH HARDWARE VERIFICATION

RELATED APPLICATION(S)

This application is a national stage entry of International Application No. PCT/US2020/052002, filed Sep. 22, 2020, the disclosure of which is incorporated herein by reference in its entirety.

BACKGROUND

An integrated circuit (IC) device may use cryptographic material to implement security and/or encryption services such as authentication, encryption, and decryption. Cryptographic material and other sensitive information may be provisioned to the IC device in a secure process. Managing trust and security issues involved in IC device provisioning, however, can be challenging, particularly in situations where sensitive data are provisioned to IC devices produced by multiple different manufacturers and/or partners. Some provisioning processes rely on those involved in the design and manufacture of the IC devices not to interfere with or intercept sensitive provisioning data. These approaches, however, may be open to compromise in situations where this trust is misplaced. For example, an IC manufacturer could include malicious circuitry within an IC capable of exposing sensitive provisioning data, such as master keys. Fixed, hardware-based secrets built into IC devices can reduce the degree of trust placed in IC manufacturers. These approaches, however, may be vulnerable to leaks and reverse engineering. Moreover, since the same fixed, hardware-based secrets are often shared by large numbers of IC devices, a single leak has the potential to adversely impact, or even compromise, many IC devices.

SUMMARY

This document describes techniques and systems for secure provisioning with hardware verification. The techniques and systems include transferring provisioning data to an IC device in a plurality of secure transfer operations, each involving the transfer of a respective fragment of the provisioning data in response to validation of a specified portion of the integrated circuitry of the IC device. In some aspects, each fragment is encrypted by one of a plurality of cryptographic keys. The disclosed techniques and systems may, therefore, protect sensitive provisioning data from unauthorized access without the need for fixed, hardware-based secrets.

For example, a method for implementing a provisioning process with an IC device is described. Aspects of the described provisioning process include transferring provisioning data to the IC device. The provisioning data may be divided into a plurality of fragments. The provisioning process may include transferring fragments of the provisioning data to the IC device, each fragment encrypted by a respective cryptographic key of a plurality of cryptographic keys. Transferring a fragment of the provisioning data to the IC device may include sending a seed value associated with the fragment to the IC device, validating integrity data returned from the IC device responsive to the seed value, encrypting the fragment with a cryptographic key generated for the fragment in response to validating the integrity data, and sending the encrypted fragment to the IC device. The IC device may be configured to write the encrypted fragment and corresponding cryptographic key into an internal memory of the IC device. The integrity data may be configured to characterize a portion of the integrated circuitry of the IC device specified by the seed value. Accordingly, each fragment of the provisioning data may be transferred responsive to validating the on-chip RTL implementation of a respective portion of the IC device. The IC device can be configured to reconstruct the provisioning data from the plurality of encrypted fragments and corresponding cryptographic keys stored within the internal memory. The reconstructed provisioning data may be transferred to secure non-volatile storage of the IC device.

This document also describes computer-readable media having instructions for performing the above-summarized method and other methods set forth herein, as well as systems, apparatus, and means for performing these methods.

This summary is provided to introduce simplified concepts for secure provisioning with hardware verification, which are further described below in the Detailed Description and Drawings. This summary is not intended to identify essential features of the claimed subject matter, nor is it intended for use in determining the scope of the claimed subject matter.

BRIEF DESCRIPTION OF THE DRAWINGS

This disclosure describes apparatuses of and techniques for secure provisioning with reference to the following drawings. The use of same or similar reference numbers throughout the description and the figures may indicate like features or components:

FIG. 1-2 illustrates another example operating environment that includes an apparatus capable of implementing aspects of secure provisioning with hardware verification as disclosed herein;

FIG. 2-1 is a sequence diagram illustrating an example procedure for secure provisioning with hardware verification;

FIG. 2-2 is a sequence diagram illustrating an example of a secure transfer operation with hardware verification;

FIG. 3-1 illustrates an example of a system for secure provisioning with hardware verification;

FIG. 3-2 illustrates aspects of an example of an initial secure transfer operation of a provisioning process;

FIG. 3-3 illustrates aspects of another secure transfer operation of a provisioning process;

FIG. 3-4 illustrates aspects of an example of a secure transfer operation resulting in a validation failure;

FIG. 3-5 illustrates aspects of an example of a last secure transfer operation of a provisioning process;

FIG. 3-6 illustrates additional aspects of an example of secure provisioning with hardware verification;

FIG. 4 illustrates one example of a system for secure provisioning with hardware verification;

FIG. 5 illustrates another example of a system for secure provisioning with hardware verification;

FIG. 6 illustrates one example of an IC device that can be provisioned through aspects of the disclosed provisioning process;

FIG. 9-1 illustrates yet another example flow diagram depicting operations for secure provisioning with hardware verification;

FIG. 9-2 illustrates an example flow diagram depicting operations for secure provisioning with hardware verification;

FIG. 9-3 illustrates another example flow diagram depicting operations for secure provisioning with hardware verification;

DETAILED DESCRIPTION

Figure 1:
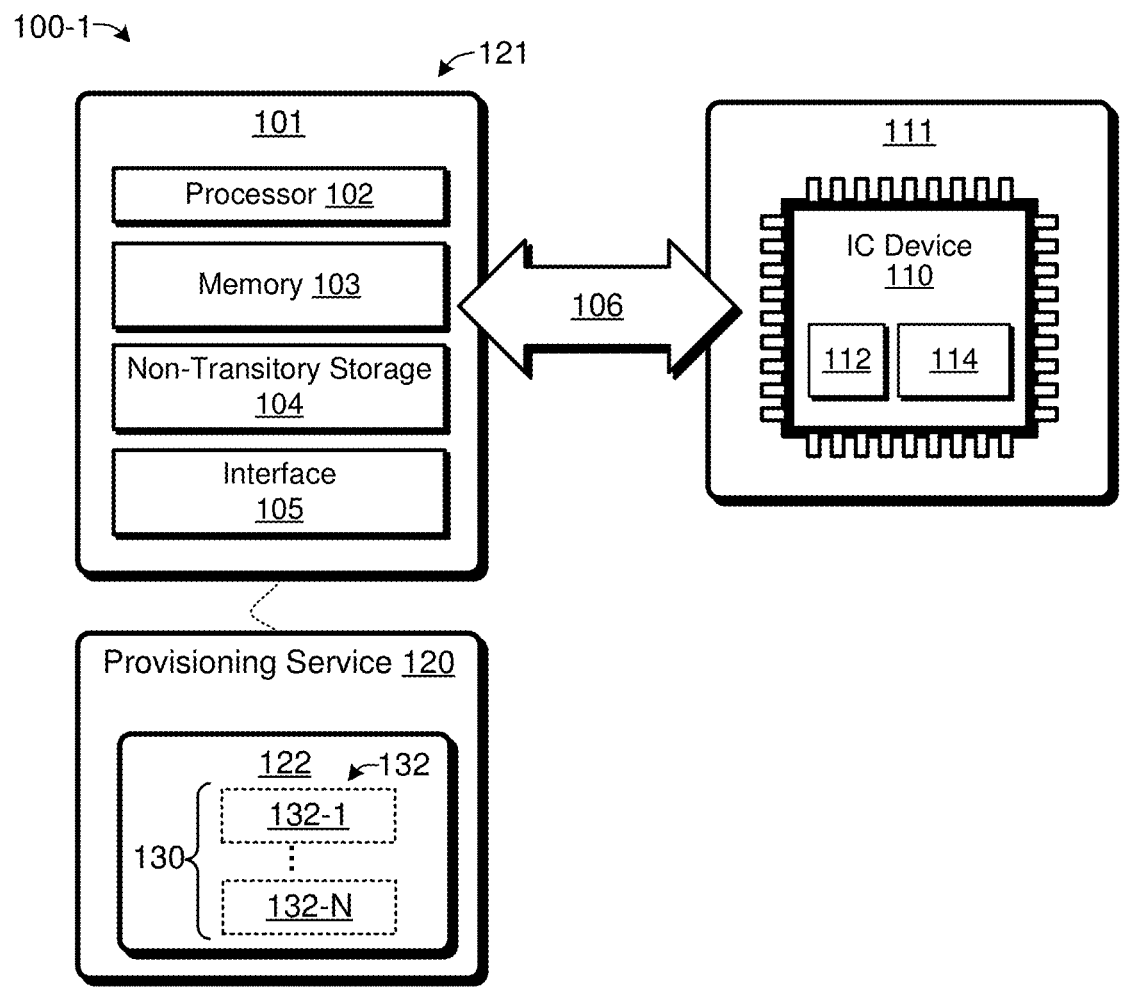
FIG. 1-1 illustrates an example operating environment that includes an apparatus capable of implementing aspects of secure provisioning with hardware verification as disclosed herein.

IC devices, such as processors, chip set components, systems-on-chip, security-related ICs, or the like, often utilize sensitive data to implement security-related operations. These security-related operations can include, but are not limited to, authentication, encryption, decryption, secure storage, key management, identity management, service integration, and so on. Some IC devices implement security-related operations using hardware-based security functionality, such as a secure enclave, a cryptographic processor, secure memory, one-time programmable (OTP) memory, and/or the like. Sensitive data, such as cryptographic material, can be provisioned to IC devices through provisioning processes that attempt to: a) ensure the integrity of the sensitive data being provisioned to the IC devices, and b) prevent unauthorized parties from accessing the sensitive data.

Some provisioning processes rely on, or "trust," the entities involved in the design and/or manufacture of IC devices. A "trust-based provisioning process" may assume that the IC devices being provisioned operate according to specification or, more specifically, that the entities involved in the design and/or manufacture of the IC devices have not included undisclosed, malicious circuitry capable of interfering with and/or accessing sensitive data during the provisioning process. It may be difficult, or even impossible, to verify whether this trust is warranted. For example, a malicious entity could include undisclosed circuitry within an IC design that intercepts cryptographic material as it is provisioned, which could compromise security functionality of the IC devices (e.g., expose secrets stored on the IC devices, enable unauthorized parties to authenticate as users of the IC devices, and/or the like). The malicious circuitry may not affect other functionality of the IC device and, as such, may not be detectable by the trust-based provisioning process.

The degree of trust inherently placed in the entities involved in IC design and/or manufacture can be reduced by utilizing fixed, hardware-based secrets built into the IC devices themselves. The fixed, hardware-based secrets may be incorporated into IC designs, mask sets, Register-Level Transfer (RTL) implementations, and/or the like. Since these types of fixed, hardware-based secrets are shared by all IC devices of the same design, mask set, or RTL implementation, they may be referred to as "global secrets," "global hardware secrets," "fixed global secrets," or the like. A "hardware-secret-based provisioning process" may leverage global secrets to establish secure links with IC devices during provisioning. Global secrets, however, may be susceptible to leaks. A single leak of a global secret has the potential to impact all of the IC devices that share the global secret (which may include many thousands of IC devices). Global secrets may also be vulnerable to reverse engineering. It may be possible to retrieve fixed, hardware-based secrets from IC design information, despite mitigation efforts, such as obfuscation. For example, a malicious actor, such as an employee or partner of an IC manufacturer, could obtain the global secret of an IC design from RTL files shared with the malicious actor, potentially compromising all IC devices manufactured using the RTL files.

These trust and security issues can be exacerbated in situations where multiple entities are involved in the design and/or manufacture of IC devices. For example, a system-on-chip (SoC) may incorporate many components, each designed and/or fabricated by different entities. Implementing a trust-based provisioning process for an SoC may, therefore, require the provisioning system to rely on, trust, and/or establish relationships with many different partners. As used herein, the "partners" or "IC device partners" of a provisioning process and/or system for provisioning an IC device, such as on SoC, may include, but are not limited to entities, organizations, and/or persons involved in: the design of the IC device, the design of one or more components of the IC device, the manufacture of the IC device, the manufacture of one or more components of the IC device, the fabrication process of the IC device (e.g., semiconductor process design, implementation, testing, verification, and/or the like), the fabrication process of one or more components of the IC device, integration of IC device components, packaging of the IC device, testing of the IC device, testing of one or more components of the IC device, validation of the IC device, validation of one or more components of the IC device, and/or the like.

Trust-based provisioning processes may be vulnerable to malicious actions of any one partner. For example, one of the partners involved in the design and/or manufacture of the memory controller of an SoC could include malicious circuitry capable of providing unauthorized access to sensitive data provisioned to the SoC (e.g., cryptographic material, such as a master key). In another example, one of the partners involved in the design and/or manufacture of an interconnect of the SoC could include undisclosed circuitry configured to intercept sensitive data, such as cryptographic material, during the provisioning process. Alternatively, a partner could compromise the equipment used to provision sensitive data to the SoC (e.g., test equipment used to inject sensitive data into the SoC). The compromised equipment may expose some or all of the sensitive data without the need for undisclosed circuitry within the SoC itself.

Similarly, provisioning processes that rely on fixed, hardware-based secrets may be vulnerable to exposure by any one partner. Exposure of the fixed, hardware-based secret encoded into the design of a component of an IC device may impact all of the IC devices that incorporate the component (and/or share the same design or fixed, hardware-based secret). For example, the global secret encoded within a security component could be leaked by the partner responsible for integrating the security component into an SoC design. In another example, the global secret encoded in the design of an IC device may be reverse-engineered from RTL files shared between the partners involved in the design and/or manufacture of the IC device.

This disclosure describes aspects of systems and methods for secure provisioning with hardware verification. Generally, the described provisioning processes securely provision sensitive data to IC devices without relying on secrecy or privacy from IC device partners. In contrast to trust-based provisioning processes, the disclosed aspects can reduce the degree of trust placed in IC device partners, without relying on fixed, hardware-based secrets. Therefore, in contrast to global-secret provisioning processes, the disclosed aspects may not be vulnerable to leaks and/or efforts to reverse engineer fixed, hardware-based secrets of IC devices. The disclosed provisioning process may be capable of establishing secure links with IC devices using dynamically generated cryptographic keys, such that the cryptographic keys used in provisioning IC devices of the same design may differ from IC device to IC device.

In some aspects, a provisioning service securely transfers sensitive data to IC devices through the disclosed provisioning process. The provisioning process may include one or more validation operations, which may be used to validate that the IC devices operate according to disclosed specifications. More specifically, aspects of the disclosed provisioning process may include verifying that IC devices (and/or IC device components) operate according to disclosed specifications. The disclosed provisioning process may be capable of detecting deviations from disclosed IC device functionality (and/or deviations from disclosed functionality of respective IC device components). The disclosed provisioning process may, therefore, be capable of detecting undisclosed or malicious circuitry in IC devices that could interfere with provisioning and/or provide unauthorized access to sensitive data.

Aspects of the disclosed process for provisioning an IC device may include: a) dividing provisioning data for the IC device into a plurality of segments or fragments, each including a respective portion of the provisioning data, b) transferring each fragment to the IC device, each fragment encrypted with a respective cryptographic key of a plurality of cryptographic keys, and c) instructing the IC device to reconstruct the provisioning data in response to transferring the plurality of fragments. In some implementations, each fragment is transferred in a secure transfer operation that includes, inter alia, hardware verification.

The provisioning data may include any data to be provisioned to an IC device, including, but not limited to, cryptographic material, a key, a master key, a user master key (UMK), a certificate, a Public Key Infrastructure (PKI) certificate, a PKI public key, a PKI private key, identity information, a user identifier, authentication data, a credential, an authentication credential, authorization data, and/or the like. In some implementations, the provisioning data for an IC device is divided such that each fragment includes a respective portion of the cryptographic material being provisioned to the IC device. For example, each fragment of the provisioning data may include a respective portion of a UMK being provisioned to the IC device.

The fragments of the provisioning data may be transferred to the IC device through a secure transfer procedure. The secure transfer procedure may include a plurality of steps, phases, or operations (a plurality of secure transfer operations), each configured to securely transfer a fragment of the provisioning data to the IC device. In some implementations, each secure transfer operation includes: sending a seed value to the IC device, validating reply data returned from the IC device responsive to the seed value, generating a cryptographic key for the secure transfer operation, encrypting the fragment with the cryptographic key, and providing the encrypted fragment to the IC device. Accordingly, each fragment of the provisioning data transferred to the IC device may be encrypted by one of a plurality of cryptographic keys, each cryptographic key generated in a respective one of a plurality of secure transfer operations.

The provisioning service may terminate the provisioning process with an IC device in response to a failure of any one of the secure transfer operations. A secure transfer operation may fail in response to a failure to validate the reply data returned from the IC device. Terminating the provisioning process may render the IC device incapable of reconstructing the provisioning data since, inter alia, the IC device will lack one or more fragments of the provisioning data. Alternatively, the provisioning service may be configured to obfuscate the failure. The provisioning service may flag the failure and continue the provisioning process. The provisioning process may be terminated at a subsequent step (e.g., during a subsequent secure transfer operation). In this way, an attacker may not receive immediate feedback on whether their attempt to compromise the provisioning process was successful, which can impede efforts to develop more effective attacks. Moreover, unless the attacker controls both the earlier and later secure transfer operations, the attacker may be incapable of avoiding detection. The attempt by a first partner to compromise an earlier secure transfer operation will be detected by a second partner during a subsequent secure transfer operation. In another example, the provisioning service may be configured to poison the provisioning process in response to a validation failure. Poisoning the provisioning process may include modifying the provisioning process in a way that is transparent to the attacker (e.g., modifying the provisioning algorithm, functions, cryptography, and/or the like). Poisoning the provisioning process may further include modifying the provisioning data to be sent to the IC device (and/or one or more fragments thereof). The poisoned provisioning data may indicate that provisioning of the IC device failed (and may omit or obscure sensitive information). The poisoned provisioning process may appear to complete successfully from the perspective of the attacker. The IC device, however, may be identified as failed based on a flag recorded in persistent storage of the provisioning service and/or the "poisoned" provisioning data stored within the secure NV storage of the IC device. Accordingly, the attacker may not be aware that the attempt to compromise the provisioning process failed and may be prevented from gaining additional information regarding the functionality of valid provisioning processes.

The reply data returned from the IC device responsive to a seed value may include integrity data. The integrity data generated by the IC device may be indicative of the structure and/or state of a determined portion of the IC device. As used herein, a "portion" of an IC device (or "IC device portion") may refer to one or more circuits, components, features, functions, modules, elements, and/or other facilities of an IC device. The integrity data may be a representation, signature, and/or characterization of the structure and/or state of a "covered portion" of the IC device. As used herein, the portion of the IC device from which the integrity data are produced may be referred to as the "covered portion" of the IC device. The portion of the IC device covered by the integrity data may be determined by the seed value generated by the provisioning service. More specifically, the IC device may derive IC input data from the seed value. The IC input data may be configured to, inter alia, enable (and/or disable) specified features of the IC device (IC features). The IC input data may include any suitable information for specifying, selecting, enabling, activating, configuring and/or otherwise designating the portion of the IC device to cover with the integrity data including, but not limited to: configuration data, IC configuration data, enable data, an enable code, a knock code, a logic sequence, IC device settings, and/or the like. The IC input data may define an IC configuration that enables the integrity data to cover the portion of the IC device specified by the seed value. In some implementations, the IC input data may further include input data for one or more IC features (e.g., may specify a state or operation to implement by the one or more IC features).

The disclosed provisioning process may include a plurality of secure transfer operations. The seed values generated for each secure transfer operation may be configured to cause the IC device to return integrity data covering a respective portion of the IC device being provisioned. For example, a first seed value generated for a first secure transfer operation of the provisioning process may correspond to first IC input data designating a first portion of the IC device to be covered by the resulting integrity data, a second seed value generated for a second step may correspond to second IC input data designating a second portion of the IC device, different from the first portion, and so on. The integrity data validated in each step of the secure transfer procedure may, therefore, cover a different portion of the IC device.

The disclosed seed values (and corresponding IC input data) may obfuscate generation of the integrity data at the IC device unpredictably since, inter alia, the IC input data (and resulting IC behavior) depend on the seed values received from the provisioning service. In some implementations, the provisioning service configures the seed values such that the IC input data differ between provisioning processes (and/or differ from IC device to IC device). For example, the provisioning service may generate seed values such that the portions of the IC device covered in a first provisioning process performed with a first IC device differ from the portions of the IC device covered in a second provisioning process performed with a second IC device. In some aspects, the provisioning service produces seed values that appear to be unpredictable to an external observer. The integrity data and/or circuitry by which the integrity data are produced may, therefore, be resistant to replay attacks, reverse engineering, and/or the like.

The integrity data produced at the IC device may indicate the structure and/or state of the IC features within the covered portion of the IC device (per the IC input data derived from the seed value). The integrity data may indicate the state of each flip-flop or register within the covered portion of the IC device. Moreover, the configuration of the integrity data (e.g., length of the integrity data) may characterize the structure of the covered portion (e.g., may characterize the structure of the circuitry within the covered portion of the IC device).

In some implementations, the integrity data includes the result of a scan chain operation performed within the covered portion of the IC device. The scan chain operation may include shifting input data (scan-in data) into integrated circuitry within the covered portion of the IC device. The scan-in data may be shifted into the scan chain at a scan-in pin (or other element) of the integrated circuitry. In some aspects, the scan-in data may be defined and/or derived from the seed value (S). The result of the scan chain operation (e.g., the integrity data) may include scan-out data produced responsive to shifting the scan-in data through the integrated circuitry. The scan chain states may be observed and/or captured at a scan-out pin (or other element) of the integrated circuitry. The integrity data may, therefore, include a sequence of scan chain states produced responsive to shifting scan-in data through a scan chain of the integrated circuitry within the covered portion of the IC device.

The provisioning service can use the integrity data to validate on-chip, hardware functionality of the IC device being provisioned (e.g., validate the on-chip RTL of the IC device). In some implementations, each secure transfer operation of the provisioning process incorporates a validation operation, the validation operation including: a) generating a seed value to configure the IC device to generate integrity data covering a selected portion of the IC device, and b) validating the integrity data returned from the IC device responsive to the seed value. The provisioning service may validate the integrity data by, inter alia, comparing the integrity data returned from the IC device to integrity verification data. The integrity verification data may include an expected result of a scan chain operation within the covered portion of the IC device per the design IC device and/or IC device specification (e.g., per the on-chip RTL of the IC device). The validation operation implemented in each step of the provisioning process (e.g., in each secure transfer operation) may verify the on-chip RTL of a respective portion of the IC device.

In some implementations, the provisioning process includes N steps (or N secure transfer operations), each involving the transfer of a respective one of N fragments of the data being provisioned to the IC device (e.g., between 2 and 20 fragments). Each secure transfer operation (i) of the provisioning process may include: a) generating a seed value ($S_i$) at the provisioning server, which may correspond to IC input data ($ICID_i$), b) validating reply data ($R_i$) returned from the IC device reply data ($R_{D,i}$) responsive to the seed value ($S_i$), which may include validating integrity data ($ITG_{D,i}$) that covers the portion of the IC device corresponding to the IC input data ($ICID_i$) derived from the seed value ($S_i$), c) generating a cryptographic key at the provisioning service (a server-side cryptographic key $K_{S,i}$) in response to validating the reply data ($R_{D,i}$), d) encrypting the 1th fragment of the provisioning data (fragment $PF_i$) with the cryptographic key ($K_{S,i}$) to produce an encrypted fragment ($\{PF_i\}K_{S,i}$), and e) transferring the encrypted fragment ($\{PF_i\}K_{S,i}$) to the IC device. A corresponding device-side cryptographic key ($K_{D,i}$) may be generated at the IC device responsive to the seed value ($S_i$). The cryptographic keys ($K_{S,i}$ and $K_{D,i}$) may be derived, at least in part, from one or more of the seed value ($S_i$) generated by the provisioning service, portions of the reply data ($R_i$), and/or the like. In some implementations the server-side and device-side cryptographic keys ($K_{S,i}$ and $K_{D,i}$) are symmetric (e.g., symmetric keys $K_i$, where $K_i = K_{S,i} = K_{D,i}$) such that, in each secure transfer operation, the same or equivalent symmetric cryptographic keys ($K_i$) are generated at both the provisioning service and IC device.

Completing the N secure transfer operations of the provisioning process may result in transferring N encrypted fragments to the IC device, each of the encrypted fragments being encrypted by one of N cryptographic keys ($K_S$). The IC device may be configured to store the encrypted fragments and corresponding cryptographic keys ($K_D$) generated at the IC device within a memory (e.g., in on-board memory resources of the IC device, such as volatile or non-volatile memory). Accordingly, successful completion of the N secure transfer operations may result in storing encrypted fragments $\{PF_1\}K_{S,1}$ through $\{PF_N\}K_{S,N}$ and corresponding cryptographic keys $K_{D,1}$ through $K_{D,N}$ within memory of the IC device.

The provisioning process may further include instructing the IC device to reconstruct the provisioning data. The provisioning service may instruct the IC device to reconstruct the provisioning data in response to successfully completing each of the N secure transfer operations of the provisioning process (e.g., in response to transferring the N encrypted fragments to the IC device). The IC device may reconstruct the provisioning data by decrypting each of the N encrypted fragments ($\{F_i\}K_{S,i}$) with a corresponding cryptographic key ($K_{D,i}$) to produce decrypted fragments ($PF_i$), and combining the decrypted fragments ($PF_i$) to rebuild the provisioning data at the IC device. The IC device may be further configured to transfer the provisioning data into secure non-volatile (NV) storage, such as OTP memory, a security enclave, or other secure NV storage facility of the IC device.

In some aspects, the provisioning process incorporates a joint, end-to-end function (provisioning function, or simply function F). Implementation of the function (F) may be split between the IC device being provisioned and the provisioning service. More specifically, the function (F) may be divided between a first function ($F_D$) implemented at the IC device and a second function ($F_S$) implemented at the provisioning service, as follows: $F=F_S(F_D(I))$, where I represents one or more inputs.

The first function ($F_D$) may be implemented by internal hardware components of the IC device (an on-chip or embedded circuitry of the IC device). The first function ($F_D$) may, therefore, be referred to as an "on-chip," "device-side," "hardware," or "embedded" function ($F_D$). The second function ($F_S$) may be configured to generate seed values (S) and validate reply data ($R_D$) produced by the first function ($F_D$) responsive to the seed values (S). The outputs produced by the on-chip function ($F_D$) in response to seed values (S) may include, but are not limited to a device-side or on-chip: IC input data ($ICID_D$), integrity data ($ITG_D$), IC identifier ($ID_D$), a cryptographic key ($K_D$), reply data ($R_D$), and/or the like.

The on-chip function ($F_D$) implemented by the IC device may derive IC input data ($ICID_D$) from seed values (S). The IC input data ($ICID_D$) derived from a seed value (S) may selectively enable (or disable) features of the IC device (IC features). More specifically, the IC input data ($ICID_D$) may designate the portion of the IC device to be covered by the integrity data ($ITG_D$) produced responsive to the seed value (S). In some implementations, the on-chip function ($F_D$) includes and/or defines an on-chip, device-side function ($F_{D\_EC}$) to derive IC input data ($ICID_D$) from seed values (S), e.g., $EC_D=F_{D\_EC}(S)$. As disclosed herein, IC input data ($ICID_D$) may be configured to, inter alia, selectively enable or disable designated portions of the IC device (e.g., designated IC features). IC input data may include, but is not limited to: an IC configuration, an IC feature configuration, IC settings, IC feature settings, an enable code, enable data, a knock code, a logic sequence, input data for specified IC features, and/or the like.

The integrity data ($ITG_D$) produced by the on-chip function ($F_D$) may be configured to characterize the state and/or structure of the portion of the IC device designated by the IC input data ($ICID_D$). In some implementations, the on-chip function ($F_D$) includes and/or defines a device-side, on-chip function ($F_{D\_ITG}$) to produce integrity data ($ITG_D$) in response to seed values (S), as follows: $ITG_D=F_{D\_ITG}(EC_D)$ or $ITG_D=F_{D\_ITG}(F_{D\_EC}(S))$.

In some implementations, the integrity data ($ITG_D$) are configured to characterize the portion of the IC device designated by the IC input data ($ICID_D$) and/or specified by the seed value (S). The integrity data ($ITG_D$) produced responsive to a seed value (S) may indicate the state of each flip-flop circuit within the specified portion of the IC device. Moreover, the configuration of the integrity data ($ITG_D$), such as its length or the like, may characterize the structure of the circuitry within the specified portion. The integrity data ($ITG_D$) may be used to validate on-chip RTL of the IC device (and/or specified portions of the IC device), as disclosed in further detail herein.

In some implementations, the integrity data ($ITG_D$) include the result of a scan chain operation performed within the covered portion of the IC device. The scan chain operation may include shifting input data (scan-in data) into integrated circuitry within the covered portion of the IC device. The scan-in data may be shifted into the scan chain at a scan-in pin (or other element) of the integrated circuitry. In some aspects, the scan-in data may be defined and/or derived from the seed value (S). The result of the scan chain operation, e.g., the integrity data ($ITG_D$), may include scan-out data produced responsive to shifting the scan-in data through the integrated circuitry. The scan chain states may be observed and/or captured at a scan-out pin (or other element) of the integrated circuitry. The integrity data ($ITG_D$) may, therefore, include a sequence of scan chain states produced responsive to shifting scan-in data through a scan chain of the integrated circuitry within the covered portion of the IC device.

The on-chip function ($F_D$) implemented by the IC device may be further configured to retrieve on-chip IC identifiers ($ID_D$) responsive to seed values (S). An IC identifier ($ID_D$) may include any suitable information pertaining to the IC device, component(s) of the IC device, manufacturer of the IC device, design of the IC device, fabrication of the IC device, version of the IC device, and/or the like. The IC identifier ($ID_D$) may include, but is not limited to: an identifier, a name, a code, a globally unique identifier (GUID), a universally unique identifier (UUID), a device identifier, a chip identifier, an SoC identifier, a serial number, a model number, a part number, a date code, an IC prefix, an IC company prefix, an IC manufacturer prefix, a national identification number, a stock-keeping unit (SKU), a Media Access Control (MAC) address, and/or the like.

In some implementations, the function ($F_D$) implemented by the IC device includes and/or defines a device-side, on-chip ID function ($F_{D\_ID}$) configured to retrieve identifier(s) of the IC device, e.g., $ID_D=F_{D\_ID}(\ )$. The on-chip ID function ($F_{D\_ID}$) may be configured to retrieve identifiers from memory and/or storage resources of the IC device, such as firmware, NV memory, non-transitory storage, Flash storage, an electrically erasable programmable read-only memory (EEPROM), and/or the like. In some aspects, the IC identifier ($ID_D$) produced by the on-chip ID function ($F_{D\_ID}$) responsive to a seed value (S) may be based, at least in part, on the seed value (S), e.g., $ID_D=F_{D\_ID}(S)$. For example, the seed value (S) may specify the identifier(s) to include in the IC identifier ($ID_D$), a format of the specified identifier(s), and/or the like.

The outputs produced by the on-chip function ($F_D$) responsive to seed values (S) may further include device-side or on-chip cryptographic keys ($K_D$). The cryptographic keys ($K_D$) may be derived, at least in part, from the seed values (S). Alternatively, or in addition, the cryptographic keys ($K_D$) may be derived, at least in part, from one or more outputs of the on-chip function ($F_D$), such as the IC input data ($ICID_D$) derived from the seed value (S), the integrity data ($ITG_D$) generated per the IC input data ($ICID_D$), the IC identifier ($ID_D$), portions of the reply data ($R_D$), and/or the like. The on-chip function ($F_D$) implemented by the IC device may include and/or define a device-side or on-chip key generation function ($F_{D\_K}$). The key generation function ($F_{D\_K}$) may derive the cryptographic keys ($K_D$) from one or more of the: seed value (S), IC input data ($ICID_D$), integrity data ($ITG_D$), identifier ($ID_D$), reply data ($R_D$), and/or the like. The on-chip key generation function ($F_{D\_K}$) may generate cryptographic keys ($K_D$) responsive to a seed value (S) by one or more of: $K_D=F_{D\_K}(S)$, $K_D=F_{D\_K}(S, EC_D)$, $K_D=F_{D\_K}(S, EC_D, ITG_D)$, $K_D=F_{D\_K}(S, EC_D, ITG_D, ID_D)$, or the like. Alternatively, the on-chip key generation function ($F_{D\_K}$) implemented by the IC device may incorporate and/or be defined in terms of one or more sub-functions of the on-chip function ($F_D$), such as, for example: $K_D=F_{D\_K}(S, F_{D\_EC}(S))$, $K_D=F_{D\_K}(S, F_{D\_EC}(S), F_{D\_ITG}(F_{D\_EC}(S)))$, $K_D=F_{D\_K}((S, F_{D\_EC}(S), F_{D\_ITG}(F_{D\_EC}(S)), F_{D\_ID}(\ ))$, $K_D=F_{D\_K}((S, F_{D\_EC}(S), F_{D\_ITG}(F_{D\_EC}(S)), F_{D\_ID}(S))$, or the like.

The on-chip function ($F_D$) implemented by the IC device may be further configured to generate device-side, on-chip reply data ($R_D$) responsive to seed values (S). The IC device may return the reply data ($R_D$) to the provisioning service. The provisioning service may determine whether to continue secure transfer operations (and/or provisioning processes) associated with respective seed values (S) based on whether reply data ($R_D$) returned responsive to the respective seed values (S) can be validated. The reply data ($R_D$) produced at the IC device responsive to respective seed values (S) may include one or more of the outputs produced by the on-chip function ($F_D$) responsive to the respective seed values (S). The reply data ($R_D$) produced in response to a seed value (S) may include one or more of: the IC input data ($ICID_D$) derived from the seed value (S), the integrity data ($ITG_D$) covering the portion of the IC device specified by the IC input data ($ICID_D$), the IC identifier ($ID_D$), and/or the like.

The provisioning service may implement a second function ($F_S$) of the function (F). The second function ($F_S$) may be configured to generate seed values (S) and/or validate reply data ($R_D$) generated per the on-chip function ($F_D$) responsive to the seed values (S). In some implementations, the second function ($F_S$) implemented by the provisioning service may be configured to produce one or more outputs responsive to a seed value (S) including, but not limited to: server-side or reply verification data ($R_S$), a cryptographic key ($K_S$), and/or the like, e.g., $F_S(S) \rightarrow \{R_S, K_S\}$.

The provisioning service may validate the reply data ($R_D$) returned from IC devices in response to respective seed values (S) by, inter alia, a) generating reply verification data ($R_S$) for the respective seed values (S) using the second function ($F_S$), and b) comparing the reply verification data ($R_S$) to the reply data ($R_D$) returned from the IC devices. Validating the reply data ($R_D$) received from an IC device responsive to a seed value (S) may include determining whether the reply data ($R_D$) matches and/or corresponds to reply verification data ($R_S$) generated using the second function ($F_S$), e.g., $F_{S\_V}(S)=(R_D==R_S)$ or $F_{S\_V}(S)=(R_D==F_S(S))$ where $F_{S\_V}$ is a validation function implemented by the provisioning service. The validation function ($F_{S\_V}$) may produce a validity quantity (V) indicative of whether the reply data ($R_D$) was successfully validated (or failed validation).

In some implementations, the reply verification data ($R_S$) include integrity verification data ($ITG_S$). The integrity verification data ($ITG_S$) may indicate an expected state and/or structure of the portion of the IC device specified by the seed value (S) of the secure transfer operation and/or an expected IC input data ($ICID_S$) derived from the seed value (S). The second function ($F_S$) may include and/or define a server-side validation function to generate the integrity verification data ($ITG_S$), as follows: $ITG_S=F_{S\_ITG}(S)$, $ITG_S=F_{S\_ITG}(ICID_S)$, or $ITG_S=F_{S\_ITG}(F_{S\_ICID}(S))$, where $F_{S\_ICID}$ is a function configured to derive expected IC input data ($ICID_S$) from seed values (S). Validating the reply data ($R_D$) may include comparing the integrity verification data ($ITG_S$) to the integrity data ($ITG_D$) returned from the IC device, e.g., $F_{S\_V}(S)=(ITG_D==ITG_S)$, $F_{S\_V}(S)=(ITG_D==F_{S\_ITG}(S))$, or the like. In some aspects, validating the reply data ($R_D$) may further include comparing the expected IC input data ($ICID_S$) to IC input data ($ICID_D$) returned from the IC device, e.g., $F_{S\_V}(S)=((ICID_D==ICID_S)\&(ITG_D==ITG_S))$, $F_{S\_V}(S)=((ICID_D==F_{S\_ICID}(S))\&(ITG_D==F_{S\_ITG}(F_{S\_ICID}(S))))$, or the like.

In some aspects, the reply verification data ($R_S$) may further include the IC identifier ($ID_S$) expected from the IC device. The IC identifier ($ID_S$) may be determined based, at least in part, on information pertaining to the IC devices to be provisioned through the disclosed provisioning process. In some implementations, the provisioning service includes and/or is coupled to a data store that includes information pertaining to the IC devices, such as IC identifiers of the IC devices. The second function ($F_S$) may include and/or define a function $F_{S\_ID}$ for determining expected IC identifiers for IC devices, e.g., $ID_S=F_{S\_ID}(\ )$. The function $F_{S\_ID}$ may be configured to retrieve expected IC identifier(s) for respective IC devices from the data store. In some aspects, the seed values (S) generated in provisioning processes performed with respective IC devices may include IC identifiers of the respective IC devices, which may enable expected IC identifiers ($ID_S$) to be extracted and/or derived from the seed values (S), e.g., $ID_S=F_{S_{ID}}(S)$. Validating the reply data ($R_D$) may include comparing the expected IC identifier ($ID_S$) to the IC identifier ($ID_D$) returned from the IC device. In some implementations, validating the reply data ($R_D$) includes comparing the expected IC identifier ($ID_S$) and integrity verification data ($ITG_S$) to the IC identifier ($ID_D$) and integrity data ($ITG_D$) returned from the IC device, respectively, e.g., $F_{S\_V}(S)=((ID_D==ID_S)\&(ITG_D==F_{S\_ITG}(S)))$ or $F_{S\_V}(S)=((ID_D==F_{S\_ID}(S))\&(ITG_D==F_{S\_ITG}(S)))$. Alternatively, or in addition, validating the reply data ($R_D$) may further include comparing the expected IC input data ($ICID_S$) to the IC input data ($ICID_D$) returned from the IC device, e.g., $F_{S\_V}(S)=((ID_D==ID_S)\&(ICID_D==F_{S\_ICID}(S))\&(ITG_D==F_{S\_ITG}(F_{S\_ICID}(S))))$.

The cryptographic keys ($K_D$) generated at the IC device per the first function ($F_D$) may be configured to correspond to the cryptographic keys ($K_S$) generated at the provisioning service per the second function ($F_S$). The cryptographic keys ($K_D$ and/or $K_S$) may be derived according to a key agreement protocol and/or key exchange mechanism (e.g., a protocol or mechanism for exchanging cryptographic keys over a public and/or insecure channel). The cryptographic keys ($K_D$ and/or $K_S$) may be derived according to any suitable key agreement and/or exchange protocol or mechanism, including, but not limited to: a public-key protocol, a Diffie-Hellman key exchange, an elliptic-curve Diffie-Hellman key exchange, a supersingular isogeny key exchange, a key agreement protocol incorporating forward secrecy ($F_S$) features, and/or the like. In some aspects, the cryptographic keys ($K_D$ and $K_S$) generated for each secure transfer operation (responsive to, inter alia, seed values (S) of each secure transfer operation) may be symmetric keys (K), where $K=K_D=K_S$. In some aspects, the seed value (S) generated by the provisioning service includes cryptographic material from which corresponding and/or symmetric cryptographic keys (K) may be derived.

The function implemented by the provisioning service (e.g., $F=F_S(F_D(I))$) may be split into ($F_D$) and ($F_S$) such that: a) knowledge of the design and/or implementation of the on-chip component(s) of the IC device that implement the first function ($F_D$), such as the RTL implementation of the on-chip component(s), are not sufficient to reverse engineer the function (F). The function (F) may be further configured such that knowledge of the input(s) forwarded to the IC device (e.g., seed values S) and/or outputs returned from the on-chip function ($F_D$), such as the reply data ($R_D$), integrity data ($ITG_D$), IC identifiers ($ID_D$), and/or the like, are not sufficient to reverse engineer the function (F) and/or produce or "spoof" valid reply data ($R_D$). The function (F), first function ($F_D$), and/or second function ($F_S$) may be configured to produce input and/or output data that appear random or arbitrary to an observer that does not have access to the function (F). The function (F), the first function ($F_D$), and/or second function ($F_S$) may incorporate one or more cryptographic functions, such as one-way functions, hash functions, key exchange algorithms, key generation algorithms, and/or the like.

Example Environment

The following discussion describes an operating environment, techniques that may be employed in the operating environment, and various devices or systems in which components of the operating environment can be embodied. In the context of the present disclosure, reference is made to the operating environment by way of example only.

FIG. 1-1 illustrates an example environment 100-1 that includes an IC device 110 and provisioning service 120 in which aspects of secure provisioning with hardware verification can be implemented. The IC device 110 may be implemented as any suitable type of IC, including, but not limited to: a general-purpose processor, a special-purpose processor, an Application-Specific Integrated Circuit (ASIC), a central processing unit (CPU), a microprocessor, a digital signal processor (DSP), a microcontroller, a memory device, a memory controller, a three-dimensional integrated circuit (3D-IC), an SoC, a wafer-scale integration (WSI) device, and/or the like. In some examples, the IC device 110 may be included within and/or be coupled to an electronic device 111, which may include, but is not limited to: a test device, an IC test device, an IC validation device, an IC provisioning device, a computing device, a mobile computing device, a media device, a display device, a smart display device, an internet-of-things (IoT) device, a communication device, a smart-phone, a tablet computing device, a notebook computing device, a laptop computer, a wearable computing device, a smart watch, a network device, a router, a hotspot, an automotive computing device, and/or the like.

The provisioning service 120 may include or be implemented by an apparatus 101. The apparatus 101 may include any suitable computing facility including, but not limited to: an electronic device, a computing device, a general-purpose computing device, an application-specific computing device, a computing system, a server, a distributed computing system, a cloud-based computing system, an embedded computing system, an IC test device, an IC provisioning device, and/or the like. In some implementations, the apparatus 101 is a provisioning appliance 121.

The apparatus 101 may include a processor 102, memory 103, non-transitory storage 104, an interface 105, and so on. The apparatus 101 may provide other functions or include components or interfaces omitted from FIG. 1-1 for the sake of clarity or visual brevity. The processor 102 may include any suitable processing component(s) including, but not limited to: a processor chip, processing circuitry, a processing unit, an Arithmetic Logic Unit (ALU), a CPU, a general-purpose processor, an ASIC, programmable processing elements, a Field Programmable Gate Array (FPGA), a graphics processing unit (GPU), an SoC with other components of the apparatus 101 integrated therein, and/or the like.

The memory 103 may include any suitable memory component(s) and/or device(s) including, but not limited to, volatile memory, NV memory, random access memory (RAM), static RAM (SRAM), dynamic RAM (DRAM), synchronous DRAM (SDRAM), cache memory, and/or the like. The non-transitory storage 104 may include any suitable non-transitory, persistent, and/or NV storage component(s) and/or device(s) including, but not limited to: a non-transitory storage device, a persistent storage device, an internal storage device, an external storage device, a remote storage device, Network Attached Storage (NAS) resources, a magnetic disk drive, a hard disk drive (HDD), a solid-state storage device (SSD), a Flash memory device, and/or the like. In the context of this discussion, the non-transitory storage 104 of the apparatus 101 is implemented as at least one hardware-based or physical storage device, which does not include transitory signals or carrier waves. Applications, firmware, and/or an operating system (not shown) of the apparatus 101 can be embodied on the non-transitory storage 104 as processor-executable instructions, which may be executed by the processor 102 to provide various functionalities described herein. In some implementations, portions of the provisioning service 120 (and/or functionality of the provisioning service 120) may be embodied on the non-transitory storage 104 as processor-executable instructions.

The interface 105 may include any suitable data and/or communication component(s), interface(s) and/or device(s), including, but not limited to: input/output (I/O) ports, I/O interfaces, communication ports, communication interconnects, communication interfaces, network ports, network interconnects, network interfaces, and/or the like. The interface 105 may be configured to communicatively couple the apparatus 101 (and/or provisioning service 120) to the IC device 110 (and/or electronic device 111). The interface 105 may be configured to couple the apparatus 101 (and/or provisioning service 120) to one or more external devices and/or components. In some aspects, the interface 105 may be communicatively coupled to the IC device 110 by and/or through an interconnect 106. The interconnect 106 may include any facility for electronic communication including, but not limited to: a bus, a crossbar, a fabric, a switching fabric, a grid, one or more wires that carry electronic signals, such as voltage or current signals, a network, a wired network, a wireless network, and/or the like. In some implementations, the interface 105 is configured to couple the apparatus 101 (and/or provisioning service 120) to the IC device 110 (and/or electronic device 111) by and/or through one or more networks, including, but not limited to: wired networks, a wireless network, a local area network (LAN), a wide area network (WAN), a virtual private network (VPN), Internet Protocol (IP) networks, Transmission Control Protocol/Internet Protocol (TCP/IP) networks, the Internet, and/or the like. Alternatively, or in addition, the interface 105 may be configured to couple the apparatus 101 (and/or provisioning service 120) to an interface of the IC device 110 (and/or electronic device 111), such as one or more I/O pins, I/O pads, I/O ports, and/or the like.

The provisioning service 120 may be configured to implement secure provisioning with hardware verification (a provisioning process, as disclosed herein). Provisioning an IC device 110 may include: a) dividing provisioning data 130 for the IC device 110 into a plurality of fragments 132 (e.g., N fragments 132-1 through 132-N), b) implementing a plurality of secure transfer operations with the IC device 110 (N secure transfer operations), each configured to transfer a respective one of the N fragments 132 to the IC device 110, and c) instructing the first logic 112 to reconstruct the provisioning data 130 from the transferred fragments 132 at the IC device 110 in response to completing the N secure transfer operations.

In some implementations, each secure transfer operation of the provisioning process includes: a) performing a validation operation with the IC device 110, and b) encrypting the fragment 132 for transfer using a cryptographic key ($K_S$) generated for the secure transfer operation. The validation operation may include a) sending a seed value (S) to the first logic 112 of the IC device 110, the seed value (S) configured to cause the first logic 112 to produce reply data ($R_D$) including integrity data ($ITG_D$) that covers a specified portion of the IC device 110, and b) validating the reply data ($R_D$) returned from the IC device 110 at the provisioning service 120, which may include comparing the reply data ($R_D$) to reply verification data ($R_S$), the reply verification data ($R_S$) including integrity verification data ($ITG_S$). The reply verification data ($R_S$) and/or integrity verification data ($ITG_S$) may be generated by the second logic 122 of the provisioning service 120, per the second function ($F_S$). If the validation operation is successful (that is, if the reply data ($R_D$) received back from the IC device 110 matches and/or corresponds to the reply verification data ($R_S$)), the secure transfer operation may transfer the fragment 132 to the first logic 112 of the IC device 110. Otherwise, the secure transfer operation may terminate without transferring the fragment 132 and/or other remaining fragments 132 of the provisioning data 130 (if any).

Transferring a fragment 132 in a secure transfer operation may include generating or otherwise obtaining a cryptographic key ($K_S$) for the secure transfer operation, encrypting the fragment 132 with the cryptographic key ($K_S$) to form an encrypted fragment $\{132\}K_S$, and transferring the encrypted fragment $\{132\}K_S$ to the IC device 110. The first logic 112 may store the encrypted fragment $\{132\}K_S$ within memory resources of the IC device 110, such as volatile or non-volatile memory. The first logic 112 may be further configured to generate a cryptographic key ($K_D$) at the IC device 110 and store the cryptographic key ($K_D$) with the encrypted fragment $\{132\}K_S$. The cryptographic key ($K_D$) may be configured to correspond to the cryptographic key ($K_S$) generated at or obtained by the provisioning service 120. More specifically, the cryptographic key ($K_D$) may be configured to enable the first logic 112 to decrypt the encrypted fragment $\{132\}K_S$ at the IC device 110. The cryptographic key ($K_D$) generated at the IC device 110 may be configured to correspond to the cryptographic key ($K_S$) generated at the provisioning service 120 (and vice versa). The cryptographic key ($K_D$) may, therefore, be capable of verifying and/or decrypting data encrypted by the cryptographic key ($K_S$), such as the encrypted fragment $\{132\}K_S$. The cryptographic keys ($K_S$ and $K_D$) may be derived, at least in part, by and/or through implementation of the function (F). The cryptographic key ($K_S$) of the secure transfer operation may be derived from one or more of the seed value (S) of the secure transfer operation, the reply verification data ($R_S$) generated by the second logic 122, the integrity data ($ITG_D$), the IC identifier ($ID_D$), and/or the like. The cryptographic key ($K_D$) may be derived from one or more of the seed value (S), the reply data ($R_D$) generated by the first logic 112, the integrity verification data ($ITG_S$), IC identifier ($ID_S$), and/or the like. The cryptographic keys ($K_S$ and $K_D$) may be generated using any suitable key exchange mechanism and/or protocol. In some implementations, the cryptographic keys ($K_S$ and $K_D$) are asymmetric keys. In other implementations, the cryptographic keys ($K_S$ and $K_D$) are symmetric keys.

Completing the N secure transfer operations of the provisioning process may result in transferring N encrypted fragments $\{132\text{-}1\}K_{S,1}$ through $\{132\text{-}N\}K_{S,N}$ to the IC device 110. The first logic 112 of the IC device 110 may be configured to store the encrypted fragments $\{132\text{-}1\}K_{S,1}$ through $\{132\text{-}N\}K_{S,N}$ and corresponding cryptographic keys ($K_{D,1}$ through $K_{D,N}$) within on-board memory of the IC device 110.

In response to completing the N secure transfer operations, the provisioning service 120 may instruct the IC device 110 to reconstruct the provisioning data 130. The provisioning service 120 may, for example, notify the IC device 110 that the N secure transfer operations have been successfully completed by, inter alia, through a command, directive, message, completion indicator, and/or the like. In response, the first logic 112 may be configured to reconstruct the provisioning data 130 at the IC device 110, which may include decrypting each of the N encrypted fragments $\{132\text{-}1\}K_{S,1}$ through $\{132\text{-}N\}K_{S,N}$ with a corresponding cryptographic key ($K_{D,1}$ through $K_{D,N}$), combining the decrypted fragments 132-1 through 132-N, and/or writing the resulting provisioning data 130 into secure NV storage 114 of the IC device 110. The secure NV storage 114 may include any NV memory storage facility, including, but not limited to: an OTP memory, a security feature of the IC device 110, a security component of the IC device 110, a security subsystem, an enclave, a secure enclave, a keystore, a hardware-backed keystore, or the like.

Figures 1, 2:
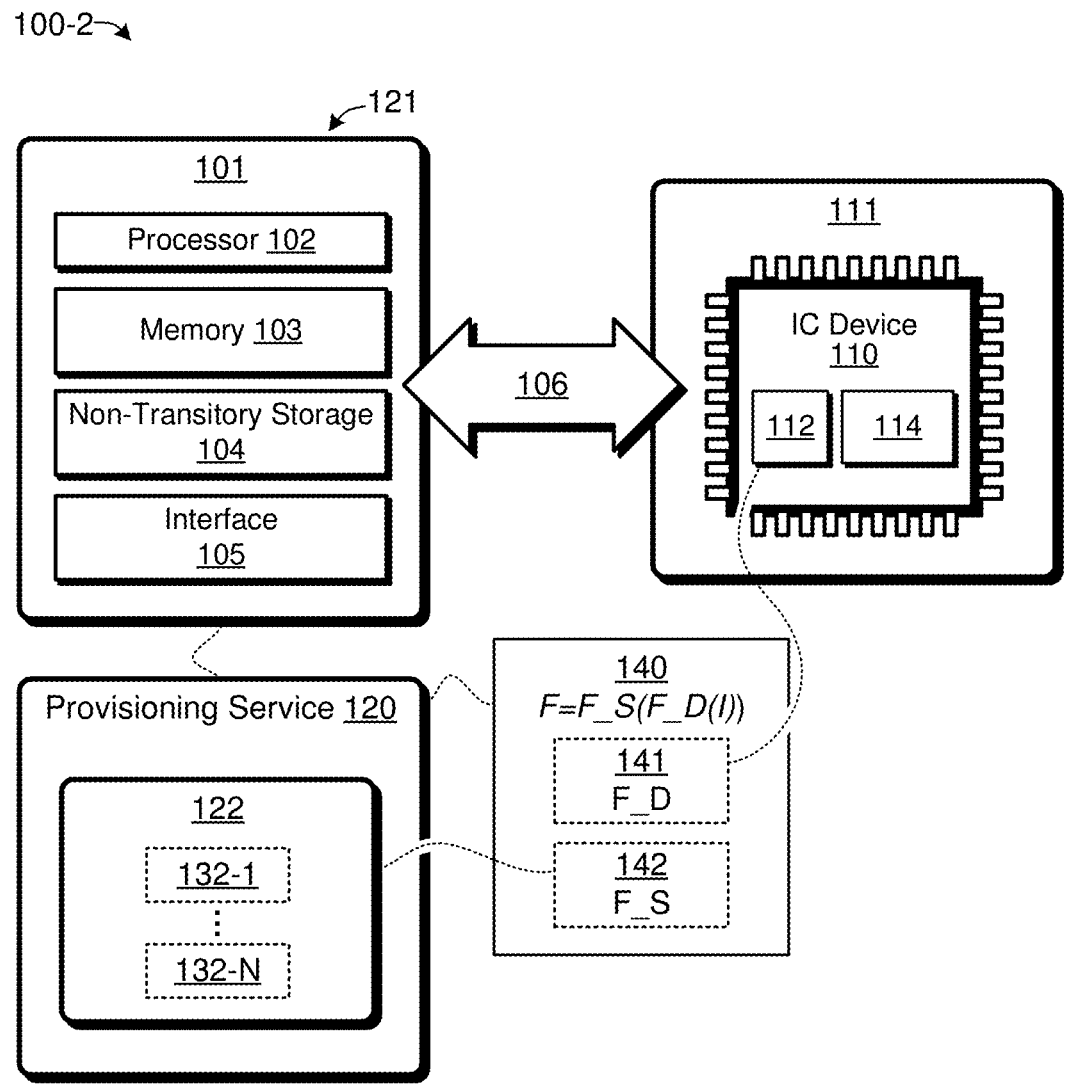
Figures 1, 2:
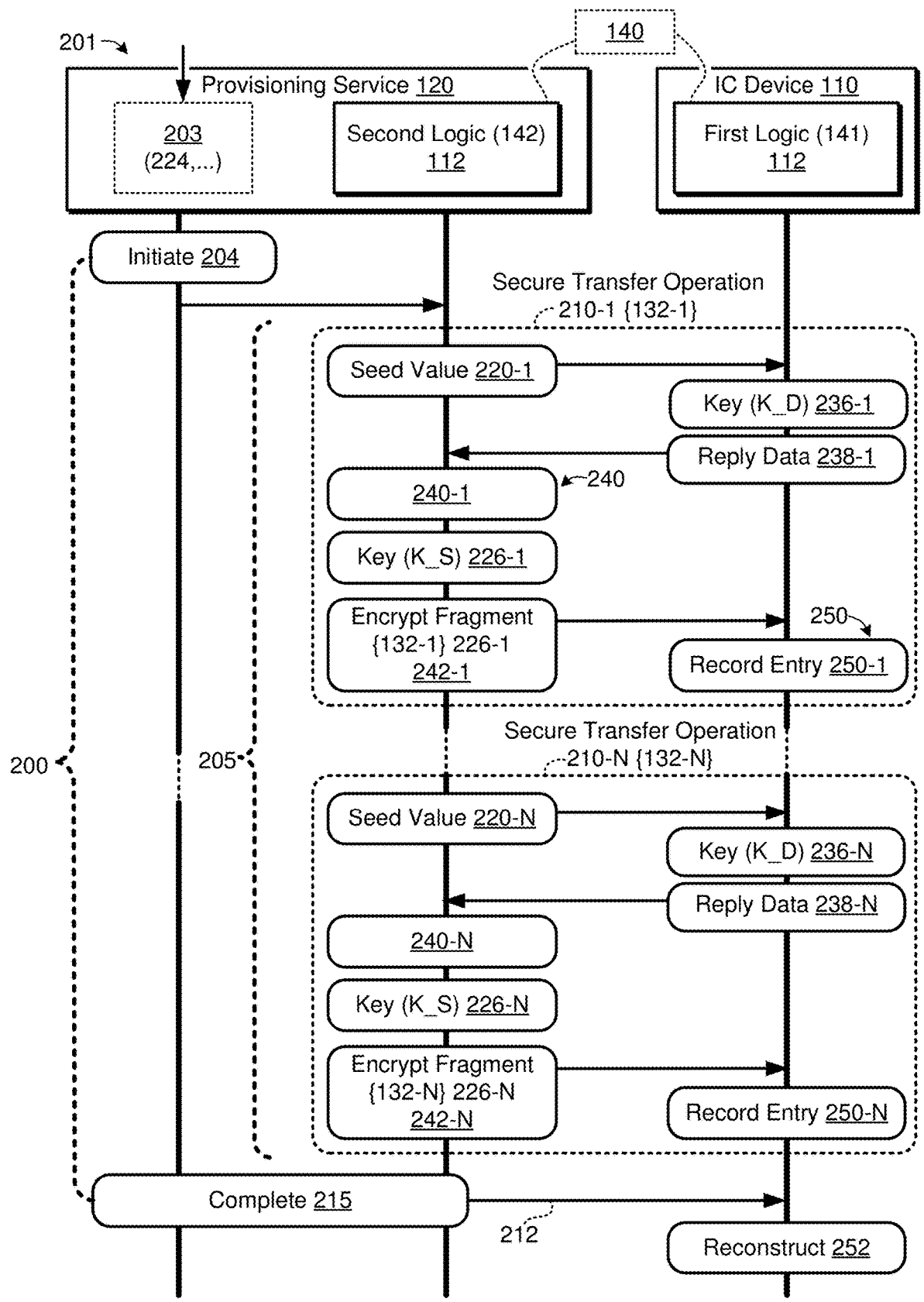
Figure 2:
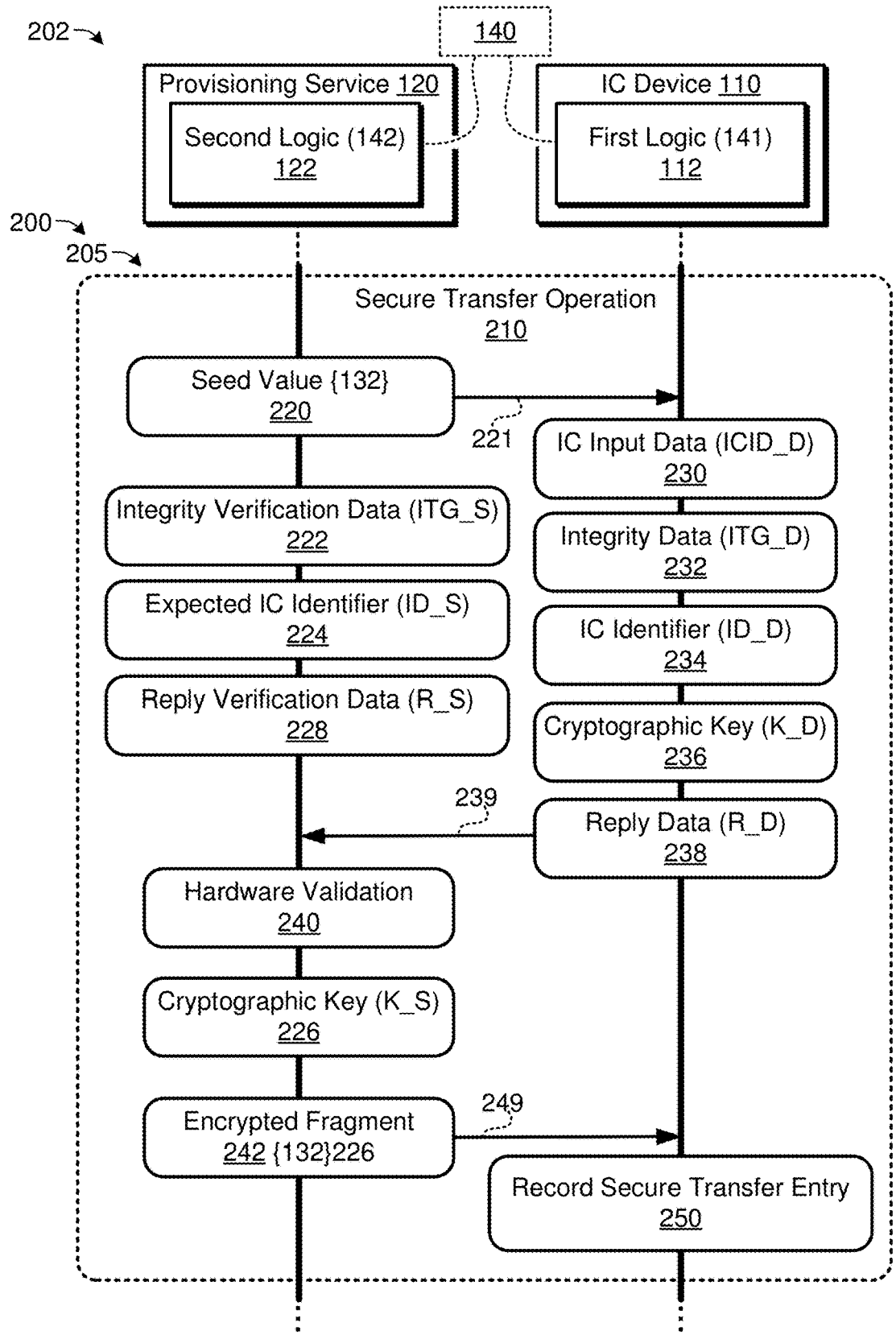

FIG. 1-2, illustrates another example of an environment 100-2 that includes an IC device 110 and provisioning service 120 in which aspects of secure provisioning with hardware verification (a provisioning process) can be implemented. As illustrated, the provisioning process may be implemented in accordance with a function (F) 140. The function (F) 140 may be configured to be securely split between a first function ($F_D$) 141 and a second function ($F_S$) 142. As illustrated, the first function ($F_D$) 141 may be implemented by on-chip logic of the IC device 110 being provisioned (by the first logic 112). The second function ($F_S$) 142 may be implemented by second logic 122 at the provisioning service 120.

As disclosed herein, aspects of the disclosed provisioning process can securely populate provisioning data 130 to secure NV storage 114 of the IC device 110 by: dividing the provisioning data 130 into a plurality of fragments 132 (e.g., fragments 132-1 through 132-N), and transferring each fragment 132-1 through 132-N to the IC device 110 in a respective secure transfer operation. Each secure transfer operation may include a validation operation covering a specified portion of the IC device 110, and encryption of the fragment 132 in a cryptographic key ($K_S$) that is unique to the secure operation, such that each fragment 132 of the plurality of fragments 132 is encrypted by a respective one of a plurality of cryptographic keys ($K_S$).

In some aspects, each secure transfer operation of the provisioning process includes sending a seed value (S) to the IC device 110, validating (that is, performing a validation operation on) reply data ($R_D$) returned from the IC device 110 responsive to the seed value (S), and sending an encrypted fragment of the provisioning data 130 to the IC device 110 if the reply data ($R_D$) is successfully validated (or terminating the secure transfer operation and corresponding provisioning process otherwise). The seed value (S) may be generated per the second function ($F_S$) 142. The seed value (S) may include an expected identifier ($ID_S$) of the IC device 110 and/or specify the portion of the IC device 110 to cover by integrity data ($ITG_D$) produced at the IC device 110 per the first function ($F_D$) 141. The second logic 122 may be further configured to determine integrity verification data ($ITG_D$) for the seed value (S) per the second function ($F_S$) 142.

The secure transfer operation may further include receiving reply data ($R_D$) from the IC device 110 responsive to the seed value (S). The reply data ($R_D$) may include an IC identifier and/or on-chip integrity data ($ITG_D$). The integrity data ($ITG_D$) may be configured to cover the portion of the IC device 110 specified by the seed value (S). The first logic 112 may derive IC input data ($ICID_D$) from the seed value (S) per the first function ($F_D$) 141, utilize the derived IC input data ($ICID_D$) to enable the portion of the IC device 110 specified by the seed value (S), and generate integrity data ($ITG_D$) covering the enabled portion of the IC device 110. The first logic 112 may be further configured to generate a cryptographic key ($K_D$) per the first function ($F_D$) 141. The cryptographic key ($K_D$) may be derived, at least in part, from one or more of the seed value (S), IC input data ($ICID_D$), integrity data ($ITG_D$), and/or the like.

The provisioning service 120 may use the reply data ($R_D$) returned from the IC device 110 to implement a hardware verification function. The hardware verification function may include comparing the reply data ($R_D$) produced at the IC device 110 per the first function ($F_D$) 141 to the reply verification data ($R_S$) generated per the second function ($F_S$) 142. The reply data ($R_D$) may be validated if the IC identifier ($ID_D$) and integrity data ($ITG_D$) of the reply data ($R_D$) match and/or correspond to the IC identifier ($ID_S$) and integrity data ($ITG_S$) of the reply verification data ($R_S$), and may fail otherwise. As disclosed herein, the integrity data ($ITG_D$) may characterize the structure and/or state of the portion of the IC device 110 specified by the seed value (S). In some implementations, the integrity data ($ITG_D$) includes the result of a scan chain operation (e.g., includes scan chain states observed in response to shifting scan-in data through the specified portion of the IC device). Accordingly, validating the reply data ($R_S$) of a secure transfer operation may include validating the on-chip RTL implementation of the portion of the IC device 110 specified by the seed value (S) of the secure transfer operation (the portion covered by the integrity data ($ITG_D$) produced at the IC device 110). Moreover, the provisioning service 120 can vary the portion of the IC device 110 covered by the integrity data ($ITG_D$) in each of the plurality of secure transfer operations of the provisioning process, e.g., per the seed values (S) generated for the secure transfer operations in accordance with the second function ($F_S$) 142. The provisioning process may, therefore, involve validating the on-chip RTL implementation for a plurality of different portions of the IC device 110, the entire IC device 110, selected functions of the IC device 110 (selected IC functions), combinations of IC functions, and/or the like.

If validation of the reply data ($R_S$) returned responsive to the seed value (S) of the secure transfer operation fails, the provisioning service 120 may terminate the secure transfer operation (and/or corresponding provisioning process). The provisioning service 120 may be further configured to record that the IC identifier ($ID_S$) is "failed" or "do not provision" to prevent subsequent provisioning attempts. Conversely, if the reply data ($R_S$) is successfully validated, the secure transfer operation may proceed, which may include encrypting a fragment 132 of the provisioning data 130 with a cryptographic key ($K_S$) generated per the second function ($F_S$) 142 and sending the encrypted fragment ($\{132\}K_S$) to the IC device 110. The cryptographic key ($K_S$) may be derived from one or more of the seed value(S), the reply verification data ($R_S$), the reply data ($R_D$), and/or the like. The first logic 112 may store the encrypted fragment ($\{132\}K_S$) and corresponding cryptographic key ($K_D$) in memory resources of the IC device 110 (e.g., in volatile or non-volatile memory).

In the FIG. 1-2 example 100-2, the provisioning process may include transferring fragments 132-1 through 132-N to the IC device 110, each fragment 132 transferred in a respective one of N secure transfer operations (or a respective step of a secure transfer procedure). Successful completion of the N secure transfer operations may result in storing N encrypted fragments at the IC device 110, e.g., encrypted fragments $\{132\text{-}1\}K_{S,1}$ through $\{132\text{-}N\}K_{S,N}$. The first logic 112 may also maintain cryptographic keys ($K_D$) generated in each of the N secure transfer operations in the memory, e.g., cryptographic keys ($K_{D,1}$ through $K_{D,N}$). In response to verifying that the N secure transfer operations have been successfully completed, the provisioning service 120 may instruct the IC device 110 to reconstruct the provisioning data 130. Reconstructing the provisioning data 130 may include decrypting the encrypted fragments $\{132\}K_S$ with corresponding cryptographic keys ($K_D$), combining the decrypted fragments 132, and transferring the resulting provisioning data 130 into secure NV storage 114 of the IC device 110.

In aspects of the disclosed provisioning process, each fragment 132 of the provisioning data 130 is transferred to the IC device 110 in a respective secure transfer operation, each secure transfer operation including: a) validating the on-chip RTL implementation of a specified portion of the IC device 110, and b) encryption of the fragment 132 in a cryptographic key ($K_S$) generated for the secure transfer operation. Thus, each fragment 132 of the provisioning data 130 transferred to the IC device 110 may be encrypted by one of a plurality of cryptographic keys ($K_S$). Encrypting the fragments 132 in a plurality of cryptographic keys ($K_S$) may prevent unauthorized access to the provisioning data 130 (and/or fragments 132 thereof) during transit. For example, the secure transfer operations may thwart attempts to compromise the provisioning process through, inter alia, man-in-the-middle attacks, or the like. Moreover, since each fragment 132-1 through 132-N is encrypted by a different cryptographic key ($K_S$) an entity, such as an attacker or even the IC device 110 itself, may be prevented from accessing (or reconstructing) the provisioning data 130, even if the entity has access to a subset of the N cryptographic keys ($K_S$) or even a subset of the N decrypted fragments 132.

Example Techniques and Hardware

FIG. 2-1 is a sequence diagram illustrating an example 201 of secure provisioning with hardware verification (an example of the disclosed provisioning process 200). Aspects of the provisioning process 200 may be implemented in, for example, hardware (e.g., fixed logic circuitry or a processor in conjunction with a memory), firmware, software, or some combination thereof. The provisioning process 200 may be realized using one or more of the apparatuses or components shown in FIGS. 1-1, 1-2, and 3-1 through 7, such as the apparatus 101, interconnect 106, the IC device 110, the electronic device 111, first logic 112 implemented by and/or within the IC device 110, the provisioning service 120, the provisioning appliance 121, second logic 122 implemented at the provisioning service 120 (and/or by the provisioning appliance 121), the function (F) 140, the first function ($F_D$) 141 implemented by the first logic 112 of the IC device 110, the second function ($F_S$) 142 implemented by the second logic 122, and/or the like, which components may be further divided, combined, and so on. The devices and components of these figures generally represent hardware, such as electronic devices, printed circuit boards (PCBs), packaged modules, IC chips, or circuits; firmware; software; or a combination thereof.

The provisioning process 200 may be configured to provision an IC device 110, which may include securely transferring provisioning data 130 to the IC device 110 in a secure transfer procedure 205 that includes a plurality of steps (or secure transfer operations 210). The provisioning process 200 may be implemented in accordance with a function (F) 140 that includes and/or defines a first function ($F_D$) 141 implemented by internal, on-chip circuitry of the IC device 110 (by first logic 112 of the IC device 110) and a second function ($F_S$) 142 to be implemented by the provisioning service 120 (by second logic 122).

At 204, the provisioning service 120 initiates a provisioning process 200 with the IC device 110. The provisioning service 120 may initiate the provisioning process 200 at 204 in response to a request from the IC device 110 (e.g., in response to a message communicated through the interconnect 106, network, or the like).

In some implementations, the provisioning service 120 may be configured to initiate the provisioning process at 204. In some aspects, the provisioning service 120 receives information pertaining to a batch of IC devices 110 to be provisioned (an IC dataset 203). The IC dataset 203 may be received from an IC manufacturer, fabricator, supplier, partner, carrier, service provider, and/or the like. The IC dataset 203 may include any suitable information pertaining to the IC devices 110, including, but not limited to: a list of IC identifiers ($ID_S$) 224, provisioning data 130 for the IC devices 110, specifications of the IC devices 110, information pertaining to the architecture of the IC devices 110, information pertaining to the functionality of the IC devices 110, information pertaining to implementation of the first function ($F_D$) 141 by the IC devices 110, and/or the like.

In some aspects, the IC dataset 203 may include (and/or the provisioning service 120 may generate) initial, unique seed values ($S_1(ID_S)$) 220 for each IC identifier ($ID_S$) 224 of the IC dataset 203. The seed values ($S_1(ID_S)$) 220 may be configured to cover specified portions of each IC device 110. Alternatively, the initial seed values ($S_1(ID_S)$) 220-1 may be configured to cover the same portion of each IC device 110 and the provisioning service 120 may be configured to vary the portions specified by subsequent seed values $S_{2 \ldots N}(ID_S)$ 220-2 through $S_{2 \ldots N}(ID_S)$ 220-N generated for each IC device 110 in accordance with a predetermined pattern. The sequence of seed values $S_1(ID_S)$ 220 through $S_N(ID_S)$ generated for each IC device 110 may, therefore, vary from IC device 110 to IC device 110 (or identifier ($ID_S$) 224 to identifier ($ID_S$) 224).

In some aspects, reply verification data ($R_S$) may be generated for the precomputed seed values (S) 220, per the second function ($F_S$) 142. As disclosed herein, the reply verification data ($R_S$) for a seed value (S) 220 may include integrity verification data ($ITG_S$) 222, an expected IC identifier ($ID_S$) 224, a cryptographic key ($K_S$) 236, and/or the like. The provisioning service 120 may be further configured to acquire and/or generate provisioning data 130 for the IC identifiers ($ID_S$) 224 and/or partition the provisioning data 130 into a plurality of fragments 132. In some implementations, the provisioning data 130 for each IC device 110 are partitioned into a same number of fragments 132 (e.g., N fragments 132-1 through 132-N). Alternatively, the provisioning service 120 may be configured to vary the number of fragments 132 from IC device 110 to IC device 110 (or from identifier ($ID_S$) 224 to identifier ($ID_S$) 224), which results in varying the number of secure transfer operations 210 included in the corresponding provisioning processes 200. For example, the provisioning service 120 may partition the provisioning data 130 for a first IC device 110 into a first number of fragments 132 and partition the provisioning data 130 for a second IC device 110 into a second, different number of fragments 132. The provisioning process 200 implemented by the provisioning service 120 with the first IC device 110 may, therefore, include the first number of secure transfer operations 210, and the provisioning process 200 implemented with the second IC device 110 may include the second number of secure transfer operations 210. Varying the number of fragments 132 (and/or secure transfer operations 210) may further obfuscate implementation of the provisioning process 200 (and/or function (F) 140).

The provisioning service 120 may implement provisioning processes 200 with the IC devices 110 identified by the IC dataset 203. In some aspects, the provisioning service 120 may provision the IC devices 110 sequentially (one by one). For instance, in the FIG. 2-1 example 201, the provisioning process 200 is implemented with a single IC device 110. The disclosure, however, is not limited in this regard. In some implementations, the provisioning service 120 may provision a plurality of IC devices 110 concurrently and/or at least partially in parallel, e.g., implement a plurality of provisioning processes 200 concurrently and/or at least partially in parallel, each provisioning process 200 implemented with a respective IC device 110 (and/or corresponding to a respective IC identifier ($ID_S$) 224).

Initiating a provisioning process 200 with an IC device at 204 may include dividing provisioning data 130 of the IC device 110 into a plurality of fragments 132 (e.g., into N fragments 132-1 through 132-N). The provisioning data 130 may include sensitive cryptographic material, such as a key, a master key, a UMK, or the like. The provisioning data 130 may be partitioned such that each fragment 132 of the provisioning data 130 includes at least a portion of the cryptographic material (e.g., at least a portion of the UMK).

In response to generating or retrieving the fragments 132 of the provisioning data 130 at 204, the provisioning service 120 may configure the second logic 122 to implement a secure transfer procedure 205 with the IC device 110. The secure transfer procedure 205 may include a plurality of steps, each step including a respective secure transfer operation 210 of a plurality of secure transfer operations 210. Each step of the secure transfer procedure 205 (each secure transfer operation 210) may be configured to securely transfer a fragment 132 of the provisioning data 130 to the IC device 110 in response to completing a validation operation 240. As illustrated in FIG. 2-1, the secure transfer procedure 205 of the provisioning process 200 may include N secure transfer operations 210-1 through 210-N, each configured to securely transfer a respective one of the fragments 132-1 through 132-N of the provisioning data 130.

To implement the first secure transfer operation 210-1, the second logic 122 is configured to: a) send a seed value ($S_1$) 220-1 to the IC device 110 and b) implement a validation operation 240-1 on the reply data ($R_{D,1}$) 238-1 returned from the IC device 110 responsive to the seed value ($S_1$) 220-1. If validation operation 240-1 is successful, the second logic 122 may continue the secure transfer operation 210-1; otherwise, the secure transfer operation 210-1 (and corresponding provisioning process 200) may fail and/or be terminated.

The first logic 112 of the IC device 110 may be configured to produce one or more outputs responsive to the seed value ($S_1$) 220-1, which may include, but are not limited to: IC input data ($ICID_{D,1}$), integrity data ($ITG_{D,1}$), an IC identifier ($ID_{D,1}$), a cryptographic key ($K_{D,1}$) 236-1, and/or reply data ($R_{D,1}$) 238-1. The IC input data ($ICID_{D,1}$) may configure the first logic 112 to generate integrity data ($ITG_{D,1}$) that covers the portion of the IC device 110 specified by the seed value ($S_1$) 220-1. The reply data ($R_{D,1}$) 238-1 may include and/or be derived from one or more of the IC input data ($ICID_{D,1}$), integrity data ($ITG_{D,1}$), IC identifier ($ID_{D,1}$), and/or the like. The first logic 112 may be further configured to generate a cryptographic key ($K_{D,1}$) 236-1 for the secure transfer operation 210-1 (e.g., responsive to the seed value ($S_1$) 220-1). The cryptographic key ($K_{D,1}$) 236-1 may be configured to correspond to the cryptographic key ($K_{S,1}$) 226-1 generated at the provisioning service 120 (and vice versa), as disclosed herein.

The second logic 122 may be further configured to implement a validation operation 240-1 in response to receiving the reply data ($R_{D,1}$) 238-1 from the IC device 110. The validation operation 240-1 may include comparing the reply data ($R_{D,1}$) 238-1 generated at the IC device 110 per the first function ($F_D$) 141 to the reply verification data ($R_{S,1}$) 228-1 calculated per the second function ($F_S$). More specifically, the validation operation 240-1 may include comparing the device-side, on-chip integrity data ($ITG_{D,1}$) and/or IC identifier 234 ($ID_D$) returned from the IC device 110 to the integrity verification data ($ITG_{S,1}$) and/or IC identifier 224 ($ID_S$). The validation operation 240-1 may, therefore, validate both the: a) identity of the IC device 110, and b) the on-chip RTL implementation of the portion of the IC device 110 specified by the seed value ($S_1$) 220-1 (e.g., the portion of the IC device 110 covered by the integrity data ($ITG_{D,1}$) included in the reply data ($R_{D,1}$) 238-1).

In the FIG. 2-1 example, the validation operation 240-1 is successful and, as such, the second logic 122 may complete the secure transfer operation 210-1. To complete the secure transfer operation 210-1, the second logic 122 may be configured to: c) generate a cryptographic key ($K_{S,1}$) 226-1 (or retrieve a precomputed cryptographic key ($K_{S,1}$) 226-1), d) encrypt the fragment 132-1 with the cryptographic key ($K_{S,1}$) 226-1, and e) send the encrypted fragment 242-1 ({132-1}226-1) to the IC device 110. The cryptographic key ($K_{S,1}$) 226-1 may be derived, at least in part, from one or more of the seed value ($S_1$) 220-1, the reply verification data ($R_{S,1}$) 228-1, reply data ($R_{D,1}$) 238-1, and/or the like, as disclosed herein.

The first logic 112 may be configured to receive the encrypted fragment 242-1 ({132-1}226-1) from the provisioning service 120 (and/or second logic 122) and store information pertaining to the secure transfer operation 210-1 within a memory of the IC device 110. The first logic 112 may be configured to record secure transfer data entries (entries 250) for respective secure transfer operations 210. The entries 250 may include any suitable information pertaining to a secure transfer operation 210, including the encrypted fragment {132}226, corresponding cryptographic key 236, seed value 220, IC input data ($ICID_D$), integrity data ($ITG_D$), reply data 238 ($R_D$), and/or the like. As illustrated, the first logic 112 may record an entry 250-1 that includes the encrypted fragment 242-1 ({132-1}226-1) and cryptographic key ($K_{D,1}$) 236-1 of the secure transfer operation 210-1 within a memory of the IC device 110. In some implementations, the IC device 110 may be disconnected from power between one or more steps of the provisioning process 200. For example, steps of the provisioning process 200 may be distributed between different IC manufacturing equipment and/or may be performed at different locations. The first logic 112 may, therefore, store entries 250 within non-volatile memory of the IC device 110 to ensure that such data are retained between throughout the provisioning process 200. The first logic 112 may be further configured to notify the provisioning service 120 that the encrypted fragment 242-1 ({132-1}226-1) was received and/or the entry 250-1 was recorded at the IC device 110.

The provisioning service 120 (and/or second logic 122) may implement secure transfer operations 210 until a failure occurs or the N secure transfer operations 210 are successfully completed. The second logic 122 may implement the secure transfer operations 210 sequentially and/or in serial (e.g., from secure transfer operation 210-1 to secure transfer operation 210-N). Alternatively, the second logic 122 may implement the N secure transfer operations 210 in an arbitrary or random order. In some implementations, the second logic 122 may implement secure transfer operations 210 concurrently and/or at least partially in parallel.

In the FIG. 2-1 example 201, the second logic 122 completes secure transfer operation 210-1 and, in response, implements subsequent secure transfer operations 210, including secure transfer operation 210-N. To implement secure transfer operation 210-N, the second logic 122 sends seed value ($S_N$) 220-N to the IC device 110 and performs a validation operation 240-N on the reply data ($R_{D,N}$) 238-N returned from the IC device 110 responsive to the seed value ($S_N$) 220-N.

In response to the seed value ($S_N$) 220-N, the first logic 112 implemented by the IC device 110 generates one or more of IC input data ($ICID_{D,N}$), integrity data ($ITG_{D,N}$), IC identifier ($ID_{D,N}$), cryptographic key ($K_{D,N}$) 236-N, and/or reply data ($R_{D,N}$) 238-N, as disclosed herein. The first logic 112 may be further configured to return the reply data ($R_{D,N}$) 238-N to the provisioning service 120 responsive to the seed value ($S_N$) 220-N.

The provisioning service 120 receives the reply data ($R_{D,N}$) 238-N and, in response, implements validation operation 240-N. The validation operation 240-N may include comparing the reply data ($R_{D,N}$) 238-N to reply verification data ($R_{S,N}$) 228-N, as disclosed herein. More specifically, the validation operation 240-N may include validating: a) the identity of the IC device 110, and b) the on-chip RTL implementation of the portion of the IC device 110 specified by the seed value ($S_N$) 220-N. If the validation operation 240-N is successful, the second logic 122 may complete the secure transfer operation 210-N (and may terminate the secure transfer operation 210-N and provisioning process 200 otherwise). In the FIG. 2-1 example, the reply data ($R_{D,N}$) 238-N is validated and, as such, the second logic 122 completes the secure transfer operation 210-N by: generating a cryptographic key ($K_{S,N}$) 226-N, encrypting the fragment 132-N with the cryptographic key ($K_{S,N}$) 226-N, and sending the encrypted fragment 242-N ({132-N}226-N) to the IC device 110. The first logic 112 receives the encrypted fragment 242-N ({132-N}226-N) and records a corresponding entry 250-N within volatile or non-volatile memory of the IC device 110.

At 215, the provisioning service 120 (and/or second logic 122) confirms that the secure transfer procedure 205 has been successfully completed. More specifically, the provisioning service 120 (and/or second logic 122) confirms that each of the secure transfer operations 210-1 through 210-N has been completed successfully. In response, the provisioning service 120 instructs the IC device 110 to complete the provisioning process 200. The provisioning service 120 may send a message 212 to the IC device 110, such as a command, directive, notification, or the like. The message 212 may be configured to cause the first logic 112 to reconstruct the provisioning data 130 at 252. The provisioning data 130 may be reconstructed from the entries 250 stored within a memory of the IC device 110. In the FIG. 2-2 example, the provisioning data 130 may be reconstructed from entries 250-1 through 250-N, each entry 250 including a respective encrypted fragment 242 ({132}226) and corresponding cryptographic key ($K_D$). Reconstructing the provisioning data 130 may include decrypting the encrypted fragments 242-1 through 242-N using the corresponding cryptographic keys ($K_{D,1}$) 236-1 through ($K_{D,N}$) 236-N, combining the resulting decrypted fragments 132-1 through 132-N, and transferring the resulting provisioning data 130 into secure NV storage 114 of the IC device 110. The first logic 112 may be further configured to notify the provisioning service 120 (and/or second logic 122) that the provisioning data 130 was successfully reconstructed at the IC device 110.

FIG. 2-2 is a sequence diagram illustrating an example 202 of a secure transfer operation 210 of the disclosed provisioning process 200. The secure transfer operation 210 illustrated in FIG. 2-2 may correspond to any of the secure transfer operations 210-1 through 210-N of the example provisioning process 200 illustrated in FIG. 2-1. Aspects of the secure transfer operation 210 may be implemented in, for example, hardware (e.g., fixed logic circuitry or a processor in conjunction with a memory), firmware, software, or some combination thereof. The secure transfer operation 210 may be realized using one or more of the apparatuses or components shown in FIGS. 1-1, 1-2, and 3-1 through 7, such as the apparatus 101, interconnect 106, the IC device 110, the electronic device 111, first logic 112 implemented by and/or within the IC device 110, the provisioning service 120, the provisioning appliance 121, second logic 122 implemented at the provisioning service 120 (and/or by the provisioning appliance 121), the function (F) 140, the first function ($F_D$) 141 implemented by the first logic 112 of the IC device 110, the second function ($F_S$) 142 implemented by the second logic 122, and/or the like, which components may be further divided, combined, and so on. The devices and components of these figures generally represent hardware, such as electronic devices, PCBs, packaged modules, IC chips, or circuits; firmware; software; or a combination thereof.

In the FIG. 2-2 example, the secure transfer operation 210 may be implemented as a step of provisioning process 200 (and/or secure transfer procedure 205 of the provisioning process 200). As illustrated, each secure transfer operation 210 may involve a respective validation operation 240, key management operation, and/or encryption operation. The secure transfer operation 210 may be initiated by sending a seed value (S) 220 to IC device 110. In some implementations, the second logic 122 retrieves a predetermined seed value (S) 220 for the IC device 110. Alternatively, the second logic 122 may generate the seed value (S) 220 per the second function ($F_S$) 142. The seed value (S) may include and/or be based, at least in part, on the IC identifier ($ID_S$) of the IC device 110. Alternatively, or in addition, the seed value (S) may specify a portion of the IC device 110 to evaluate in the validation operation 240 of the secure transfer operation 210. The seed value (S) 220 may include, correspond to and/or be based, at least in part, on an expected IC input data ($ICID_S$), which may be configured to cause the first logic 112 to produce integrity data ($ITG_D$) covering a specified portion of the IC device 110. The seed value (S) may be included in a message 221 communicated through the interconnect 106 (by and/or through the interface 105 of the apparatus 101 or provisioning appliance 121).

The second logic 122 may be further configured to calculate reply verification data ($R_S$) 228 corresponding to the seed value (S) 220. The reply verification data ($R_S$) 228 may be calculated per the second function ($F_S$) 142 (e.g., may be derived from the seed value (S) 220 per the second function ($F_S$) 142). The reply verification data ($R_S$) 228 may include integrity verification data ($ITG_S$) 222, an IC identifier ($ID_S$) 224, and/or the like. The integrity verification data ($ITG_S$) 222 may be generated by the second function ($F_S$) 142 based, at least in part, on the portion of the IC device 110 specified by the seed value (S) 220, e.g., $ITG_S = F_{S\_ITG}(S)$, $ITG_S = F_{S\_ITG}(EC_S)$, or $ITG_S = F_{S\_ITG}(F_{S\_EC}(S))$. The IC identifier ($ID_S$) 224 may be predetermined and/or retrieved from information pertaining to a batch or group of IC devices 110 to be provisioned (e.g., from an IC dataset 203).

In response to receiving the seed value (S) 220, the first logic 112 of the IC device 110 generates one or more outputs per the first function ($F_D$) 141. The first logic 112 may be configured to: derive IC input data ($ICID_D$) 230 from the seed value (S) 220, use the IC input data ($ICID_D$) 230 to generate integrity data ($ITG_D$) 232 that covers the portion of the IC device 110 specified by the seed value (S) 220. The first logic 112 may also retrieve an IC identifier ($ID_D$) 234 from the IC device 110, generate a cryptographic key ($K_D$) 236, and return reply data ($R_D$) 238 to the provisioning service 120, as disclosed herein (in a message 239).

The second logic 122 receives the reply data ($R_D$) 238 produced by the IC device 110. The reply data ($R_D$) 238 may be included in a message 239 communicated through the interconnect 106, network, and/or the like. In response, the second logic 122 implements a validation operation 240. The validation operation 240 may include comparing the reply verification data ($R_S$) 228 to the reply data ($R_D$) 238 produced by the first logic 112 at the IC device 110. In some implementations, the validation operation 240 includes comparing the integrity verification data ($ITG_S$) 222 and/or expected IC identifier ($ID_S$) 224 to the integrity data ($ITG_D$) 232 and/or IC identifier ($ID_D$) 234 returned from the IC device 110. The validation operation 240 may, therefore, validate both: a) the identity of the IC device 110 (validate the IC identifier ($ID_D$) 234), and b) the on-chip RTL implementation of the portion of the IC device 110 covered by the integrity data ($ITG_D$) 232 returned from the IC device 110. If validation of the reply data ($R_D$) 238 fails, the secure transfer operation 210 may terminate without transferring the fragment 132 to the IC device 110. In addition, the secure transfer procedure 205 and provisioning process 200 may also be terminated (and deemed to have failed). Conversely, if the validation operation 240 is successful, the second logic 122, retrieves and/or generates a cryptographic key ($K_S$) 226 for the secure transfer operation 210, encrypts the fragment 132, and sends the encrypted fragment 242 ({132}226) to the IC device 110 (in an encrypted message 249).

The first logic 112 receives the encrypted fragment 242 ({132}226) and stores a corresponding entry 250 in volatile or non-volatile memory of the IC device 110. The entry 250 may include the encrypted fragment 242 ({132}226) and/or the cryptographic key ($K_D$) 236. The first logic 112 may reconstruct the provisioning data 130 from the entries 250 in response to completing the secure transfer operations 210 of the provisioning process 200, as disclosed herein.

Figures 1, 3:
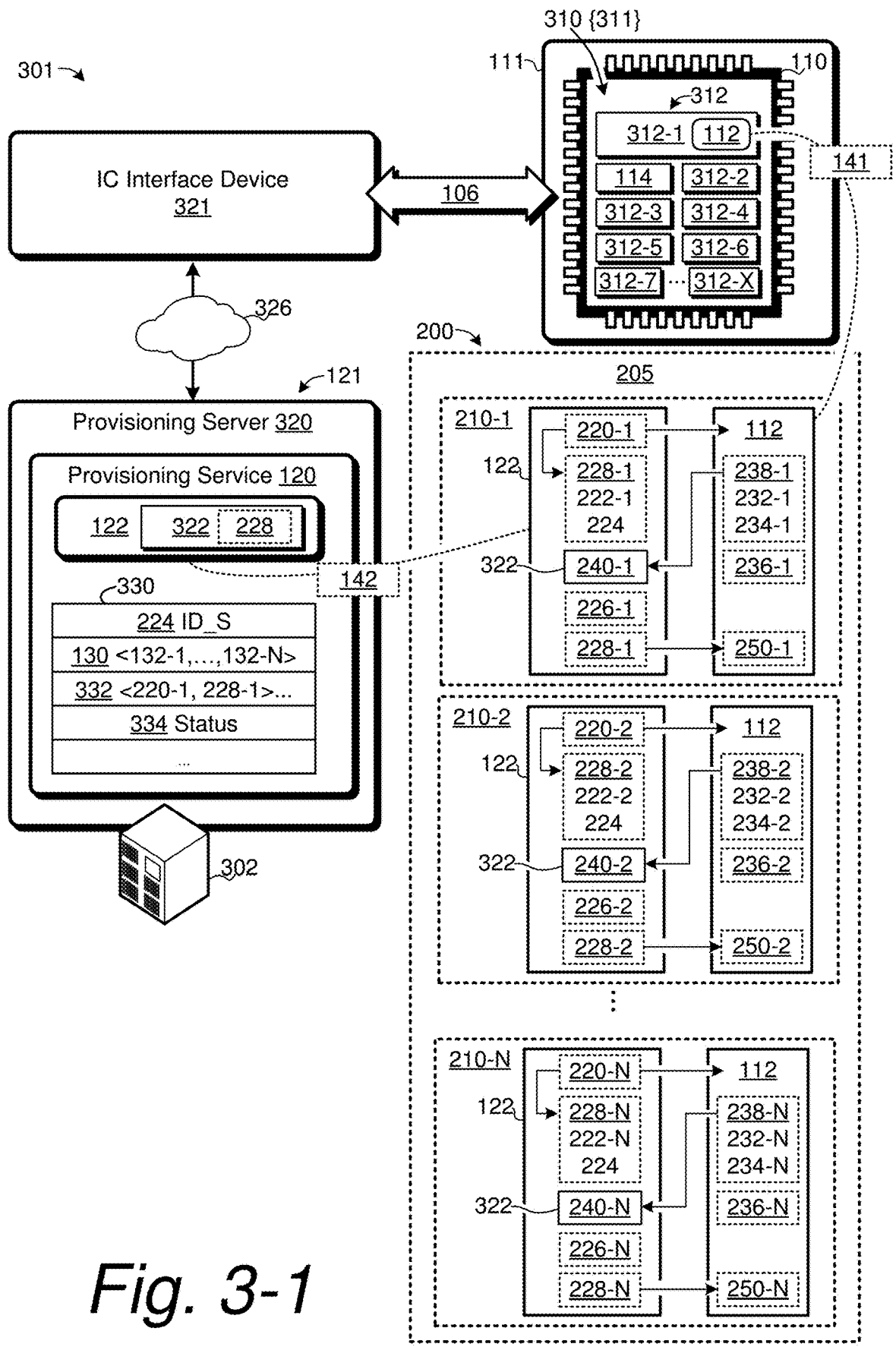
Figures 2, 3:
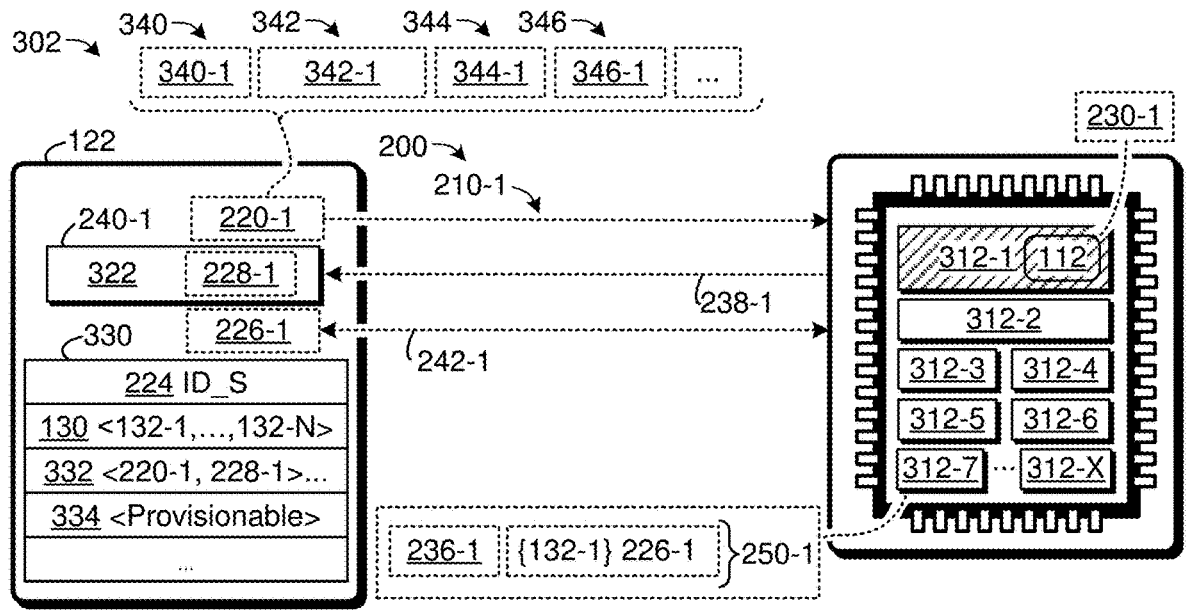
Figure 3:
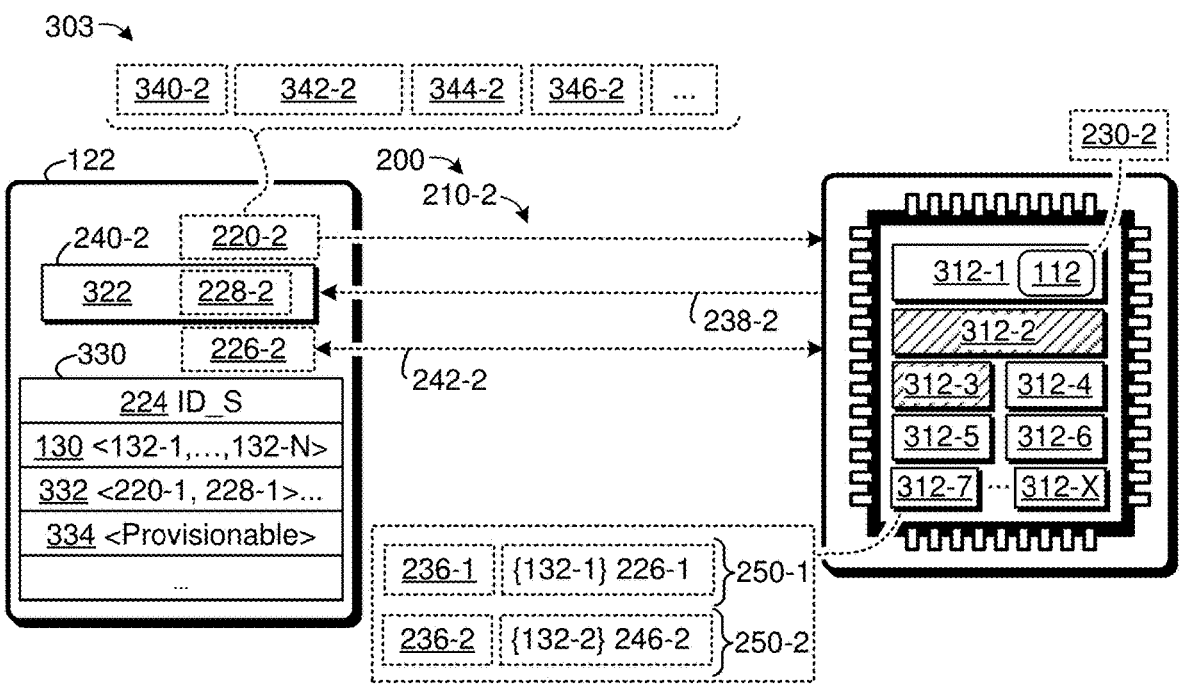

FIG. 3-1 illustrates at 301 an example 301 of a provisioning server 320 configured to implement secure provisioning with hardware verification (a provisioning process 200). The provisioning server 320 may include and/or be implemented by a computing system 302. The computing system 302 may include computing resources, such as a processor 102, memory 103, non-transitory storage 104, an interface 105, and/or the like (not shown in FIG. 3-1). The provisioning service 120 may be implemented by and/or be configured for operation on the computing system 302. The computing system 302 may, therefore, implement a provisioning appliance 121, as disclosed herein. The provisioning service 120 may be configured to implement provisioning processes 200 with IC devices 110 through and/or by use of an IC interface device 321. The provisioning server 320 may be coupled to the IC interface device 321 through any suitable mechanism, such as a network 326 (e.g., an IP network, LAN WAN, VPN, or the like). The IC interface device 321 may be coupled to the IC device 110 (and/or electronic device 111) through the interconnect 106. The provisioning server 320 may utilize the IC interface device 321 to inject data into the IC device 110 such as seed values(S) 220, encrypted fragments 242, commands, messages, and/or the like. The provisioning server 320 may be further configured to utilize the IC interface device 321 to receive and/or extract data from the IC device 110, such as reply data ($R_D$) 238 or the like. In some implementations, the provisioning server 320 and the IC device 110 may be disposed at different physical locations. The provisioning server 320 may be disposed in a secure location, such as a network operations center, secure operations center, may be distributed across a plurality of locations, or the like. Conversely, the IC interface device 321 may be co-located with the IC device 110. The IC interface device 321 may include any suitable mechanism for coupling the IC device 110 to the provisioning server 320. The IC interface device 321 may include computing resources, such as a processor, memory, communication interface(s), and/or the like (not shown in FIG. 3-1). The IC interface device 321 may include and/or be implemented by IC manufacturing equipment, IC interface equipment, IC testing equipment, IC validation equipment, IC provisioning equipment, and/or the like. In some aspects, the IC interface device 321 may be implemented by the electronic device 111 (or vice versa).

The provisioning service 120 may implement a provisioning process 200 with an IC device 110. The provisioning process 200 may be based on, inter alia, a function (F) 140 that is configured to be securely split between (or decomposed into) a first function ($F_D$) 141 to be implemented by IC devices 110 being provisioned and a second function ($F_S$) 142 to be implemented by the provisioning service 120 (by second logic 122 of the provisioning service 120), as follows: $F=F_S(F_D(I))$. By "securely" split is meant for example that the function (F) 140 may be split into the first function ($F_D$) 141 (first logic 112) and the second function 142 ($F_S$) (second logic 122), such that: a) knowledge of the design and/or implementation of the first logic 112 are not sufficient to reverse engineer the function (F) 140. The function (F) 140 may be further configured such that knowledge of the input(s) forwarded to the IC device 110 (e.g., seed values S 220) and/or outputs returned from the first function ($F_D$) 141, such as the reply data ($R_D$) 238, integrity data ($ITG_D$) 232, IC identifiers (ID) 234, and/or the like, are not sufficient to reverse engineer the function (F) 140 and/or produce or "spoof" valid reply data ($R_D$) 238. The function (F) 140, first function ($F_D$) 141 implemented by the first logic 112, and/or second function ($F_S$) 142 implemented by the second logic 122 may be configured to produce input and/or output data that appear random or arbitrary to an observer that does not have access to the function (F) 140. The function (F) 140, the first function ($F_D$) 141 implemented by the first logic 112, and/or second function ($F_S$) 142 implemented by the second logic 122 may incorporate one or more cryptographic functions, such as one-way functions, hash functions, key exchange algorithms, key generation algorithms, and/or the like.

The disclosed provisioning process 200 may include a secure transfer procedure 205 having a plurality of steps (a plurality of secure transfer operations 210). The secure transfer operations 210 may include respective validation operations 240 that are defined and/or based, at least in part, on the function (F) 140. More specifically, the first logic 112 of the IC device 110 implements the first function ($F_D$) to produce reply data ($R_D$) 238 and/or cryptographic keys ($K_D$) 236 responsive to seed values (S) and the second logic 122 of the provisioning service 120 implements the second function ($F_S$) 142 to, inter alia, validate the reply data ($R_D$) 238 and/or generate corresponding cryptographic keys ($K_S$) 226.

As illustrated in FIG. 3-1, an architecture 310 of the IC device 110 may define, inter alia, the set of functions implemented by the IC device 110 (the set of IC functions 311). The IC functions 311 may be implemented by components 312 of the IC device 110. A component 312 may include any suitable module, circuit, or the like, such as a power controller, a processor, a CPU, one or more CPU cores, a DSP, a bus, a CPU bus, a bridge, a peripheral bridge, a memory controller, memory, SRAM, DRAM, NV memory, an NV memory controller, Flash memory, a Flash controller, an I/O component, a parallel I/O (PIO) component, a serial I/O component, a communication interface, a radio-frequency (RF) interface, an RF front end, power manager, battery manager, and/or the like. In the FIG. 3-1 example, the component 312-1 of the IC device may include first logic 112 configured to implement the first function ($F_D$) 141, as disclosed herein.

The provisioning service 120 may securely transfer provisioning data 130 to the IC device 110 by and/or through aspects of the disclosed provisioning process 200. In some implementations, the provisioning service 120 maintains provisioning data pertaining to respective IC devices 110 and/or IC identifiers ($ID_S$) 224. The provisioning data may be maintained in respective records 330. A record 330 may include any suitable information pertaining to an IC device 110 including, but not limited to one or more of: an identifier of the IC device 110 (an IC identifier ($ID_S$) 224), provisioning data 130 for the IC device 110 (and/or fragments 132-1 through 132-N), predetermined data 332, a status 334 of the IC device 110, and so on. The predetermined data 332 may include precalculated values for one or more secure transfer operations 210, such as an initial seed value ($S_1$) 220-1, corresponding reply data ($R_{S,1}$), and/or the like. The status 334 may indicate a provisioning status of the identified IC device 110 (or IC identifier ($ID_S$) 224), such as whether provisioning is pending (e.g., "pending"), provisioning is authorized or is in progress (e.g., "can provision"), provisioning has been completed (e.g., "provisioned"), provisioning is not authorized or has failed (e.g., "failed" or "do not provision"), and/or the like. The provisioning service 120 may reference the status 334 to, inter alia, prevent more than one IC device 110 from utilizing the same IC identifier ($ID_S$) 224. The provisioning service 120 may, therefore, prevent IC devices 110 from "spoofing" identifiers of other IC devices 110. The status 334 may also thwart attempts to reverse engineer or otherwise disrupt the disclosed provisioning process through, inter alia, repeated attempts to provision unauthorized IC devices 110.

In some implementations, the second logic 122 includes, implements, and/or is coupled to validation logic 322. The validation logic 322 may be configured to validate reply data ($R_D$) 238 returned from IC devices 110. In some aspects the validation logic 322 implements validation operations 240 per a validation function ($F_{S\_V}$), as disclosed herein, e.g., $V=F_{S_V}(S, R_D)$, where V indicates whether the reply data ($R_D$) 238 are valid (or whether validation failed). Validating reply data ($R_D$) 238 may include comparing reply data ($R_D$) 238 returned from the IC device 110 (and/or elements thereof) to reply verification data ($R_S$) 228. In some aspects, the validation logic 322 retrieves predetermined reply verification data ($R_S$) 228 for a secure transfer operation 210 being performed with an IC device 110 from the record 330 of the IC device 110 (e.g., from the predetermined data 332). Alternatively, or in addition, the validation logic 322 may generate reply verification data ($R_S$) 228 for a secure transfer operation 210 based, at least in part, on the seed value (S) of the secure transfer operation 210 and the second function ($F_S$) 142.

In some aspects, the second function ($F_S$) 142 may include and/or define server-side functions for generating integrity verification data ($ITG_S$) 222, as follows: $ITG_S=F_{S\_ITG}(S)$, $ITG_S=F_{S\_ITG}(ICID_S)$, or $ITG_S=F_{S\_ITG}(F_{S\_ICID}(S))$, where $F_{S\_ICID}$ is a function configured to derive expected IC input data ($ICID_S$) from seed values (S), as disclosed herein. The validation logic 322 may validate reply data ($R_D$) 238 by, inter alia, comparing integrity verification data ($ITG_S$) 222 generated per ($F_{S\_ITG}$) to the integrity data ($ITG_D$) 232 returned from the IC device, e.g., $F_{S\_V}(S)=(ITG_D==ITG_S)$, $F_{S\_V}(S)=(ITG_D==F_{S\_ITG}(S))$, or the like. In some aspects, validating reply data ($R_D$) 238 may further include comparing an expected IC input data ($ICID_S$) to IC input data ($ICID_D$) 230 returned from the IC device 110, e.g., $F_{S\_V}(S)=((ICID_D==ICID_S)\&(ITG_D==ITG_S))$, $F_{S\_V}(S)=((ICID_D==F_{S\_ICID}(S))\&(ITG_D==F_{S\_ITG}(F_{S\_ICID}(S))))$, or the like.

In some aspects, the reply verification data ($R_S$) 228 retrieved and/or generated by the validation logic 322 may further include an IC identifier ($ID_S$) 224. The IC identifier ($ID_S$) 224 may be determined based, at least in part, on information pertaining to the IC devices 110 to be provisioned through the disclosed provisioning process, such as one or more records 330 (or IC dataset 203). Validating the reply data ($R_D$) 238 may include comparing the expected IC identifier ($ID_S$) 224 of the IC device 110 to the IC identifier ($ID_D$) 234 returned from the IC device 110. In some implementations, validating the reply data ($R_D$) 238 includes comparing the expected IC identifier ($ID_S$) 224 and integrity verification data ($ITG_S$) 222 to the IC identifier ($ID_D$) 234 and integrity data ($ITG_D$) 232 returned from the IC device 110, respectively, e.g., $F_{S\_V}(S)=((ID_D==ID_S)\&(ITG_D==F_{S\_ITG}(S)))$ or $F_{S\_V}(S)=((ID_D==F_{S\_ID}(S))\&(ITG_D==F_{S\_ITG}(S)))$.

Alternatively, or in addition, validating the reply data ($R_D$) may further include comparing the expected IC input data ($ICID_S$) to the IC input data ($ICID_D$) returned from the IC device, e.g., $F_{S\_V}(S)=((ID_D==ID_S)\&(ICID_D==F_{S\_ICID}(S))\&(ITG_D==F_{S\_ITG}(F_{S\_ICID}(S))))$.

The provisioning service 120 may select IC devices 110 to provision based, at least in part, on the status 334 of the IC devices 110 (as indicated by records 330 associated with the IC devices 110). In the FIG. 3-1 example, the provisioning service 120 may select the IC device 110 for provisioning in response to determining that the IC device 110 has not yet been provisioned and/or that provisioning has not yet been attempted (per the status 334 of the record 330 corresponding to the IC device 110).

The provisioning process 200 implemented with the IC device 110 transfers encrypted fragments 242 of the provisioning data 130 to the IC device 110 in a secure transfer procedure 205 that includes a plurality of steps (secure transfer operations 210). The provisioning data 130 may be partitioned into a plurality of fragments 132. In some implementations, the provisioning data 130 is divided in accordance with a partitioning scheme. The partitioning scheme may determine the quantity of fragments 132 into which the provisioning data 130 are divided, contents of the fragments 132, and/or the like. The quantity of steps (or secure transfer operations 210) included in the provisioning process 200 may be determined, at least in part, by the partitioning scheme (e.g., may be based on the number of fragments 132). In the FIG. 3-1 example, the provisioning data 130 are divided into fragments 132-1 through 132-N and, as such, the provisioning process 200 includes N secure transfer operations 210-1 through 210-N.

As illustrated in FIG. 3-2, the first secure transfer operation 210-1 may include sending a seed value (S 220-1 to the IC device 110. In some implementations, the seed value ($S_1$) 220-1 and corresponding reply verification data ($R_{S,1}$) 228-1 may be precomputed and stored within the record 330 of the IC device 110. Alternatively, the second logic 122 may be configured to generate the seed value (S 220-1 and reply verification data ($R_{S,1}$) 228-1 per the second function ($F_S$).

FIG. 3-2 further illustrates one example of a seed value(S) 220. A seed value(S) 220 may include any suitable information in any suitable format or encoding. A seed value(S) 220 may include one or more of: a header 340, IC seed data 342, identifier seed data 344, cryptographic seed data 346, and/or the like (e.g., the first seed value ($S_1$) 220-1 may include one or more of a header 340-1, IC seed data 342-1, identifier seed data 344-1, cryptographic seed data 346-1, and/or the like). The header 340 may include any suitable information pertaining to the seed value(S) 220, the secure transfer operation 210 associated with the seed value(S) 220, the corresponding secure transfer procedure 205, provisioning process 200, the provisioning service 120, and/or the like. In some implementations, the header 340 may include a seed identifier, such as a seed index, number, sequence code, or the like. The header 340 may indicate an order of the seed value(S) 220 and/or secure transfer operation 210 in a sequence of seed values(S) 220 and/or secure transfer operations 210, indicate the number of secure transfer operations 210 in the sequence (e.g., indicate that the seed value(S) 220 corresponds to secure transfer operation 210 D of N secure transfer operations 210), and/or the like. The IC seed data 342 may include information from which the first logic 112 may derive IC input data ($ICID_D$), as disclosed herein (per the first function ($F_D$) 141). The identifier seed data 344 may include the IC identifier ($ID_S$) 224 of the IC device 110 (e.g., the IC identifier ($ID_S$) 224 expected by the provisioning service 120). Alternatively, the identifier seed data 344 may include data from which the first logic 112 may derive the IC identifier ($ID_S$) 224 (per the first function ($F_D$) 141). In some implementations, seed values(S) 220 may further include cryptographic seed data 346, which may be used to generate corresponding cryptographic keys ($K_S$) 226 and ($K_D$) 236 at the provisioning service 120 and IC device 110, respectively.

As illustrated, the first logic 112 receives the seed value (S 220-1 and, in response, derives IC input data 230-1 ($ICID_{D,1}$), which may designate and/or enable a selected portion of the IC device 110, as disclosed herein. In the FIG. 3-2 example 302, the IC input data ($ICID_{D,1}$) 230-1 derived from the seed value (S 220-1 enables component 312-1 (and/or disables or ignores other components 312, such as components 312-2 through 312-X). In FIGS. 3-2 through 3-5, portions of the IC device 110 specified by seed values (S) 220 (e.g., IC seed data 342 and/or corresponding IC input data ($ICID_D$) 230) are highlighted with diagonal fill patterns.

In the FIG. 3-2 example 302, the first logic 112 derives the IC input data ($ICID_{D,1}$) 230-1 from the seed value (S 220-1, applies the IC input data ($ICID_{D,1}$) 230-1, and generates integrity data ($ITG_{D,1}$) 232-1 that covers the specified portion of the IC device 110 (e.g., component 312-1).

The integrity data ($ITG_{D,1}$) 232-1 may include the result of a scan chain operation performed within the component 312-1 per the IC input data ($ICID_{D,1}$) 230-1. The scan chain operation may include shifting input data (scan-in data) into the integrated circuitry of component 312-1 at a scan-in pin (or other element). The integrity data ($ITG_{D,1}$) 232-1 may include scan-out data produced responsive to shifting the scan-in data through the integrated circuitry of component 312-1. The scan chain states may be observed and/or captured at a scan-out pin (or other element) of the integrated circuitry. In some implementations, the first logic 112 is configured to derive the scan-in data used to produce the integrity data ($ITG_{D,1}$) 232-1 from the seed value ($S_1$) 220-1.

The first logic 112 may be further configured to retrieve an IC identifier ($ID_{D,1}$) 234-1 from the IC device 110 and derive a cryptographic key ($K_{D,1}$) 236-1. The cryptographic key ($K_{D,1}$) 236-1 may be derived, at least in part, from one or more of the seed value ($S_1$) 220-1 (e.g., cryptographic seed data 346-1), IC input data ($ICID_{D,1}$) 230-1, integrity data ($ITG_{D,1}$) 232-1, IC identifier ($ID_{D,1}$) 234-1, and/or the like. The logic 112 may be further configured to produce reply data ($R_{D,1}$) 238-1 responsive to the seed value ($S_1$) 220-1. The reply data ($R_{D,1}$) 238-1 may include one or more of the IC input data ($ICID_{D,1}$) 230-1, integrity data ($ITG_{D,1}$) 232-1, IC identifier ($ID_{D,1}$) 234, and/or the like.

The second logic 122 receives the reply data ($R_{D,1}$) 238-1 and, in response, implements a validation operation 240-1 to evaluate the reply data ($R_{D,1}$) 238-1 (by use of the validation logic 322). The validation operation 240-1 may include comparing the reply data ($R_{D,1}$) 238-1 to reply verification data ($R_{S,1}$) 228-1. The reply verification data ($R_{S,1}$) 228-1 may be retrieved from predetermined data 332 or generated by the second logic 122, as disclosed herein. In the FIG. 3-2 example 302, the reply data ($R_{D,1}$) 238-1 are successfully validated and, as such, the second logic 122 generates a cryptographic key ($K_{S,1}$) 226-1, and transmits an encrypted fragment 242-1 ({132-1}226-1) to the IC device 110. In response, the first logic 112 stores an entry 250-1 that includes the encrypted fragment 242-1 ({132-1}226-1) and corresponding cryptographic key ($K_{D,1}$) 226-1 within on-board memory of the IC device 110 (component 312-7). In some implementations, the first logic 112 notifies the provisioning service 120 that the encrypted fragment 242-1 ({132-1}226-1) was received and/or that the entry 250-1 was successfully recorded.

FIG. 3-3 illustrates an example 303 of a next secure transfer operation 210-2 of the provisioning process 200, which may be performed responsive to completing the first secure transfer operation 210-1. To implement the secure transfer operation 210-2, the second logic 122 generates a second seed value ($S_2$) 220-2. The second seed value ($S_2$) 220-2 may include a header 340-2, IC seed data 342-2, identifier seed data 344-2, cryptographic seed data 346-2, and/or the like.

In some implementations, the second logic 122 generates seed values ($S_k$) that incorporate information from previous secure transfer operations 210-$k$-1, such as previous seed values ($S_{k-1}$) 220-$k$-1, components of previous seed values ($S_{k-1}$) 220-$k$-1, components of previous reply data ($R_{D,k-1}$) 238-$k$-1, components of previous reply verification data ($R_{S,k-1}$) 228-$k$-1, previous cryptographic keys ($K_{S,k-1}$) 236-$k$-1, and/or the like. The sequence of seed values ($S_1$) 220-1 through ($S_N$) 220-N and/or corresponding cryptographic keys ($K_{S,1}$, . . . , $K_{S,N}$ and/or $K_{D,1}$, . . . , $K_{D,N}$) 226-1/236-1 through 226-N/236-N may be configured to create a key ladder. Furthermore, the second logic 122 may configure the seed values ($S_1$) 220-1 through ($S_N$) 220-N to cover different portions of the IC device 110 and, as such, may obfuscate generation of integrity data ($ITG_D$) 232 at the IC device 110 unpredictably. In some aspects, the second function ($F_S$) 142 implemented by the second logic 122 may include and/or define a function for generating seed values 220, as follows: $S_k = F_{S\_SV}(S_{k-1})$, $F_{S\_SV}(S_{k-1}, R_{D,k-1})$, or the like.

As illustrated, the portion of the IC device 110 specified by the seed value ($S_2$) 220-2 (e.g., IC seed data 342-1 and resulting IC input data ($ICID_{D,2}$) 230-2) differs from the portion specified by seed value ($S_1$) 220-1. The seed value ($S_1$) 220-1 specifies component 312-1, whereas the seed value ($S_2$) 220-2 specifies components 312-2 and 312-3. Accordingly, the integrity data ($ITG_{D,2}$) 232-2 produced by the first logic 112 responsive to the seed value ($S_2$) 220-2 covers components 312-2 and 312-3 (and excludes component 312-1 and/or 312-4 through 312-X).

The integrity data ($ITG_{D,2}$) 232-2 may include the result of a scan chain operation performed within components 312-2 and 312-3 per the IC input data ($ICID_{D,2}$) 230-2. The scan chain operation may include shifting input data (scan-in data) into integrated circuitry of components 312-2 and 312-3 at a scan-in pin (or other element). The integrity data ($ITG_{D,2}$) 232-2 may include scan-out data produced responsive to shifting the scan-in data through the integrated circuitry. The scan chain states may be observed and/or captured at a scan-out pin (or other element) of the integrated circuitry. In some implementations, the first logic 112 is configured to derive the scan-in data used to produce the integrity data ($ITG_{D,2}$) 232-2 from the seed value ($S_2$) 220-2.

Responsive to the seed value ($S_2$) 220-2, the first logic 112 may also retrieve an IC identifier ($ID_D$) 234-2, generate a cryptographic key ($K_{D,2}$) 236-2, and return reply data ($R_{D,2}$) 238-2 to the provisioning service 120. The second logic 122 performs a validation operation 240-2 to evaluate the reply data ($R_{D,2}$) 238-2 (by use of validation logic 322). In the FIG. 3-3 example 303, the validation is successful. Accordingly, the secure transfer operation 210-2 proceeds with the second logic 122 generating a cryptographic key ($K_{S,2}$) 226-2 and transmitting the encrypted fragment 242-2 ({132-2}226-2) to the IC device 110. The first logic 112 may then record an entry 250-2 that includes the encrypted fragment 242-2 ({132-2}226-2) and corresponding cryptographic key ($K_{D,2}$) 236-2, as disclosed herein.

Figures 3, 4:
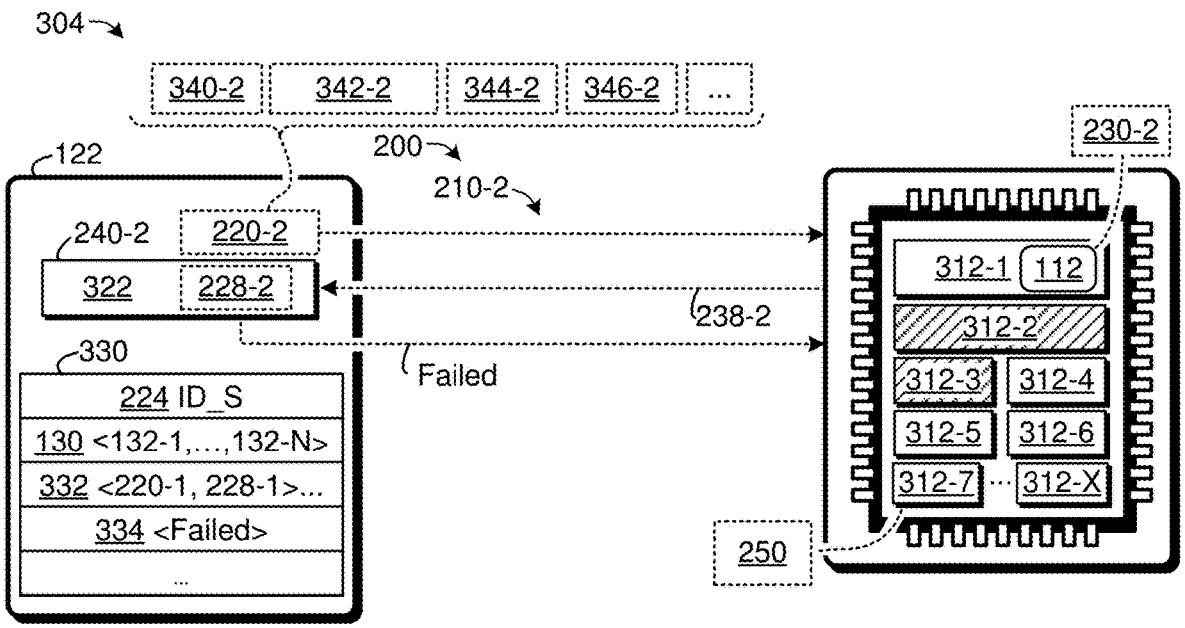

FIG. 3-4 illustrates an example 304 in which the secure transfer operation 210-2 fails. The secure transfer operation 210-2 may fail due to a failure of the validation operation 240-2; more specifically, failure to validate the reply data ($R_{D,2}$) 238-2 returned from the IC device 110 responsive to the seed value ($S_2$) 220-2. In response to failing to validate the reply data ($R_{D,2}$) 238-2, the second logic 122 may terminate the secure transfer operation 210-2 and/or corresponding provisioning process 200. The provisioning service 120 (and/or second logic 122) may be further configured to mark the IC device 110 as failed by, inter alia, recording a "failed" indicator in the status 334 of the record 330 associated with the IC device 110 (and/or IC identifier 224 thereof). In some implementations, the IC device 110 is notified of the failure and, in response, may clear and/or invalidate entries 250 pertaining to the provisioning process maintained within on-board memory (if any). The provisioning service 120 may be configured to handle validation failures in other ways. In some implementations, the provisioning service 120 may be configured to obfuscate validation failures.

In response to failure of a validation operation 240, the provisioning service 120 may flag the provisioning process 200 with the IC device 110 as failed but may not immediately terminate the provisioning process 200. Instead, the provisioning service 120 may act on the failure during a subsequent step of the provisioning process 200 (e.g., during a subsequent secure transfer operation 210 or the like). In this way, the provisioning service 120 may obfuscate the failure from the attacker. The attacker may not receive immediate feedback on whether their attempt to compromise the provisioning process 200 was successful. Moreover, the attacker may not know which secure transfer operation 210 (and/or corresponding validation operation 240) triggered the failure, which may inhibit efforts to refine the attack. In another example, the provisioning service 120 may be configured to modify or "poison" the provisioning process 200 in response to detection of a validation failure. Poisoning the provisioning process 200 may include modifying subsequent steps and/or secure transfer operations 210 of the poisoned provisioning process 200 by, inter alia, switching to a different provisioning algorithm, different function(s) (e.g., different functions $F_D$ 141 and/or $F_S$ 142), different seed values (S) 220, different cryptographic keys (and/or different cryptographic key exchange technique), different encryption algorithm, different communication mechanism(s), and/or the like. Therefore, if there are weaknesses in the encryption and/or other security mechanisms of the provisioning process 200, the attacker will not be able to learn anything more about the provisioning process 200 in subsequent steps (in subsequent, valid secure transfer operations 210).

The provisioning service 120 may be configured to switch to the poisoned provisioning process 200 transparently. From the perspective of an attacker, the poisoned provisioning process 200 may appear to be valid and complete successfully. Poisoning the provisioning process 200 may further include modifying the provisioning data 130 to be sent to the IC device 110 (e.g., modifying one or more fragments 132). The provisioning service 120 may generate "poisoned" provisioning data 130, which may be distinguishable from valid provisioning data 130. The modifications may be configured to remove sensitive information from the poisoned provisioning data 130 and/or indicate that provisioning of the IC device 110 failed. The failure may also be recorded in the status 334 of the record 330 associated with the IC device 110.

Figures 3, 4, 5:
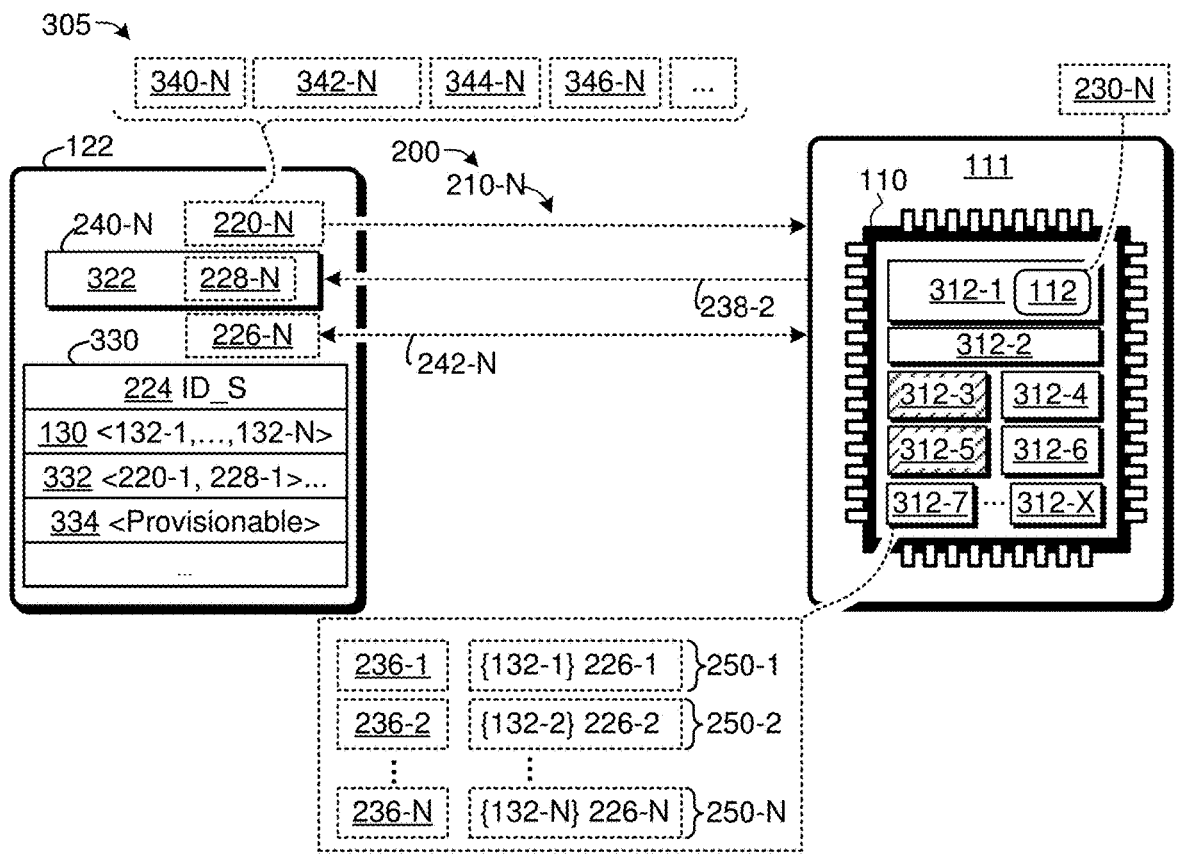

FIG. 3-5 illustrates an example 305 of implementation of a last secure transfer operation 210-N of the provisioning process. The secure transfer operation 210-N may be implemented in response to successful completion of the other N−1 secure transfer operations 210 (e.g., successful completion of secure transfer operations 210-1 through 210-N−1). As illustrated, the second logic 122 transfers a seed value ($S_N$) 220-N to the IC device 110, which may include one or more of a header 340-N, IC seed data 342-N, identifier seed data 344-N, cryptographic seed data 346-N, and/or the like, as disclosed herein. In response, the first logic 112 implemented by the IC device 110 produces IC input data ($ICID_N$) 230-N that, inter alia, enables components 312-3 and 312-5, generates integrity data ($ITG_{D,N}$) 232-N covering the specified portion, retrieves an IC identifier ($ID_{D,N}$) 234-N, generates a cryptographic key ($K_{D,N}$) 226-N, and returns reply data ($R_{D,N}$) 228-N to the provisioning service 120.

In some implementations, the integrity data ($ITG_{D,N}$) 232-N includes the result of a scan chain operation performed within the integrated circuitry of components 312-3 and 312-5. The scan chain operation may include shifting input data (scan-in data) into the integrated circuitry of components 312-1 and 312-3 at a scan-in pin (or other element). The integrity data ($ITG_{D,N}$) 232-N may include scan-out data produced responsive to shifting the scan-in data through the integrated circuitry. The scan chain states may be observed and/or captured at a scan-out pin (or other element) of the integrated circuitry. In some implementations, the first logic 112 is configured to derive the scan-in data from the seed value ($S_N$) 220-N.

The second logic 122 determines that the reply data ($R_{D,N}$) 228-N is valid (e.g., in a validation operation 240-N) and returns an encrypted fragment 242-N ({132-N}226-N) to the IC device 110. The first logic 112 at the IC device 110 stores an entry 250-N that includes the encrypted fragment 242-N ({132-N}226-N) and/or cryptographic key ($K_{D,N}$) 226-N, as disclosed herein.

FIG. 3-6 illustrates an example 306 of a provisioning process in which the N secure transfer operations 210 thereof have been successfully completed. As illustrated, completing the N secure transfer operations 210 may cause the first logic 112 to store encrypted fragments 242-1 through 242-N within the IC device 110, each including a respective fragment 132 of a plurality of fragments 132-1 through 132-N of the provisioning data 130. Each fragment 132 may be encrypted by a respective cryptographic key ($K_S$) 226 of a plurality of cryptographic keys ($K_S$) 226-1 through ($K_{S,N}$) 226-N. Completing the N secure transfer operations 210 may further include generating (and/or storing) a plurality of cryptographic keys ($K_D$) 236 at the IC device 110 each cryptographic key 236-1 ($K_{D,1}$) through 236-N ($K_{D,N}$) corresponding to a respective one of the cryptographic keys 226-1 ($K_{S,1}$) through 226-N ($K_{S,N}$). In some implementations, the cryptographic keys ($K_S$) 226 and ($K_D$) 236 are symmetric keys (e.g., cryptographic keys ($K_{S,1}$) 226-1 and ($K_{D,1}$) 236-1 may be same or equivalent symmetric keys, cryptographic keys ($K_{S,2}$) 226-2 and ($K_{D,2}$) 236-2 may be same or equivalent symmetric keys, and so on). The encrypted fragments 242-1 through 242-N and corresponding cryptographic keys ($K_{D,1}$, . . . ,$K_{D,N}$) 236-1 through 236-N may be stored within volatile or non-volatile memory resources of the IC device 110 (e.g., within respective entries 250-1 through 250-N).

In response to verifying that the N secure transfer operations 210 have been successfully completed, the provisioning service 120 (or second logic 122) may instruct the first logic 112 at the IC device 110 to reconstruct the provisioning data 130. The first logic 112 may reconstruct the provisioning data 130 by: decrypting the encrypted fragments 242 using the corresponding cryptographic keys ($K_D$) 236, combining the decrypted fragments 132, and transferring the resulting provisioning data 130 to secure NV storage 114 of the IC device 110. In the FIG. 3-6 example 306, the secure NV storage (e.g., secure NV storage 114) may be implemented by a component 312-X of the IC device 110, which may include, but is not limited to: an OTP memory, a security feature, a security component, a security subsystem, an enclave, a secure enclave, a keystore, a hardware-backed keystore, and/or the like. The first logic 112 may be further configured to remove the entries 250-1 through 250-N from the memory resources of the IC device 110. In some implementations, the first logic 112 may securely delete and/or erase the entries 250 such that the entries 250 cannot be retrieved and/or recovered by other components 312 of the IC device 110.

FIG. 4 illustrates at 400 another example of a system that includes an apparatus 101 for secure provisioning with hardware verification (a provisioning appliance 121). The apparatus 101 implements a provisioning service 120, which may be configured to provision a plurality of IC devices 110. In the FIG. 4 example, the provisioning service 120 is configured to provisioning IC devices 110-1 through 110-M. The IC devices 110-1 through 110-M may include IC devices 110 of a same batch, design, manufacturing run, or the like. IC devices 110-1 through 110-M may, therefore, have a same architecture 310 (e.g., implement a same set of IC functions 311 and/or include similar components 312). The provisioning server 320 and/or provisioning service 120 may be configured for operation on a computing system 302. The provisioning service 120 may implement provisioning processes 200 with respective IC devices 110 through an IC interface device 321, which may be co-located with one or more of the IC devices 110-1 through 110-M. The provisioning server 320 may be physically separated from the IC devices 110-1 through 110-M (and/or IC interface device 321). The provisioning server 320 may be coupled to the IC interface device 321 through a secure communication channel 426. The secure communication channel 426 may be established on and/or through an electronic communication network, such as a network 326 as illustrated in FIG. 3-1. The secure communication channel 426 may include but is not limited to: an encrypted communication channel, an authenticated communication channel, a Secure Sockets Layer (SSL) communication channel, and/or the like.

The provisioning service 120 may receive information pertaining to the IC devices 110, such as IC dataset 203, a list of IC identifiers 224, or the like (e.g., IC identifiers 224-1 through 224-M). The provisioning service 120 may include and/or be coupled to a data store 430. The provisioning service 120 may access and/or maintain records 330 pertaining to the IC devices 110 within the data store 430. In the FIG. 4 example, the data store 430 includes records 330-1 through 330-M, each corresponding to a respective IC device 110-1 through 110-M (or IC identifier 224-1 through 224-M). The records 330 may include any suitable information pertaining to the IC devices 110, as disclosed herein.

The provisioning service 120 may provision each IC device 110-1 through 110-M. The provisioning service 120 may forward initial seed values ($S_1$) 220-1 to respective IC devices 110, wait for reply data ($R_{D,1}$) 238-1, and proceed with the provisioning process 200 accordingly (e.g., based on whether validation of the reply data ($R_{D,1}$) 238-1 is successful). The provisioning service 120 may update records 330 in response to implementing provisioning processes 200 with the corresponding IC devices 110.

As illustrated, the provisioning service 120 may have successfully provisioned IC device 110-1 and, as such, the status 334-1 of the corresponding record 330-1 may indicate that the IC device 110-1 (and IC identifier 224-1) is provisioned. Based on the status 334-1, the provisioning service 120 may reject subsequent requests or attempts to provision IC device(s) 110 with IC identifier ($ID_S$) 224-1. As also illustrated, the status 334-2 may indicate that the provisioning process 200 attempted with an IC device 110 with IC identifier ($ID_S$) 224-2 failed. Accordingly, the provisioning service 120 may reject requests or attempts to provision IC device(s) 110 with IC identifier 224-2. As further illustrated in FIG. 4, the status 334-M for IC identifier 224-M indicates that the IC device 110-M has not been provisioned (and a failed attempt to provision the IC device 110-M has not been made). Accordingly, the provisioning service 120 may attempt to initiate a provisioning process 200 with the IC device 110-M and/or accept requests to provision an IC device 110 associated with the IC identifier ($ID_S$) 224-M.

FIG. 5 illustrates at 500 another example of a system that includes a server for secure provisioning with hardware verification (a provisioning server 320 configured to implement a provisioning service 120). The provisioning server 320 may include and/or be implemented by a computing system 302 (e.g., a provisioning appliance 121). The computing system 302 may include computing resources, such as a processor 102, memory 103, non-transitory storage 104, an interface 105, and/or the like (not shown in FIG. 5). The provisioning service 120 may be configured to provision a plurality of IC devices 110 (e.g., IC devices 110-1 through 110-P). The provisioning service 120 may interface with the IC devices 110 through an IC interface device 321, as disclosed herein. The provisioning service 120 may be coupled to the IC interface device 321 through an electronic communication mechanism 526, which may include, but is not limited to: a wired connection, a wireless connection, a network connection (a connection through a network 326), a secure network connections (e.g., a secure communication channel 426), and/or the like. The IC devices 110 may have different architectures 310. For example, each IC device 110 may correspond to one of a plurality of architectures 310-1 through 310-L. As disclosed herein, the architecture 310 of an IC device 110 may correspond to, inter alia, the design of the IC device 110, the RTL design of the IC device 110, and/or the like. The architecture 310 may, therefore, define the set of IC functions 311 implemented by the IC device 110, the components 312 or 512 of the IC device 110, and so on. In the FIG. 5 example, each architecture 310-1 through 310-L may correspond to a respective set of IC functions 311-1 through 311-L (and/or respective set of components 312 or 512). For example, the architecture 310-1 may correspond to a set of IC functions 311-1 implemented by components 312-1 through 312-X, the architecture 310-L may correspond to a different set of IC functions 311-L implemented by components 512-1 through 512-Y, and so on.

In the FIG. 5 example, each IC device 110-1 through 110-P implements one of the architectures 310-1 through 310-L. As illustrated, IC device 110-1 implements architecture 310-1, IC device 110-P implements architecture 310-L, and so on. IC device 110-1 may implement a first set of IC functions 311-1 and include a first set of components 312-1 through 312-X, as defined by architecture 310-1. IC device 110-P may include a different set of IC functions 311-L and include a different set of components 512-1 through 512-Y per architecture 310-L.

The architecture 310 of an IC device 110 may impact the implementation of the function (F) 140 of the provisioning process 200, including the first function ($F_D$) 141 implemented by the first logic 112 and/or second function ($F_S$) 142 implemented by the provisioning service 120 (e.g., the second logic 122). For example, the architecture 310 of an IC device 110 may define the portions of the IC device 110 that can be covered by integrity data ($ITG_D$) 232 produced by the first logic 112. More specifically, the architecture 310 of an IC device 110 may determine the set of IC functions 311 (and/or corresponding components 312 or 512) that can be specified by seed values (S) 220, enabled by IC input data ($ICID_D$) 230, and/or covered by the resulting integrity data ($ITG_D$) 232. Moreover, since the integrity data ($ITG_D$) 232 is configured to characterize the structure and/or state of specified portions of IC devices 110, the architecture 310 of an IC device 110 may also determine the integrity data ($ITG_D$) 232 produced by an IC device 110 (and/or expected ($ITG_D$) 222) responsive to respective seed values (S) 220.

In some aspects, the provisioning service 120 implements a plurality of functions (F) 140, or a plurality of different versions of the function (F) 140, each corresponding to a respective IC device architecture 310. In the FIG. 5 example, the provisioning service 120 implements functions ($F_1$) 140-1 through ($F_L$) 140-L, each corresponding to a respective one of the architectures 310-1 through 310-L. The functions ($F_1$) 140-1 through ($F_L$) 140-L may be configured to be securely split between respective first functions ($F_{1,D}$) 141-1 through ($F_{L,D}$) 141-L and respective second functions ($F_{1,S}$) 142-1 through ($F_{L,S}$) 142-L, as disclosed herein.

The IC devices 110 may include first logic 112 configured to implement the first function ($F_D$) 141. In the FIG. 5 example, the first logic 112 of each IC device 110 is configured to implement the first function ($F_D$) 141 (or version of the first function ($F_D$) 141) corresponding to the architecture 310 of the IC device 110. As illustrated, the first logic 112-1 of IC device 110-1 is configured to implement function ($F_{1,D}$) 141-1 corresponding to architecture 310-1, the first logic 112-L of IC device 110-P is configured to implement function ($F_{L,D}$) 141-L corresponding to architecture 310-L, and so on.

The second logic 122 implemented by the provisioning service 120 may be configured to implement provisioning processes 200 with different types of IC devices 110 (e.g., IC devices 110 having different architectures 310). More specifically, the second logic 122 can be configured to implement a plurality of different second functions ($F_S$) 142, and/or versions of the second function ($F_S$) 142, each corresponding to a respective one of the architectures 310-1 through 310-L and/or a respective one of the first functions ($F_{D,1}$) 141-1 through ($F_{D,L}$) 141-L. In the FIG. 5 example, the second logic 122 includes and/or is coupled to architecture-specific logic 522 configured to implement second function(s) ($F_S$) 142 corresponding to respective architectures 310. As illustrated, the second logic 122 may include architecture-specific logic 522-1 through 522-L configured to implement second functions ($F_{S,1}$) 142-1 through ($F_{S,L}$) 142-L, respectively.

In some implementations, the provisioning service 120 may be configured to determine the architecture 310 of IC devices 110. The provisioning service 120 may determine the architecture 310 of an IC device 110 from, inter alia, the IC identifier ($ID_S$) 224 of the IC device 110. Alternatively, or in addition, information pertaining to architecture 310 of one or more of the IC devices 110 may be included in IC dataset 203 pertaining to the IC devices 110.

In the FIG. 5 example, the records 330 pertaining to the IC devices 110 may include architecture metadata 510. The architecture metadata 510 of an IC device 110 may indicate the architecture 310 of the IC device 110. The architecture metadata 510 may include an identifier of the architecture 310 of the IC device 110, or the like. In some aspects, the architecture metadata 510 of an IC device 110 may identify the first function ($F_D$ 141), or version of the first function ($F_{D,1}$) 141-1 through ($F_{D,L}$) 141-L, implemented by the first logic 112 of the IC device 110. Alternatively, or in addition, the architecture metadata 510 may identify architecture-specific logic 522 for the IC device 110 (e.g., may specify one of the architecture-specific logic 522-1 through 522-L for each IC device 110). The provisioning service 120 (and/or second logic 122) may utilize the architecture metadata 510 of respective IC devices 110 to implement provisioning processes 200 with the respective IC devices 110. More specifically, the provisioning service 120 (and/or second logic 122) may utilize the architecture metadata 510 of an IC device 110 to select architecture-specific logic 522 for a provisioning process 200 with the IC device 110.

Figures 3, 4, 5, 6:
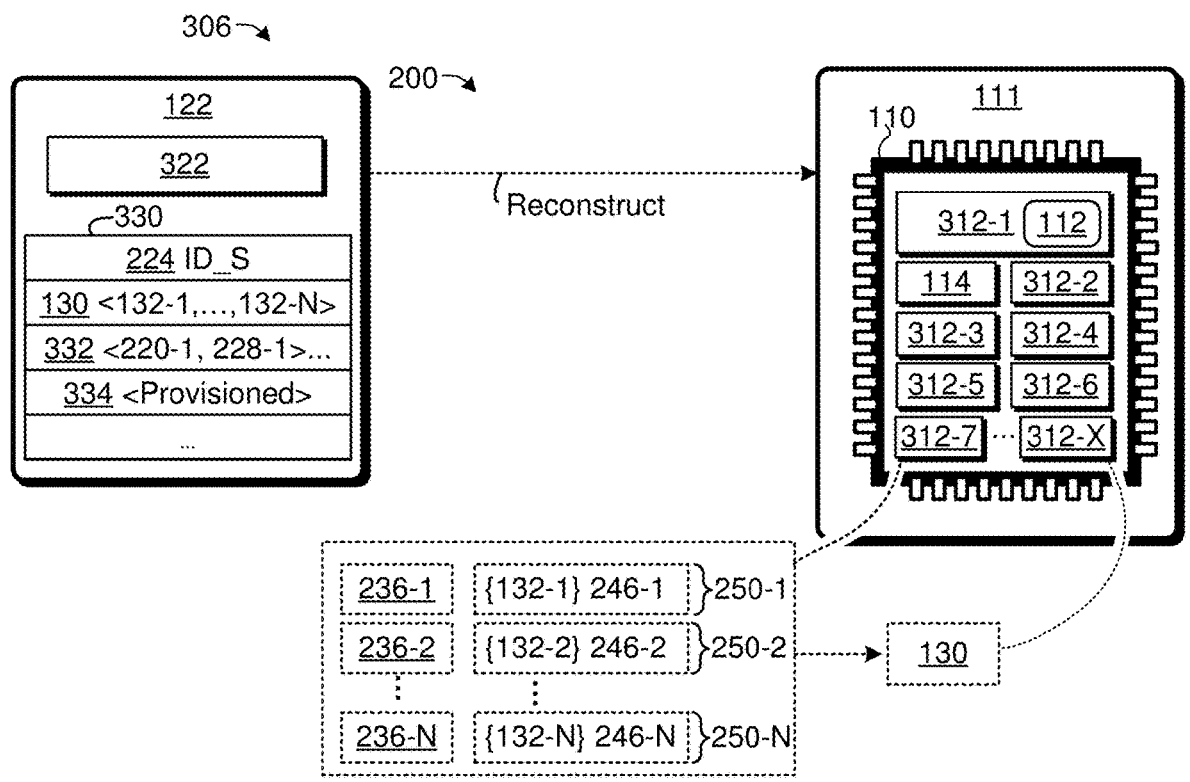
Figure 4:
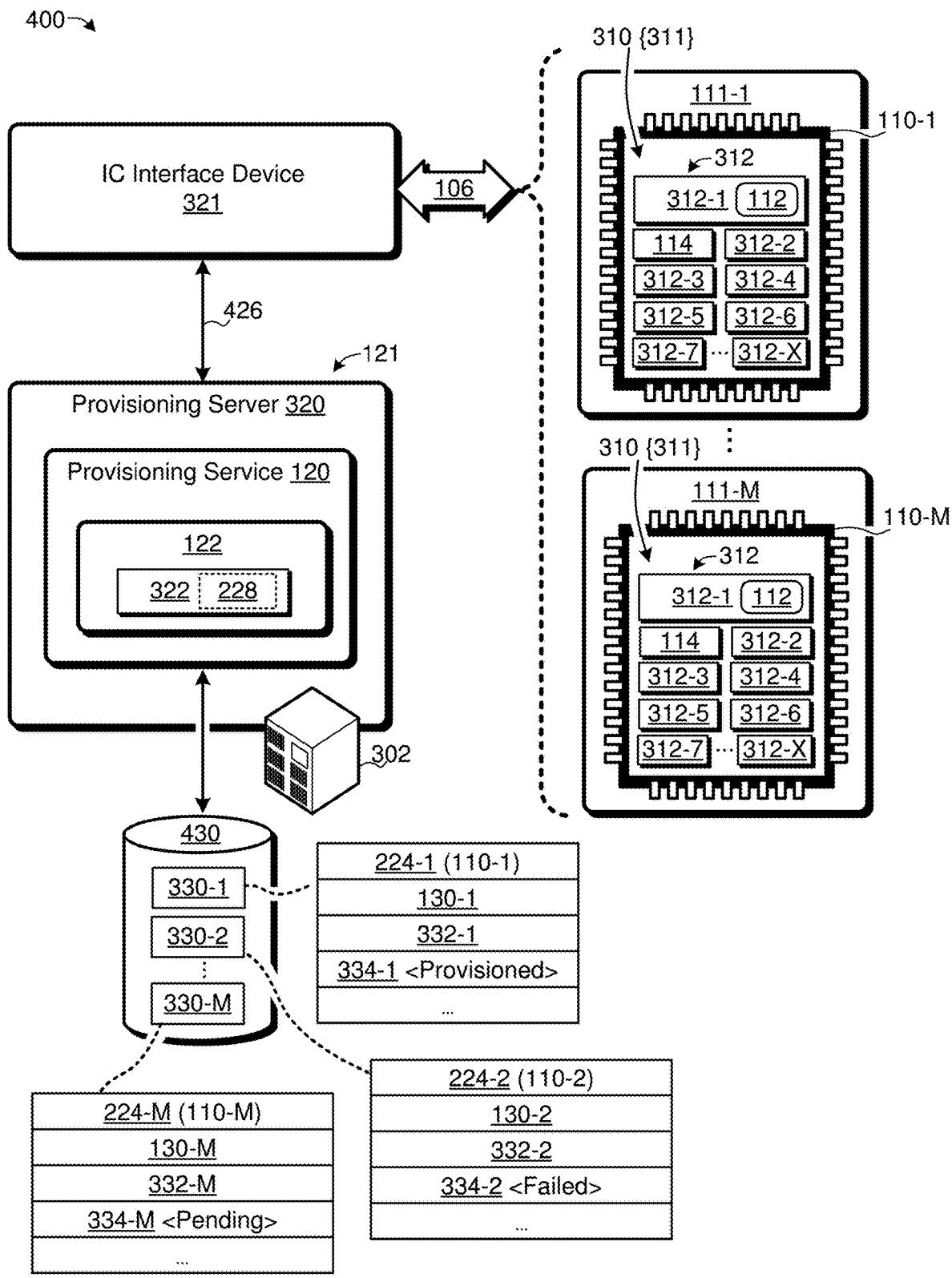
Figure 5:
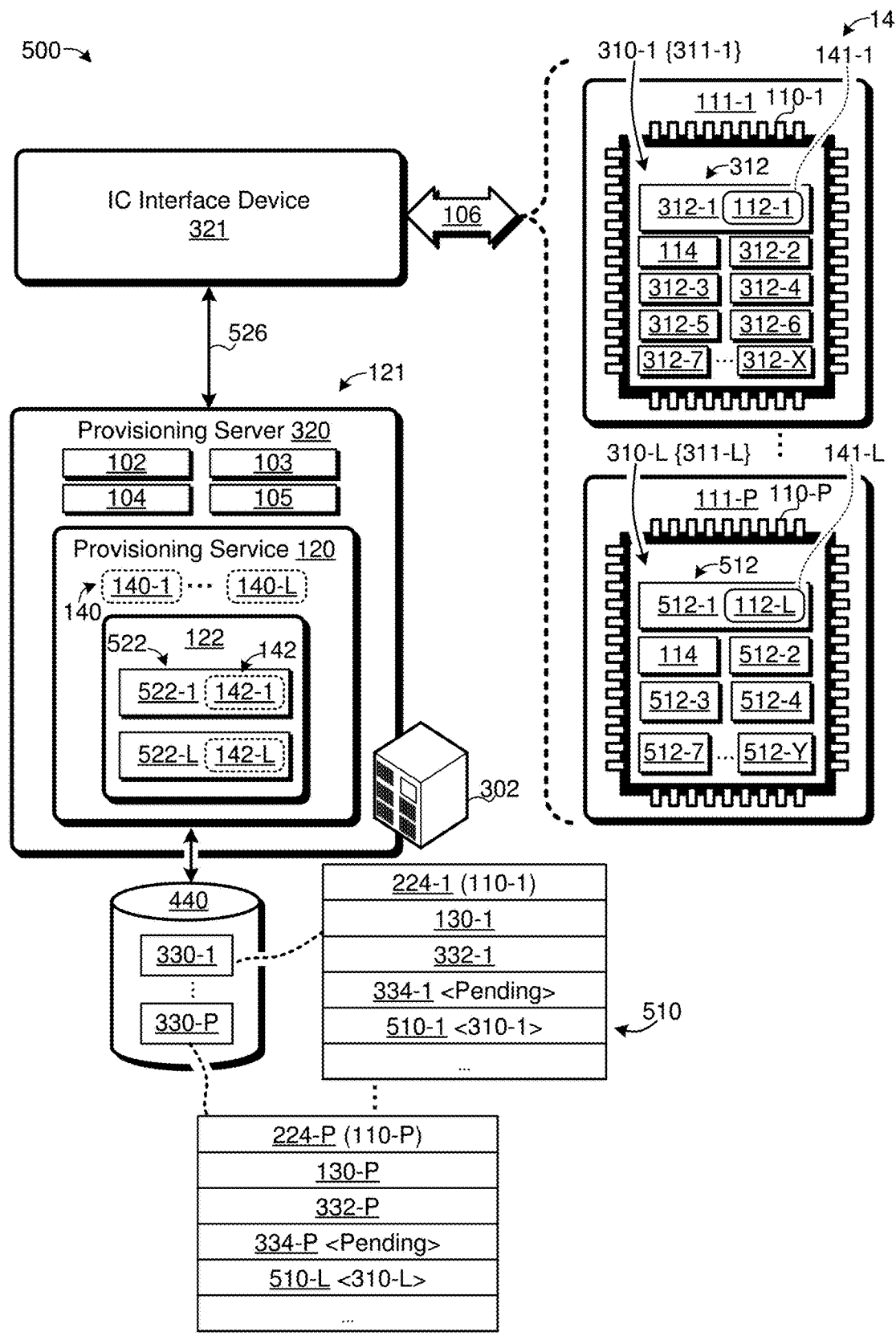
Figure 6:
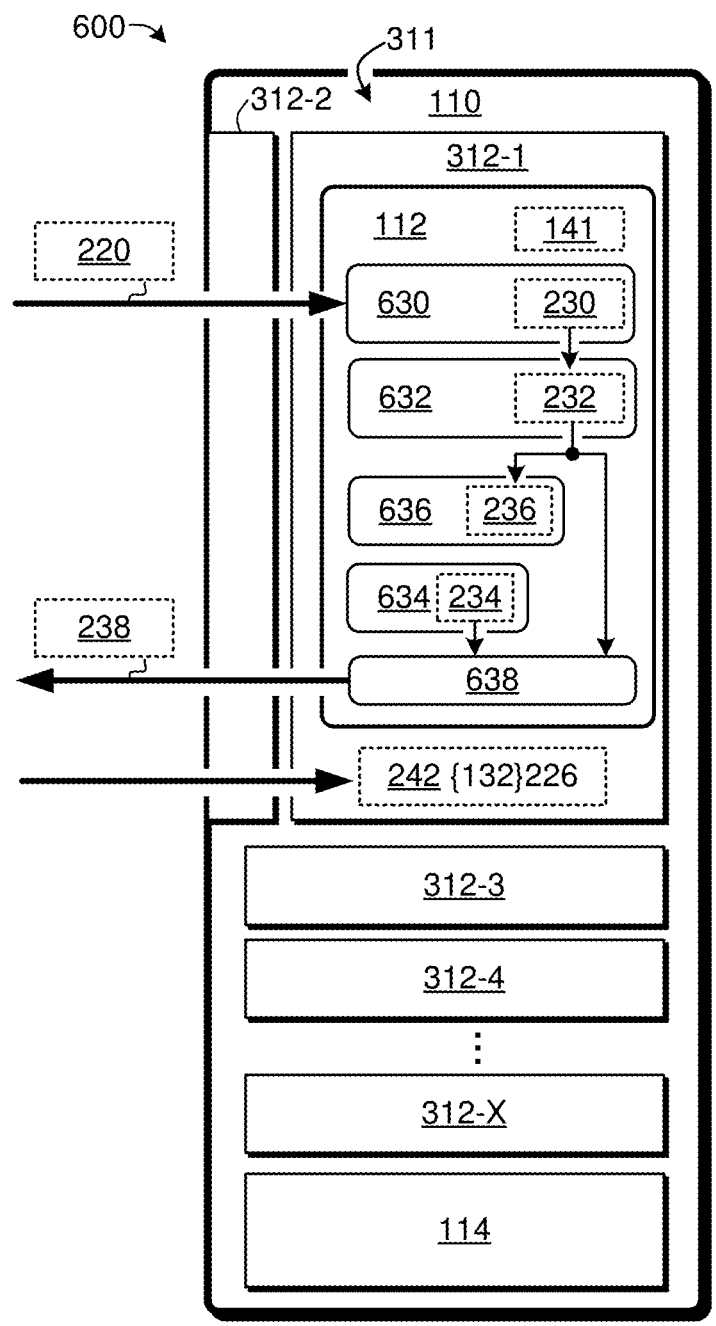

FIG. 6 illustrates an example 600 of an IC device 110 configured to be provisioned through aspects of the disclosed provisioning process 200. More specifically, the IC device 110 may be configured to implement secure provisioning with hardware verification with aspects of the disclosed provisioning service 120, provisioning appliance 121 (apparatus 101), provisioning server 320, and/or the like.

The IC device 110 includes integrated circuitry. The integrated circuitry of the IC device 110 may be organized, arranged, and/or correspond to respective components 312, each component 312 configured to implement one or more IC functions 311. A component 312 of the IC device 110 may include, but is not limited to: a power controller, a processor, a CPU, one or more CPU cores, a DSP, a bus, a CPU bus, a bridge, a peripheral bridge, an interconnect, an internal interconnect, a memory controller, a memory, a memory array, SRAM, DRAM, an NV memory controller, NV memory (e.g., secure NV storage 114), a Flash controller, a Flash memory controller, an I/O component, a parallel I/O (PIO) component, a serial I/O component, a communication interface, a radio-frequency (RF) interface, an RF front end, power manager, battery manager, and/or the like.

In the FIG. 6 example, component 312-1 of the IC device 110 includes logic 112. The logic 112 may be coupled to integrated circuitry of the IC device 110, including integrated circuitry of and/or within one or more of the components 312-1 through 312-X of the IC device 110. The logic 112 may be configured to implement a first function ($F_D$) 141 of the end-to-end function (F) 140, as disclosed herein. The logic 112 may be configured to produce reply data ($R_D$) 238 responsive to seed values (S) 220. The reply data ($R_D$) 238 may include integrity data ($ITG_D$) 232 configured to characterize integrated circuitry within the portion of the IC device 110 specified by the seed value (S) 220. The first logic 112 may receive seed values (S) 220, return reply data ($R_D$) 238, and/or receive encrypted fragments 242 by and/or through an interface of the IC device 110. As illustrated in FIG. 6, the interface may be implemented by component 312-2 of the IC device 110.

The first logic 112 may include input logic 630, which may be configured to produce IC input data ($ICID_D$) 230 responsive to seed values (S) 220. The input logic 630 may be configured to derive, generate, and/or extract IC input data ($ICID_D$) 230 from seed values (S) 220. In some aspects, the input logic 630 implements a function ($F_{D\_ICID}$), where $ICID_D = F_{D\_ICID}(S)$ The IC input data ($ICID_D$) 230 may include any suitable information for specifying, selecting, enabling, activating, configuring, and/or otherwise designating a portion of the integrated circuitry of IC device 110. The IC input data ($ICID_D$) 230 may include, but is not limited to: configuration data, IC configuration data, enable data, an enable code, a knock code, a logic sequence, IC device settings, and/or the like. The IC input data ($ICID_D$) 230 may define an IC configuration that enables the integrity data ($ITG_D$) 232 to cover the portion of the IC device specified by the seed value (S) 220. In some implementations, the IC input data ($ICID_D$) 230 may further include input data for one or more IC features (e.g., may specify a state or operation to implement by the one or more IC features). The IC input data ($ICID_D$) 230 may include scan-in data for a scan chain operation or the like.

The first logic 112 may further include integrity logic 632, which may be configured to produce integrity data ($ITG_D$) 232 responsive to seed values (S) 220. The integrity logic 632 may be configured to produce integrity data ($ITG_D$) 232 configured to characterize the portion of the integrated circuitry of the IC device 110 specified by the seed value (S) 220 (and/or corresponding IC input data ($ICID_D$) 230). The integrity logic 632 may produce integrity data ($ITG_D$) 232 in accordance with IC input data ($ICID_D$) 230 produced by the input logic 630 responsive to the seed value (S) 220.

In some implementations, the integrity logic 632 is configured to implement scan chain operations covering specified portions of the IC device 110. To implement a scan chain operation, the integrity logic 632 may shift input data (scan-in data) into the integrated circuitry specified by the seed value (S) 220 at a scan-in pin (or other element). The integrity data ($ITG_D$) 232 may include scan-out data produced responsive to shifting the scan-in data through the integrated circuitry. The integrity logic 632 may be configured to observe and/or capture the resulting scan chain states at a scan-out pin (or other element) of the integrated circuitry. In some implementations, the scan-in data are defined by the seed value (S) 220. The scan-in data may be included in the IC input data ($ICID_D$) 230 derived from the seed value (S) 220.

In some aspects, the first logic 112 may further include identity logic 634, which may be configured to retrieve an IC identifier (ID) 234 of the IC device 110 responsive to seed values (S) 220, as disclosed herein. The first logic 112 may also include reply logic 638, which may be configured to return reply data ($R_D$) 238 responsive to seed values (S) 220. The reply data ($R_D$) 238 may include at least a portion of one or more of the IC input data ($ICID_D$) 230, integrity data ($ITG_D$) 232, IC identifier (ID) 234, and/or the like. The first logic 112 may be further configured to receive an encrypted fragment 242 ({132}226) responsive to the reply data ($R_D$) 238. The encrypted fragment 242 ({132}226) may include a fragment 132 of the provisioning data 130 encrypted by one of a plurality of cryptographic keys ($K_S$) 226.

The first logic 112 may further include key generation logic 636, which may be configured to derive a cryptographic key ($K_D$) 236 from one or more of the seed value (S) 220, IC input data ($ICID_D$) 230, integrity data ($ITG_D$) 232, and/or the like. The cryptographic key ($K_D$) 236 may be configured to correspond to the cryptographic key ($K_S$) 226 used to produce the encrypted fragment 242 ({132}226), as disclosed herein. In some implementations, the key generation logic 636 generates the cryptographic key ($K_D$) 236 responsive to the seed value (S) 220. Alternatively, the key generation logic 636 may be configured to generate the cryptographic key ($K_D$) 236 responsive to receiving the encrypted fragment 242 ({132}226). The first logic 112 may be configured to write the encrypted fragment 242 ({132}226) and corresponding cryptographic key ($K_D$) 236 within a memory of the IC device 110. The encrypted fragment 242 ({132}226) and corresponding cryptographic key ($K_D$) 236 may be stored within an entry 250 maintained in on-board memory resources of the IC device 110.

Example Methods

Example methods 700-1100 are described with reference to FIGS. 7-11, respectively, in accordance with one or more aspects of secure provisioning with hardware verification. Generally, the methods 700-1100 illustrate sets of operations (or acts) that may be performed in, but not necessarily limited to, the order or combinations in which the operations are shown herein. Further, any of one or more of the operations may be repeated, combined, reorganized, skipped, or linked to provide a wide array of additional and/or alternate methods. In portions of the following discussion, reference may be made to the environment 100-1 and/or 100-2 of FIGS. 1-1 and/or 1-2, systems, apparatus, circuitry, components, and/or operations of FIG. 2-1 through FIG. 5. or other figures, reference to which is made for example only. The techniques and apparatuses described in this disclosure are not limited to an aspect or performance by one entity or multiple entities operating on one device or those described with reference to the figures.

Figure 7:
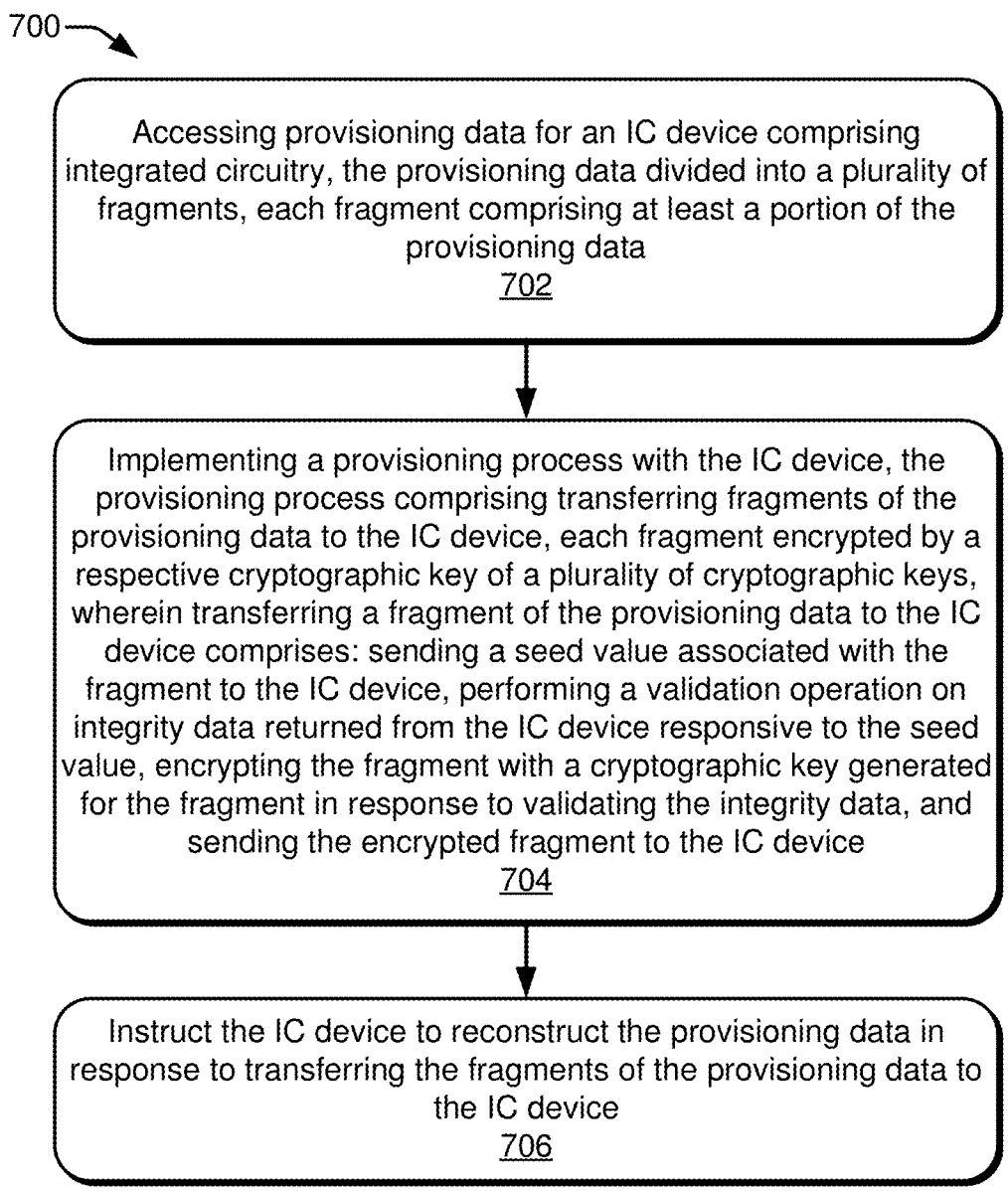
FIG. 7 illustrates an example flow diagram depicting operations for secure provisioning with hardware verification.

FIG. 7 illustrates an example of a flow diagram 700 of a method for secure provisioning with hardware verification. The flow diagram 700 includes blocks 702 through 706. In some aspects, operations of the flow diagram 700 may be implemented by one or more of a provisioning service 120, a provisioning appliance 121, a provisioning server 320, second logic 122, and/or the like. The flow diagram 700 may implement a provisioning process 200 with an IC device 110, as disclosed herein.

At 702, the provisioning service 120 accesses provisioning data 130 for an IC device 110. The IC device 110 may comprise integrated circuitry, including logic (first logic 112). The provisioning data 130 may be divided into a plurality of fragments 132, each fragment 132 including at least a portion of the provisioning data 130. In some implementations, each fragment 132 includes at least a portion of a master key of the provisioning data 130, such as a user master key, or the like.

At 704, the provisioning service 120 implements a provisioning process 200 with the IC device 110. The provisioning process 200 may comprise transferring fragments 132 of the provisioning data 130 to the IC device 110, each fragment 132 encrypted by a respective cryptographic key ($K_S$) 226 of a plurality of cryptographic keys ($K_S$) 226. In some implementations, transferring a fragment 132 of the provisioning data 130 to the IC device 110 comprises: sending a seed value (S) 220 associated with the fragment 132 to the IC device 110, performing a validation operation on integrity data ($ITG_D$) 232 returned from the IC device 110 responsive to the seed value (S) 220, encrypting the fragment 132 with a cryptographic key ($K_S$) 226 generated for the fragment 132 in response to successfully validating the integrity data ($ITG_D$) 232, and sending the encrypted fragment 242 ({132}226) to the IC device 110.

The seed value (S) 220 may be configured to specify the portion of the IC device 110 to be covered by the integrity data ($ITG_D$) 232. The integrity data ($ITG_D$) 232 may include the result of a scan chain operation performed within integrated circuitry of the IC device 110 (e.g., integrated circuitry within the specified portion of the IC device 110). The scan chain operation may include shifting input data (scan-in data) into the integrated circuitry at a scan-in pin (or other element). The integrity data ($ITG_D$) 232 may include scan-out data produced responsive to shifting the scan-in data through the integrated circuitry. The scan chain states may be observed and/or captured at a scan-out pin (or other element) of the integrated circuitry. In some implementations, the first logic 112 is configured to derive the scan-in data used to produce the integrity data ($ITG_D$) 232 from the seed value (S) 220. The scan-in data may be included in IC input data ($ICID_D$) 230 derived from the seed value (S) 220.

Performing the validation operation on the integrity data ($ITG_D$) 232 may include comparing the integrity data ($ITG_D$) 232 to integrity verification data ($ITG_D$) 222. The integrity verification data ($ITG_D$) 222 may be generated by the second logic 122, per the second function ($F_S$) 142, $ITG_S=F_{S\_ITG}(S)$, $ITG_S=F_{S\_ITG}(ICID_S)$, or $ITG_S=F_{S\_ITG}(F_{S\_ICID}(S))$, as disclosed herein.

In some implementations, transferring the fragment 132 includes performing a validation operation on reply data ($R_D$) 238 returned from the IC device 110 responsive to the seed value (S) 220. The reply data ($R_D$) 238 may include the integrity data ($ITG_D$) 232, an IC identifier ($ID_D$) 234, and/or the like. Performing the validation operation on the reply data ($R_D$) 238 may include comparing the integrity data ($ITG_D$) 232 to integrity verification data ($ITG_D$) 222 and/or comparing the IC identifier ($ID_D$) 234 to an expected IC identifier ($ID_S$) 224. In some aspects, the reply data ($R_D$) 238 are validated per a validation function ($F_{S\_V}$) implemented by the second logic 122, as follows $F_{S\_V}(S)=(R_D==R_S)$ or $F_{S\_V}(S)=(R_D==F_S(S))$ where $R_S$ is reply verification data produced per the second function ($F_S$) 142. The provisioning process 200 (and/or transfer operation) may be terminated in response to failing to validate one or more of the reply data ($R_D$) 238, the integrity data ($ITG_D$) 232, and/or the IC identifier ($ID_D$) 234.

The cryptographic key ($K_S$) 226 generated at or obtained by the provisioning service 120 may be based, at least in part, on the seed value (S) 220. The IC device 110 may be configured to generate a corresponding cryptographic key ($K_D$) 236 (by use of the first logic 112 implemented by the IC device 110). The IC device 110 may be further configured to write the encrypted fragment 242 ({132}226) and corresponding cryptographic key ($K_D$) 236 within a memory of the IC device 110. In some aspects, the encrypted fragment 242 ({132}226) and associated cryptographic key ($K_D$) 236 are stored within an entry 250 maintained within volatile or non-volatile memory of the IC device 110.

At 706, the provisioning service 120 instructs the IC device 110 to reconstruct the provisioning data 130 in response to transferring each of the fragments 132 of the provisioning data 130 to the IC device 110. The first logic 112 of the IC device 110 may be configured to reconstruct the provisioning data 130 from the plurality of encrypted fragments 242 ({132}226) and corresponding cryptographic keys ($K_D$) 236 stored within the memory of the IC device 110. The first logic 112 may be configured to decrypt each encrypted fragment 242 ({132}226) using a corresponding cryptographic key ($K_D$) 236, combine the decrypted fragments 132, and transfer the resulting provisioning data 130 into secure NV storage 114 of the IC device 110. The first logic 112 may be further configured to remove the encrypted fragments 242 ({132}226) and corresponding cryptographic keys ($K_D$) 236 from the memory. In some implementations, the first logic 112 securely deletes the encrypted fragments 242 ({132}226) and corresponding cryptographic keys ($K_D$) 236 from the memory.

Figure 8:
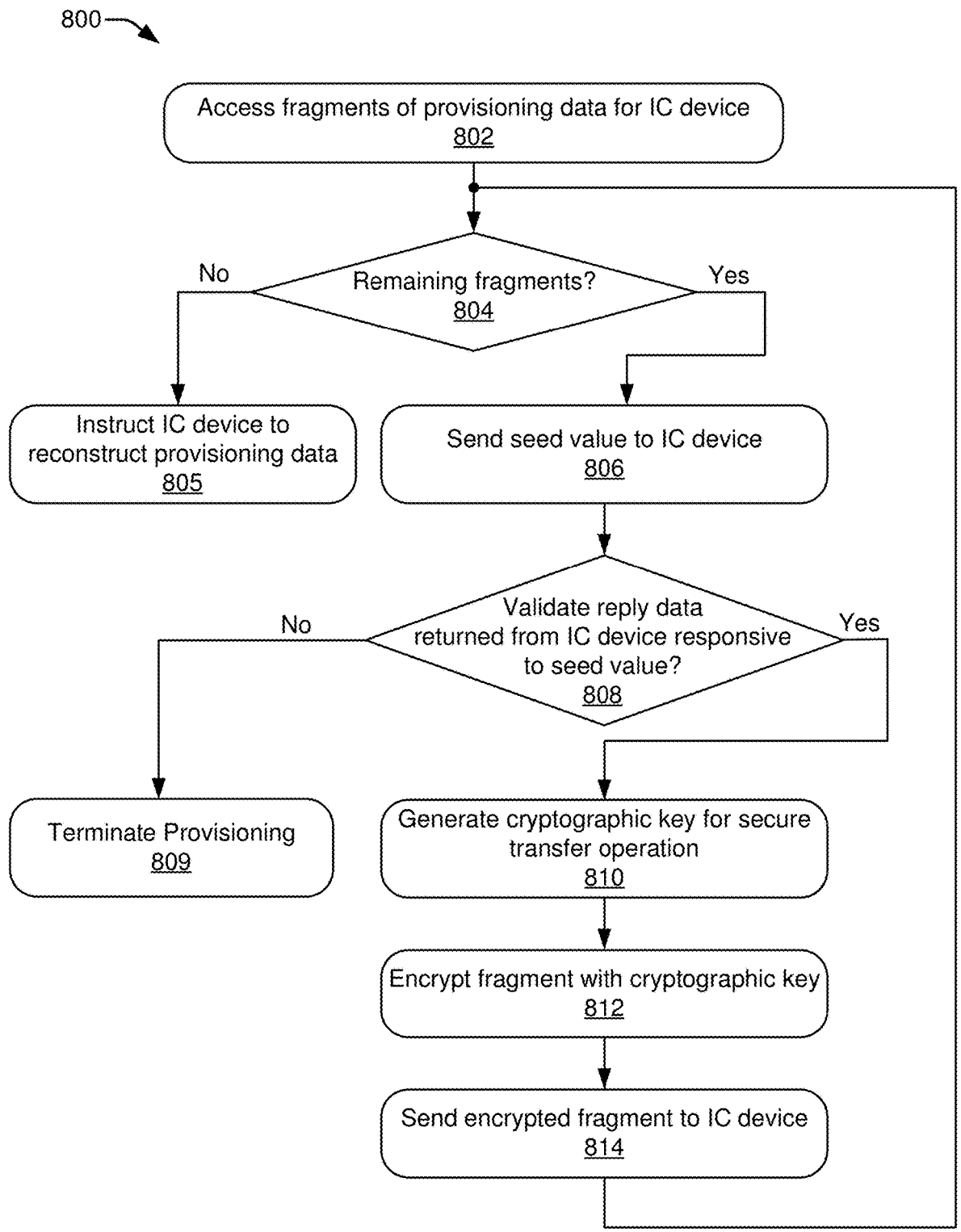
FIG. 8 illustrates another example flow diagram depicting operations for secure provisioning with hardware verification.

FIG. 8 illustrates another example of a flow diagram 800 of a method for secure provisioning with hardware verification. The flow diagram 800 includes blocks 802 through 814. In some aspects, operations of the flow diagram 800 may be implemented by one or more of a provisioning service 120, a provisioning appliance 121, a provisioning server 320, second logic 122, and/or the like. The flow diagram 800 may implement a provisioning process 200 with an IC device 110, which may include transferring provisioning data 130 to the IC device 110, as disclosed herein.

At 802, the provisioning service 120 accesses fragments 132 of provisioning data 130 for the IC device 110. The provisioning data 130 and/or fragments 132 may be accessed from a data store 430. In some implementations, the provisioning data 130 and/or fragments 132 are maintained within a record 330 associated with the IC device 110 and/or IC identifier ($ID_S$) 224 of the IC device 110. The provisioning data 130 may be partitioned into N fragments 132 (e.g., fragments 132-1 through 132-N). In some aspects, the provisioning data 130 is divided into fragments 132 at 802. The provisioning service 120 may form the fragments 132 such that each fragment 132 includes at least a portion of a master key of the provisioning data 130.

At 804, the provisioning service 120 determines whether any of the N fragments 132 remain to be transferred to the IC device 110. If all of the N fragments 132 have been successfully transferred to the IC device 110, the flow may continue at 805; otherwise, the flow continues at 806.

At 806 through 814, the provisioning service 120 implements a secure transfer operation 210 involving a fragment 132 of the provisioning data 130. At 806, the provisioning service 120 sends a seed value (S) 220 associated with the fragment 132 to the IC device 110. At 808, the provisioning service 120 performs a validation operation on reply data ($R_D$) 238 returned from the IC device 110 responsive to the seed value (S) 220. Performing the validation operation on the reply data ($R_D$) 238 may include comparing integrity data ($ITG_D$) 232 and/or an IC identifier ($ID_D$) 234 of the reply data ($R_D$) 238 to integrity verification data ($ITG_S$) 222 and/or IC identifier ($ID_S$) 224. If validation of the reply data ($R_D$) 238 fails, the flow continues at 809; otherwise, the flow continues at 810. At 809, the provisioning service 120 terminates the provisioning process 200 (and/or transfer of the fragment 132). The provisioning service 120 may be further configured to mark the IC device 110 and/or corresponding IC identifier ($ID_S$) 224 as "failed" or "do not provision."

At 810, the provisioning service 120 generates a cryptographic key ($K_S$) 226 for the fragment 132. The cryptographic key ($K_S$) 226 may be generated per the second function ($F_S$) 142 and/or may be based, at least in part, on the seed value (S) 220. At 812, the fragment 132 is encrypted with the cryptographic key ($K_S$) 226 to form an encrypted fragment 242 ({132}226). At 814, the encrypted fragment 242 ({132}226) is sent to the IC device 110. The IC device 110 may be configured to write the encrypted fragment 242 ({132}226) and corresponding cryptographic key ($K_D$) 236 within a memory of the IC device 110. The flow may then continue at 804, where a next fragment 132 may be transferred to the IC device 110 (if any).

If there are no fragments 132 remaining to be transferred to the IC device 110 at 804, the flow continues at 805. At 805, the provisioning service 120 instructs the IC device 110 to reconstruct the provisioning data 130. The provisioning service 120 may notify the IC device 110 that the N encrypted fragments 242 ({132}226) have been transferred to the IC device 110. The IC device 110 may reconstruct the provisioning data from the N encrypted fragments 242 ({132}226) and corresponding cryptographic keys ($K_D$) 236 stored within the memory of the IC device 110. The reconstructed provisioning data 130 may be transferred to secure NV storage 114 of the IC device 110.

Figures 1, 9:
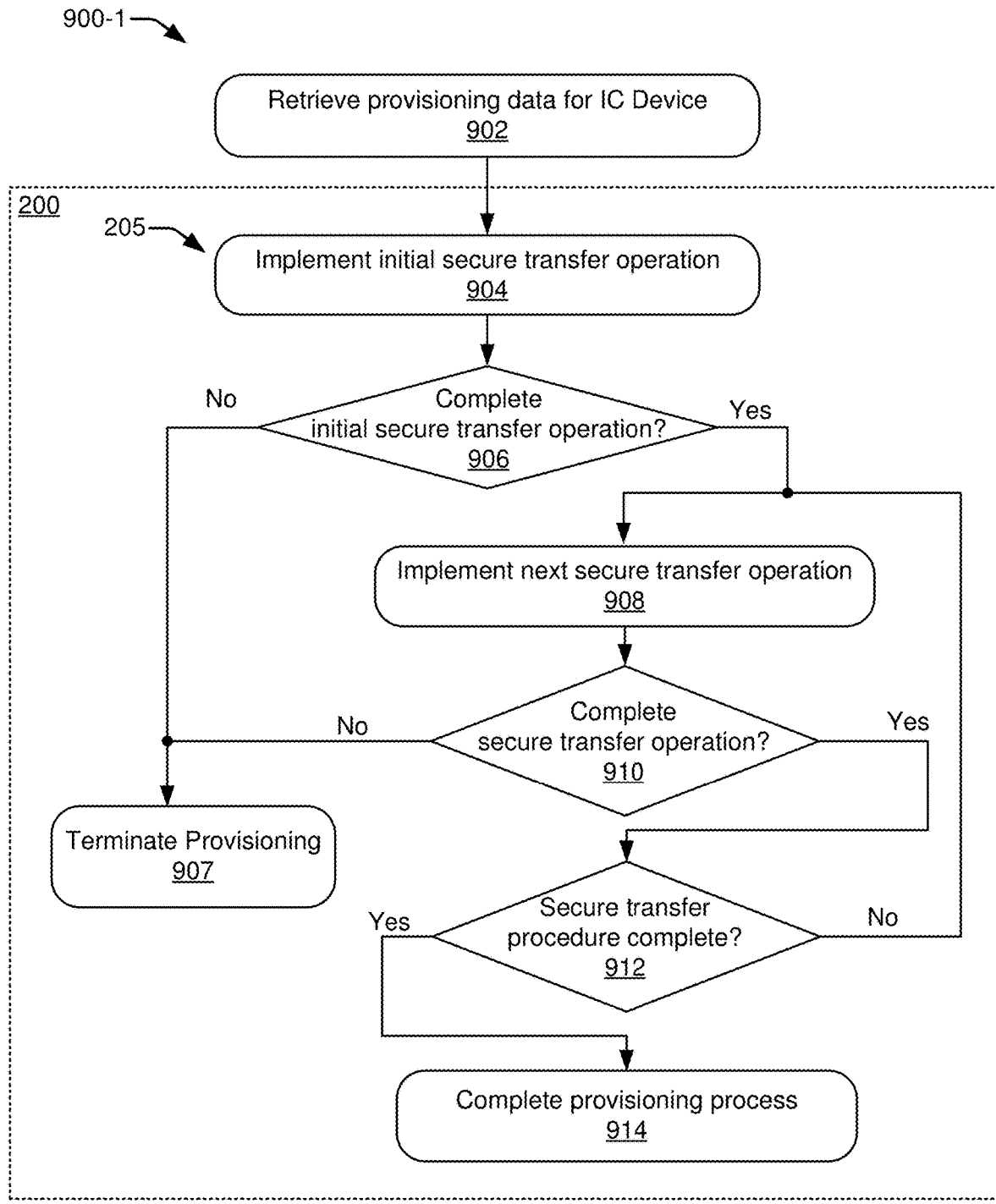
Figures 2, 9:
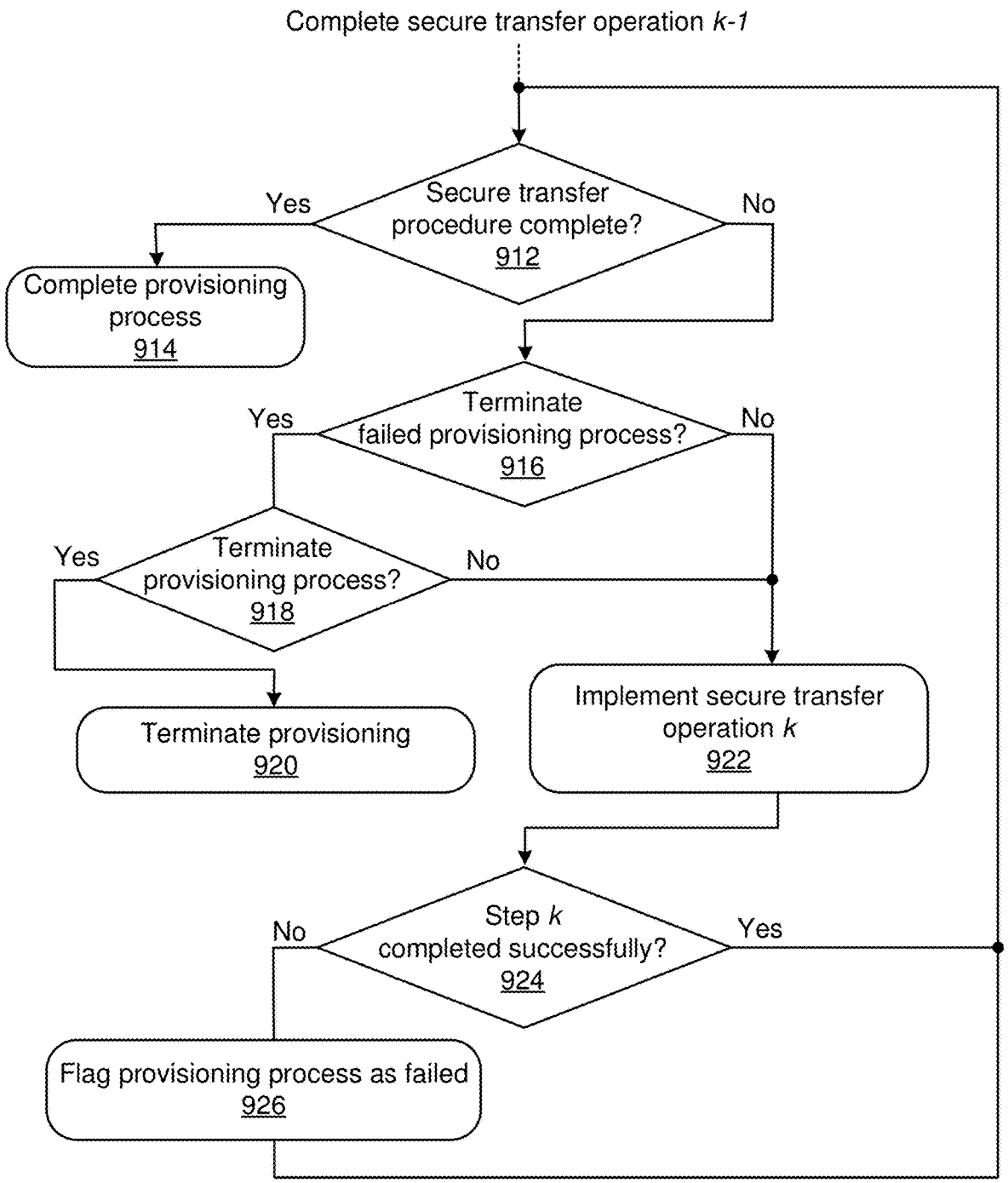
Figures 3, 9:
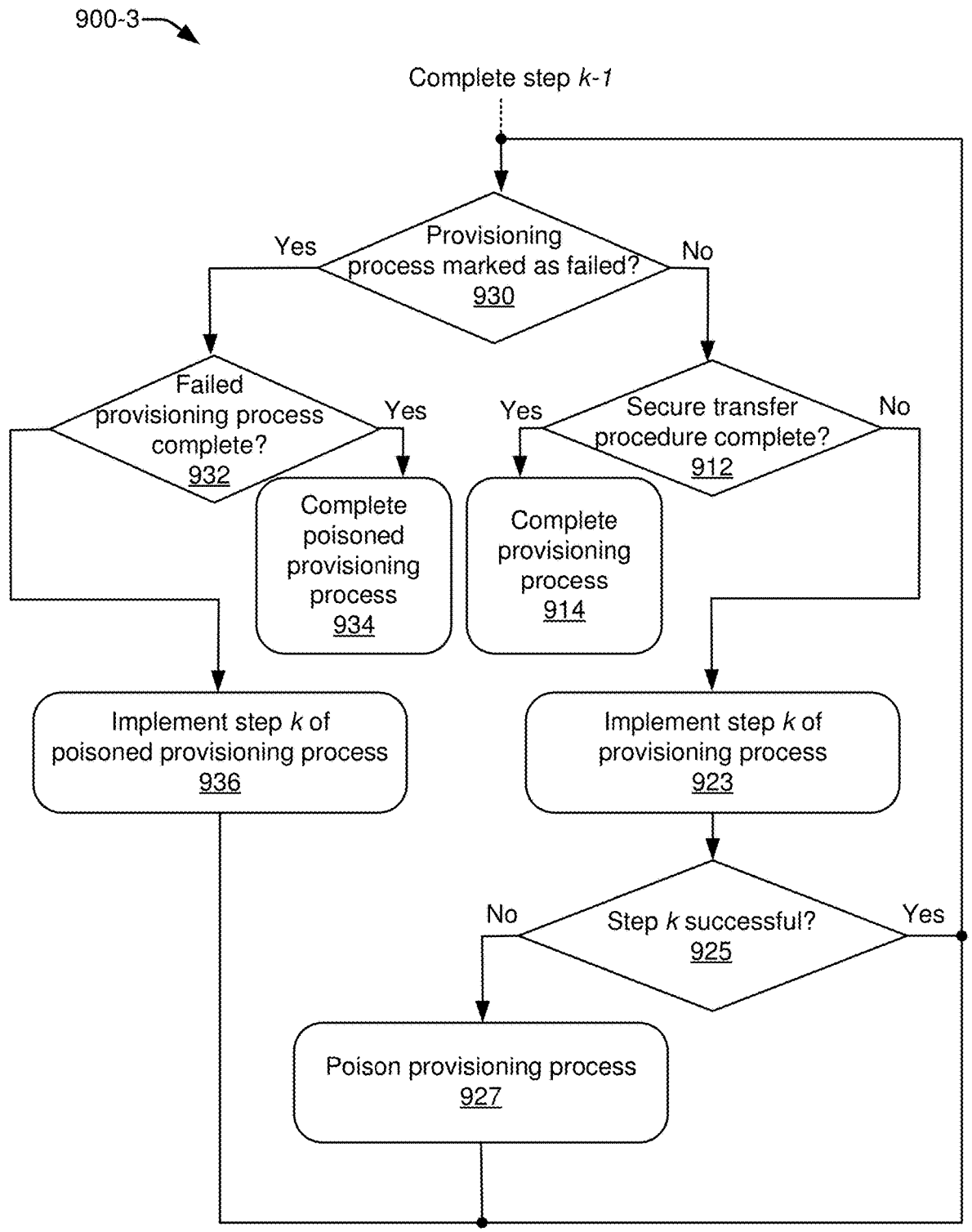

FIG. 9-1 illustrates another example of a flow diagram 900-1 of a method for secure provisioning with hardware verification. The flow diagram 900-1 includes blocks 902 through 914. In some aspects, operations of the flow diagram 900-1 may be implemented by one or more of a provisioning service 120, a provisioning appliance 121, a provisioning server 320, second logic 122, and/or the like. The flow diagram 900-1 may implement a provisioning process 200 with an IC device 110, which may include transferring provisioning data 130 to the IC device 110, as disclosed herein.

At 902, the provisioning service 120 retrieves provisioning data 130 for an IC device 110. The provisioning service 120 may retrieve the provisioning data 130 from a record 330 associated with an IC identifier ($ID_S$) 224 of the IC device 110, a data store 430, IC dataset 203, and/or the like. The provisioning data 130 may be partitioned into a plurality of fragments 132, as disclosed herein. Alternatively, or in addition, the provisioning service 120 may divide the provisioning data 130 into a plurality of fragments 132 at 902. The provisioning data 130 may be divided into any number of fragments 132, each including at least a portion of the provisioning data 130. In some implementations, each fragment 132 includes at least a portion of a master key of the provisioning data 130, such as a user master key, or the like. In the FIG. 9-1 example, the provisioning data 130 may be segmented into N fragments 132, including fragments 132-1 through 132-N.

At 904 through 914, the provisioning service 120 implements a provisioning process 200 with the IC device 110. The provisioning process 200 may include a secure transfer procedure 205 that includes a plurality of steps (or secure transfer operations 210), each step involving a respective fragment 132 of the plurality of fragments 132. In the FIG. 9-1 example, the secure transfer procedure 205 of the provisioning process 200 may include N steps (or N secure transfer operations 210).

At 904, the provisioning service 120 implements an initial secure transfer operation 210-1 of the provisioning process 200. The initial secure transfer operation 210-1 may include sending a seed value (S 220-1 to the IC device 110 and implementing a validation operation 240-1 on the reply data ($R_{D,1}$) 238-1 returned from the IC device 110 responsive to the seed value (S 220-1. The validation operation 240-1 may include comparing the reply data ($R_{D,1}$) 238-1 to reply verification data ($R_{S,1}$) 228-1, as disclosed herein. In some implementations, the seed value (S 220-1 and/or reply verification data ($R_{S,1}$) 228-1 may be pre-determined. The seed value (S 220-1 and/or reply verification data ($R_{S,1}$) 228-1 may be retrieved from predetermined data 332 associated with the IC device 110. Alternatively, or in addition, the seed value ($S_1$) 220-1 and/or reply verification data ($R_{S,1}$) 228-1 may be generated by the second function ($F_S$) 142 implemented by the second logic 122 (and/or architecture-specific logic 522) of the provisioning service 120, as disclosed herein.

At 906, the provisioning service 120 determines whether to complete the initial secure transfer operation 210-1. The initial secure transfer operation 210-1 may be completed based on a result of the validation operation 240-1. If the validation operation 240-1 fails, the flow continues at 907.

At 907, the provisioning service 120 terminates the secure transfer operation 210-1 and corresponding provisioning process 200 (without transferring the fragment 132-1 to the IC device 110). The provisioning service 120 may be further configured to record that provisioning of the IC device 110 failed, which may include updating the status of the IC device 110 and/or IC identifier ($ID_S$) 224 as "failed" or "do not provision." Alternatively, the provisioning service 120 may be configured to obfuscate failure of the provisioning process 200 at 907. The provisioning service 120 may record that provisioning of the IC device 110 failed but may not terminate the provisioning process 200 immediately. Instead, the provisioning process 200 may be terminated in a subsequent secure transfer operation 210. In another example, the provisioning service 120 may poison the provisioning process 200 at 907, which may include modifying the functions $F_D$ 141 and/or $F_S$ 142, cryptography, cryptographic keys 226/236, and/or the like. Poisoning the provisioning process 200 may further include modifying the provisioning data 130 to be sent to the IC device (and/or one or more fragments 132 thereof). The provisioning service 120 may complete the poisoned provisioning process 200 with the IC device 110 such that, to an outside observer, the provisioning process 200 appears to have been completed successfully.

If the validation operation 240-1 is successful, the provisioning service 120 may complete the secure transfer operation 210-1 and proceed to 908. Completing the secure transfer operation 210-1 may include generating a cryptographic key ($K_{S,1}$) 226-1, encrypting the fragment 132-1, and transferring the encrypted fragment 242-1 ({132-1}226-1) to the IC device 110. The IC device 110 may store the encrypted fragment 242-1 ({132-1}226-1) and corresponding cryptographic key ($K_{D,1}$) 236-1 within a memory of the IC device 110 (e.g., within an entry 250-1). The provisioning service 120 may be further configured to update the status 334 of the IC device 110 and/or IC identifier ($ID_S$) 224 to "can provision" or "provisioning in progress."

At 908-912, the provisioning process 200 implements subsequent secure transfer operations 210 of the provisioning process 200. In the FIG. 9-1 example, the provisioning process 200 may implement secure transfer operations 210-2 through 210-N, each implemented in a respective iteration of steps 908-912. More specifically, each iteration through 908-912 may correspond to a respective secure transfer operation 210-$k$, where k is between 2 and N. For example, the iteration through 908-912 following 906 may correspond to secure transfer operation 210-2 (k=2), the next iteration through 908-912 may correspond to secure transfer operation 210-3 (k=3), and so on.

At 908, the provisioning service 120 may implement secure transfer operation 210-$k$ of the provisioning process 200. The secure transfer operation 210-$k$ may include sending a seed value ($S_k$) 220-$k$ to the IC device 110 and implementing a validation operation 240-$k$ on the resulting reply data ($R_{D,k}$) 238-$k$. The validation operation 240-$k$ at 908 may include comparing the reply data ($R_{D,k}$) 238-$k$ to reply verification data ($R_{S,k}$) 228-$k$, as disclosed herein. The validation operation 240-$k$ may include implementing the second function ($F_S$) 142 to generate the reply verification data ($R_{S,k}$) 228-$k$. The reply verification data ($R_{S,k}$) 228-$k$ may include integrity verification data ($ITG_{S,k}$) 222-$k$, an IC identifier ($ID_S$) 224, and/or the like. The second logic 122 may generate the reply verification data ($R_{S,k}$) 228-$k$ from the seed value ($S_k$) 220-$k$.

In some implementations, the second logic 122 generates seed values ($S_k$) that incorporate information from previous secure transfer operations 210, such as previous seed values ($S_{k-1}$) 220-$k$–1, components of previous seed values ($S_{k-1}$) 220-$k$–1, components of previous reply data ($R_{D,k-1}$) 238-$k$–1, components of previous reply verification data ($R_{S,k-1}$) 228-$k$–1, previous cryptographic keys ($K_{S,k-1}$) 236-$k$–1, and/ or the like. The sequence of seed values ($S_1$) 220-1 through ($S_N$) 220-N and/or corresponding cryptographic keys ($K_{S,1}, \ldots, K_{S,N}$ and/or $K_{D,1}, \ldots, K_{D,N}$) 226-1/236-1 through 226-N/236-N may be configured to create a key ladder. Furthermore, the second logic 122 may configure the seed values ($S_1$) 220-1 through ($S_N$) 220-N to cover different portions of the IC device 110 and, as such, may obfuscate generation of integrity data ($ITG_D$) 232 at the IC device 110 unpredictably. In some aspects, the second function ($F_S$) 142 implemented by the second logic 122 at 908 may include and/or define a function for generating seed values 220, as follows: $S_k = F_{S\_SV}(S_{k-1})$, $F_{S\_SV}(S_{k-1}, R_{D,k-1})$, or the like.

At 910, the provisioning service 120 determines whether to complete the secure transfer operation 210-$k$. The secure transfer operation 210-$k$ may be completed based on a result of the validation operation 240-$k$. If the validation operation 240-$k$ fails, the secure transfer operation 210-$k$ (and corresponding provisioning process 200) may be terminated at 907. If the validation operation 240-$k$ is successful, the provisioning service 120 may complete the secure transfer operation 210-$k$ and proceed to 912. Completing the secure transfer operation 210-$k$ may include generating a cryptographic key ($K_{S,k}$) 226-$k$, encrypting the fragment 132-$k$, and transferring the encrypted fragment 242-$k$ ({132-$k$}226-$k$) to the IC device 110. The IC device 110 may store the encrypted fragment 242-$k$ ({132-1}226-$k$) and corresponding cryptographic key ($K_{D,k}$) 236-$k$ within the memory of the IC device 110 (e.g., within an entry 250-$k$).

At 912, the provisioning service 120 determines whether the secure transfer procedure 205 is complete. More specifically, the provisioning service 120 may determine whether each step (or secure transfer operation 210) of the provisioning process 200 has been successfully completed (e.g., whether k is less than N). If the N secure transfer operations 210 have not been successfully completed, the flow may continue at 908, where a next secure transfer operation 210 may be implemented (secure transfer operation 210-$k$, where k=k+1).

If the N secure transfer operations 210 have been completed, the flow may continue at 914. As disclosed herein, completing the N secure transfer operations 210 may include transferring fragments 132-1 through 132-N of the provisioning data 130 to the IC device 110, each encrypted by a respective cryptographic key ($K_S$) 226 of the plurality of cryptographic keys ($K_{S,1}$) 226-1 through ($K_{S,N}$) 226-N generated at the provisioning service 120. Implementing the N secure transfer operations 210 may cause the IC device 110 to write a plurality of entries 250 to memory (e.g., entries 250-1 through 250-N), each including a respective encrypted fragment 242({132}226) and corresponding cryptographic key ($K_D$) 236 generated at the IC device 110. The memory of the IC device 110 may, therefore, include encrypted fragments 242-1 ({132-1}226-1) through 242-N ({132-N}226-N) and corresponding cryptographic keys ($K_{D,1}$) 236-1 through ($K_{D,N}$) 236-N.

At 914, the provisioning service 120 may complete the provisioning process 200. The provisioning service 120 may cause the IC device 110 to reconstruct the provisioning data 130. At 914, the provisioning service 120 may send a message, directive, command, or other indication to the IC device 110. In response, the IC device 110 may reconstruct the provisioning data 130, which may include: decrypting the encrypted fragments 242-1 ({132-1}226-1) through 242-N ({132-N}226-N) using the corresponding cryptographic keys ($K_{D,1}$) 236-1 through ($K_{D,N}$) 236-N, combining the decrypted fragments 132-1 through 132-N, and transferring the resulting provisioning data 130 to secure NV storage 114 of the IC device 110. The IC device 110 may be further configured to remove the encrypted fragments 242 and/or corresponding cryptographic keys ($K_D$) 236 from the memory. The provisioning service 120 may be further configured to update the status 334 of the IC device 110 (and/or IC identifier ($ID_S$) 224) to "provisioned."

FIG. 9-2 illustrates another example of a flow diagram 900-2 of a method for secure provisioning with hardware verification. The flow diagram 900-2 includes blocks 912 through 926. In some aspects, operations of the flow diagram 900-2 may be implemented by one or more of a provisioning service 120, a provisioning appliance 121, a provisioning server 320, second logic 122, and/or the like. The flow diagram 900-2 may implement a provisioning process 200 with an IC device 110, which may include transferring provisioning data 130 to the IC device 110, as disclosed herein. Flow diagram 900-2 illustrates an example of a method for obfuscating failure of a provisioning process 200 being implemented with an IC device 110. Flow diagram 900-2 illustrates operations that may be implemented subsequent to completing a step of the secure transfer operation 210 of the provisioning process 200 (e.g., subsequent to completing step k–1).

At 912, the provisioning service 120 determines whether the secure transfer procedure 205 of the provisioning process 200 is complete. The determination of 912 may be made in response to completing step k–1 of the secure transfer procedure 205 (e.g., in response to completing one of steps 1 through N–1 for a secure transfer procedure 205 including N steps or N secure transfer operations 210). If the secure transfer procedure has been completed, the flow may continue at 914 where the provisioning process 200 may be completed, as disclosed herein. Otherwise, the flow may continue at 916.

At 916, the provision service 120 may determine whether to terminate the provisioning process 200 as failed. The provisioning service 120 may determine whether the provisioning process 200 (or IC device 110) has been flagged or marked as failed. The provisioning process 200 may have failed in a previous step (e.g., in one of steps 1 through k–1 or in one of the secure transfer operations 210-1 through 210-$k$–1). The provisioning service 120 may determine whether the provisioning process 200 has failed based, at least in part, on the status 334 of the record 330 associated with the IC device 110. If the provisioning process 200 previously failed, the provisioning service 120 may be further configured to determine whether to terminate the failed provisioning process 200. The provisioning process 200 may be configured to obfuscate failures by, inter alia, continuing to implement steps of the provisioning process 200 after detecting a failure. The provisioning service 120 may implement a selected number of steps and/or secure transfer operations 210. In some implementations, the provisioning service 120 selects a random number of steps to implement after a failure in order to prevent an attacker from immediately detecting the failure, to obfuscate the step (or secure operation 210) that caused the failure, and/or the like. At 916, the provisioning service 120 may determine whether a) the provisioning process 200 has failed, and b) the selected number of steps have been completed subsequent to the failure. If so, the failed provisioning process 200 may be terminated at 918. Otherwise, if the provisioning process 200 has not failed (or the selected number of steps have not been completed), the flow may continue at 922.

At 922, the provisioning service 120 implements step k of the secure transfer procedure 205. Implementing step k may comprise implementing a secure transfer operation 210-k, as disclosed herein. At 924, the provisioning service 120 determines whether step k was completed successfully (e.g., whether the validation operation 240-k of the secure transfer operation 210-k was successful). If so, the flow may continue at 912. Otherwise, the flow may continue at 926. At 926, the provisioning service 120 may flag the provisioning process 200 (and/or IC device 110) as failed, as disclosed herein. The provisioning service 120 may be further configured to select a number of steps to complete subsequent to detection of the failure and the flow may continue at 912.

FIG. 9-3 illustrates another example of a flow diagram 900-3 of a method for secure provisioning with hardware verification. The flow diagram 900-3 includes blocks 912 through 936. In some aspects, operations of the flow diagram 900-3 may be implemented by one or more of a provisioning service 120, a provisioning appliance 121, a provisioning server 320, second logic 122, and/or the like. The flow diagram 900-3 may implement a provisioning process 200 with an IC device 110, which may include transferring provisioning data 130 to the IC device 110, as disclosed herein. Flow diagram 900-3 illustrates an example of a method for obfuscating failure of a provisioning process 200 being implemented with an IC device 110 by, inter alia, poisoning the provisioning process 200. Flow diagram 900-3 illustrates operations that may be implemented subsequent to completing a step of the secure transfer operation 210 of the provisioning process 200 (e.g., subsequent to completing step k-1). In the FIG. 9-3 example, the provisioning service 120 may be configured to obfuscate failures by, inter alia, completing poisoned provisioning processes 200 with IC devices 110 in response to provisioning failures.

At 930, the provisioning service 120 determines whether the provisioning process 200 (or IC device 110 being provisioned) has failed, as disclosed herein. If the provisioning process 200 has failed, the flow may continue at 932; otherwise, the flow may continue at 912. At 912, the provisioning service 120 may determine whether the secure transfer procedure 205 of the provisioning process 200 has been successfully completed. If so, the provisioning service 120 may complete the provisioning process 200 at 914. Otherwise, the flow may continue at 923. At 923, provisioning service 120 implements step k of the secure transfer procedure 205 (e.g., implements secure transfer operation 210-k). At 925, the provisioning service 120 determines whether step k was completed successfully based, at least in part, on the validation operation 240-k implemented in step k. If step k was completed successfully, the flow may continue at 930; otherwise, the flow continues at 927.

At 927, the provisioning service 120 may be configured to poison the provisioning process 200, which may include marking the IC device 110 as failed (setting the status 334 of the IC device 110 to failed in a record 330 associated with the IC device 110). At 927, the provisioning service 120 may modify the provisioning process 200, which may include modifying subsequent steps and/or secure transfer operations 210 by, inter alia, switching to a different provisioning algorithm, different function(s) (e.g., different functions $F_D$ 141 and/or $F_S$ 142), different seed values (S) 220, different cryptographic keys 226/236 (and/or different cryptographic key exchange techniques), a different encryption algorithm, different communication mechanism(s), and/or the like. The provisioning service 120 may switch from implementing a valid provisioning process 200 with the IC device 110 to a poisoned provisioning process 200. The switch may be transparent to outside observers, such as an attacker. Therefore, if there are weaknesses in the encryption and/or other security mechanisms of the provisioning process 200, the attacker will not be able to learn anything more about the provisioning process 200 in subsequent steps (or secure transfer operations 210). From the perspective of the attacker, the poisoned provisioning process 200 may appear to be valid and complete successfully. Poisoning the provisioning process 200 at 927 may further include modifying the provisioning data 130 to be sent to the IC device 110 (e.g., modifying one or more fragments 132). The provisioning service 120 may generate poisoned provisioning data 130, which may be distinguishable from valid provisioning data 130. The modifications may be configured to remove sensitive information from the poisoned provisioning data 130 and/or indicate that provisioning of the IC device 110 failed. The failure may also be recorded in the status 334 of the record 330 associated with the IC device 110, as disclosed herein. The flow may continue at 930.

At 930, the provisioning service 120 determines whether the provisioning process 200 has failed, as disclosed herein. If not, the flow continues at 912 as described above. If a failure has occurred, the flow continues at 923. At 932, the provisioning service 120 may determine whether the poisoned provisioning process 200 being implemented with the IC device 110 is complete. As disclosed herein, the provisioning service 120 may be configured to implement poisoned provisioning processes 200 that are indistinguishable from valid provisioning processes 200 to outside observers, such as an attacker. Completing the poisoned provisioning process at 934 may include instructing the IC device 110 to: a) reconstruct poisoned provisioning data 130 transferred to the IC device 110 in the poisoned provisioning process 200, and/or b) store the poisoned provisioning data 130 within secure NV storage 114 of the IC device 110. As disclosed herein, the poisoned provisioning data 130 may indicate that provisioning of the IC device 110 failed.

If the poisoned provisioning process 200 has not been completed, the flow continues at 936. At 936, the provisioning service 120 may implement step k of the poisoned provisioning process 200 (as modified or "poisoned" at 927). At 936, the provisioning service 120 may implement step k of the poisoned provisioning process 200 in accordance with a modified provisioning algorithm, function(s) (e.g., modified functions $F_D$ 141 and/or $F_S$ 142), modified seed values (S) 220, modified cryptographic keys 226/236 (and/or modified cryptographic key exchange techniques), modified encryption algorithm, modified communication mechanism(s), and/or the like. The flow may then continue at 930.

Figure 10:
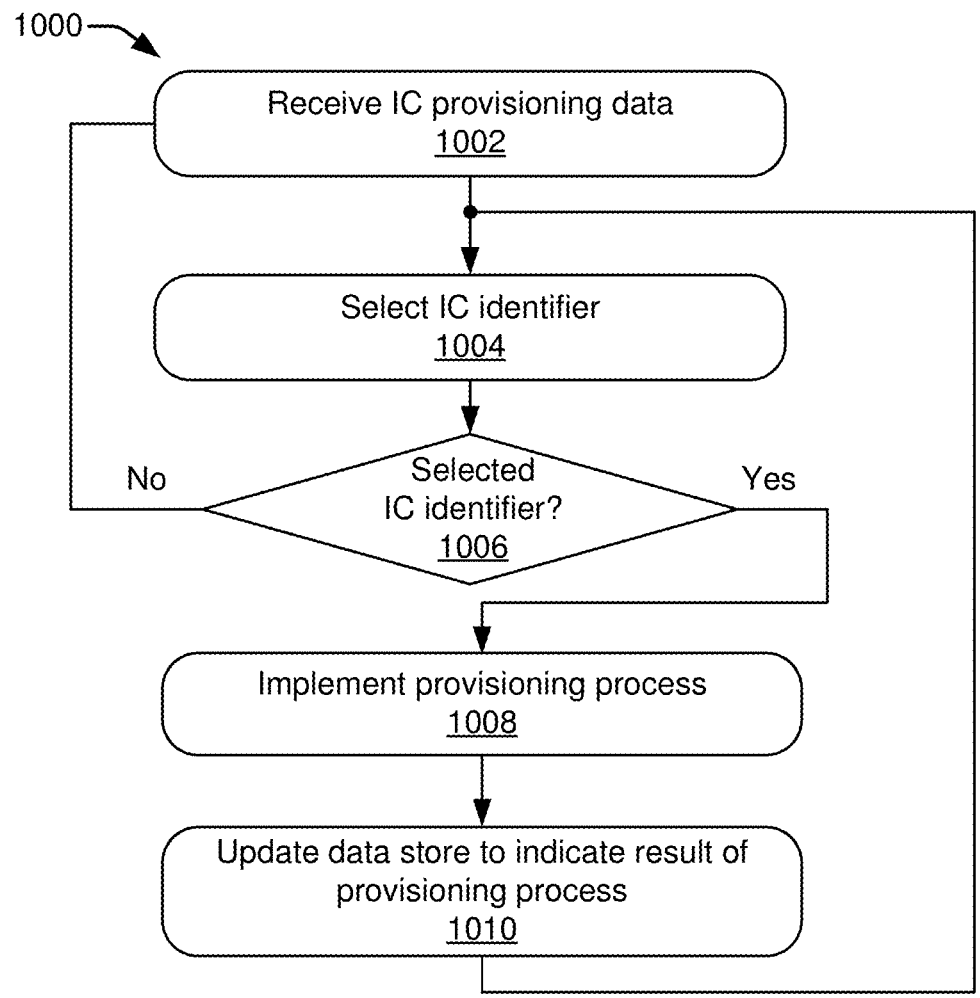
FIG. 10 illustrates a further example flow diagram depicting operations for secure provisioning with hardware verification.

FIG. 10 illustrates another example of a flow diagram 1000 of a method for secure provisioning with hardware verification. The flow diagram 1000 includes blocks 1002 through 1010. In some aspects, operations of the flow diagram 1000 may be implemented by one or more of a provisioning service 120, a provisioning appliance 121, a provisioning server 320, second logic 122, and/or the like. The flow diagram 1000 may implement a provisioning process 200 with an IC device 110, which may include transferring provisioning data 130 to the IC device 110, as disclosed herein.

At 1002, the provisioning service 120 receives IC dataset 203. The IC dataset 203 may include information pertaining to one or more IC devices 110 to be provisioned by the provisioning service 120. The IC dataset 203 may be received from an IC manufacturer, fabricator, supplier, partner, carrier, service provider, and/or the like. The IC dataset 203 may include any suitable information pertaining to the IC devices 110, including, but not limited to: a list of IC identifiers ($ID_S$) 224, provisioning data 130 for the IC devices 110, specifications of the IC devices, information pertaining to the architecture of the IC devices 110, information pertaining to the functionality of the IC devices 110, information pertaining to implementation of the first function ($F_D$) 141 by the IC devices 110, and/or the like. The provisioning service 120 may maintain information pertaining to the IC devices 110 in non-transitory storage, such as a database. In some implementations, the provisioning service 120 maintains information pertaining to the IC devices 110 in records 330 of a data store 430.

At 1004 through 1010, the provisioning service 120 may implement a provisioning process 200 for each IC identifier ($ID_S$) 224 of the IC dataset 203 received at 1002. The provisioning service 120 may maintain information pertaining to the provisioning status of respective IC identifiers ($ID_S$) 224. In some implementations, the provisioning service 120 maintains a status 334 within records 330 associated with respective IC identifiers ($ID_S$) 224. The status 334 of an IC identifier ($ID_S$) 224 may indicate whether the IC device 110 associated with the IC identifier ($ID_S$) 224 can be provisioned, has been provisioned, has failed, or the like. At 1004 the provisioning service 120 may select an IC identifier ($ID_S$) 224 for provisioning. The provisioning service 120 may select an IC identifier ($ID_S$) 224 that has not yet been provisioned (or failed provisioning). At 1004, the provisioning service 120 may attempt to select an IC identifier ($ID_S$) 224 having a status 334 of "pending," "can be provisioned," or the like. The provisioning service 120 may exclude IC identifiers ($ID_S$) 224 having a status 334 of "provisioned," "failed," "do not provision," or the like from selection.

At 1006, the provisioning service 120 determines whether an IC identifier ($ID_S$) 224 was selected at 1004. At 1006, the provisioning service 120 may determine whether a provisioning process 200 has been completed (or attempted) with each of the IC devices 110 of the IC dataset 203. The provisioning service 120 may determine whether the data store 430 includes an IC identifier ($ID_S$) 224 with a status of "pending" or "can be provisioned." If so, the flow may continue at 1008. Otherwise, the flow terminates and/or returns to 1002 to receive additional provisioning information (e.g., another IC dataset 203).

At 1008, the provisioning service 120 implements a provisioning process 200 for the selected IC identifier ($ID_S$) 224. The provisioning process 200 may include implementing a plurality of secure transfer operations 210 with the IC device 110 associated with the selected IC identifier ($ID_S$) 224. The provisioning service 120 may initiate the provisioning process 200 by, inter alia, sending an initial seed value ($S_1$) 220-1 including the selected IC identifier ($ID_S$) 224 to the IC devices 110. The provisioning service 120 may proceed with the provisioning process 200 responsive to receiving reply data ($R_{D,1}$) 238-1 from the IC device 110 associated with the selected IC identifier ($ID_S$) 224.

At 1010, the provisioning service 120 updates the data store to indicate a result of the provisioning process 200. If the provisioning process 200 was successful, the provisioning service 120 may update the status 334 of the selected IC identifier ($ID_S$) 224 to "provisioned" or the like. Conversely, if the provisioning process 200 failed, the provisioning service 120 may update the status 334 of the selected IC identifier ($ID_S$) 224 to "failed," "do not provision," or the like. The flow may then continue at 1004, where a next IC identifier ($ID_S$) 224 may be selected for provisioning (if any).

Figure 11:
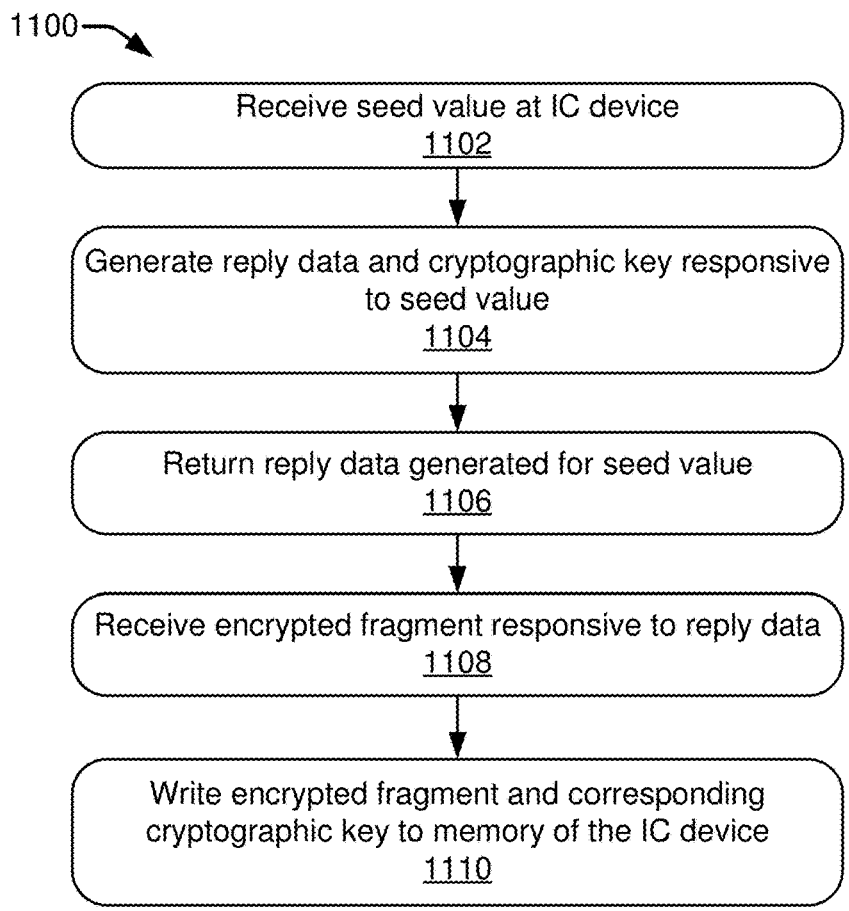
FIG. 11 illustrates an example flow diagram depicting operations for implementing secure provisioning with hardware verification at an IC device.

FIG. 11 illustrates another example of a flow diagram 1100 of a method for secure provisioning with hardware verification. The flow diagram 1100 includes blocks 1102 through 1110. In some aspects, operations of the flow diagram 1100 may be implemented by one or more of an IC device 110, first logic 112, and/or the like. The flow diagram 1100 may correspond to a secure transfer operation 210 of a provisioning process 200 (or step of the secure transfer procedure 205 of the provisioning process 200), as disclosed herein.

At 1102-1110, first logic 112 of the IC device 110 implements a secure transfer operation 210 with the provisioning service 120. The secure transfer operation 210 may be one of a plurality of secure transfer operations 210 of a provisioning process 200 (and/or one of a plurality of steps of the secure transfer procedure 205 of the provisioning process 200). The provisioning process 200 may be implemented in accordance with a function (F) 140 that is configured to be split between a first function ($F_D$) 141 and a second function ($F_S$) 142. The first logic 112 of the IC device 110 may be configured to implement the first function ($F_D$) 141, and second logic 122 of the provisioning service 120 may be configured to implement the second function ($F_S$) 142.

At 1102, the first logic 112 receives a seed value (S) 220 at the IC device 110. At 1104, the first logic 112 generates reply data ($R_D$) 238 and/or corresponding cryptographic key ($K_D$) 236 responsive to the seed value (S) 220. In some implementations, the seed value (S) 220 includes an IC identifier ($ID_S$) 224 and/or identifier seed data 344. The first logic 112 may be configured to ignore seed values (S) 220 that do not match the IC identifier (ID) 234 of the IC device 110. At 1102, the first logic 112 may determine whether to ignore the seed value (S) 220 by, inter alia, comparing the IC identifier ($ID_S$) 224 and/or identifier seed data 344 to the IC identifier (ID) 234 of the IC device 110.

At 1104, the first logic 112 may implement a first function ($F_D$) 141 to generate reply data ($R_D$) 238 and/or a cryptographic key ($K_D$) 236 responsive to the seed value (S) 220. Generating the reply data ($R_D$) 238 may include deriving IC input data ($ICID_D$) 230 from the seed value (S) 220, generating IC integrity data ($ITG_D$) 232 per the IC input data ($ICID_D$) 230 (covering a portion of the IC device 110 specified by the seed value (S) 220), retrieving an IC identifier ($ID_D$) 234 from the IC device 110, and/or the like, as disclosed herein.

In some implementations, the IC input data ($ICID_D$) 230 includes a knock code, logic sequence, or other information to selectively enable or disable designated portions of the integrated circuitry of the IC device 110. The IC integrity data ($ITG_D$) 232 may include the result of a scan chain operation. The integrity data ($ITG_D$) 232 may include the result of a scan chain operation performed within integrated circuitry designated by the IC input data ($ICID_D$) 230. The scan chain operation may include shifting input data (scan-in data) into the integrated circuitry at a scan-in pin or the like. The integrity data ($ITG_D$) 232 may include scan-out data produced responsive to shifting the scan-in data through the integrated circuitry. The scan chain states may be observed and/or captured at a scan-out pin (or other element) of the integrated circuitry. In some implementations, the IC input data ($ICID_D$) 230 derived from the seed value (S) 220 includes scan-in data to produce the integrity data ($ITG_D$) 232.

The cryptographic key ($K_D$) 236 generated at 1104 may be configured to correspond to the cryptographic key ($K_S$) 226 generated at the provisioning service 120 per the secure transfer operation 210.

At 1106, the first logic 112 returns the reply data ($R_D$) 238 to the provisioning service 120. At 1108, the first logic 112 receives an encrypted fragment 242 ({132}226) from the provisioning service 120 responsive to the reply data ($R_D$) 238. The provisioning service 120 may send the encrypted fragment 242 ({132}226) to the IC device 110 in response to validating the reply data ($R_D$) 238. At 1110, the first logic 112 writes the encrypted fragment 242 ({132}226) and corresponding cryptographic key ($K_D$) 236 into a memory of the IC device 110, such as non-volatile memory.

Figure 12:
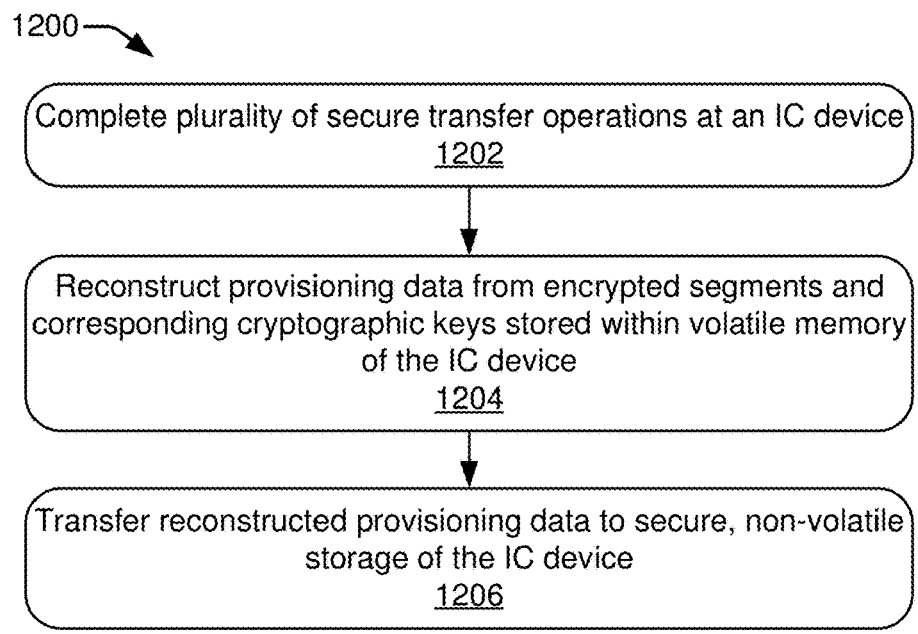
FIG. 12 illustrates another example flow diagram depicting operations for implementing secure provisioning with hardware verification at an IC device.

FIG. 12 illustrates another example of a flow diagram 1200 of a method for secure provisioning with hardware verification. The flow diagram 1200 includes blocks 1202 through 1206. In some aspects, operations of the flow diagram 1200 may be implemented by one or more of an IC device 110, first logic 112, and/or the like. The flow diagram 1200 may implement a provisioning process 200 at an IC device 110, as disclosed herein.

At 1202, first logic 112 of the IC device 110 completes a plurality of secure transfer operations 210 with the provisioning service 120. The IC device 110 may complete N secure transfer operations 210, each involving one of N fragments of the provisioning data 130 for the IC device 110. Each secure transfer operation 210 may include, receiving a seed value (S) 220 at the IC device, producing reply data ($R_D$) 238, generating a cryptographic key ($K_D$) 236, and returning the reply data ($R_D$) 238 responsive to the seed value (S) 220. The first logic 112 may implement a first function ($F_D$) 141 to generate the reply data ($R_D$) 238 and/or cryptographic key ($K_D$) 236. Each secure transfer operation 210 may further include receiving an encrypted fragment 242 ({132}226) from the provisioning service 120 responsive to the reply data ($R_D$) 238 and writing the encrypted fragment 242 ({132}226) and corresponding cryptographic key ($K_D$) 236 into a memory of the IC device 110. Completing the plurality of secure transfer operations 210 at 1202 may, therefore, include storing a plurality of encrypted fragments 242 ({132}226) and corresponding cryptographic keys ($K_D$) 236 within the memory of the IC device 110.

At 1204, the first logic 112 reconstructs the provisioning data 130 at the IC device 110. The first logic 112 may be configured to decrypt each encrypted fragment 242 ({132}226) using a corresponding cryptographic key ($K_D$) 236 and combines the decrypted fragments 132. At 1206, the first logic 112 transfers the reconstructed provisioning data 130 into secure NV storage 114 of the IC device 110. The first logic 112 may be further configured to remove the encrypted fragments 242 ({132}226) and corresponding cryptographic keys ($K_D$) 236 from the memory. In some implementations, the first logic 112 securely deletes the encrypted fragments 242 ({132}226) and corresponding cryptographic keys ($K_D$) 236.

EXAMPLES

In the following section, examples are provided.

Example 1: A method comprising: accessing provisioning data for an IC device comprising integrated circuitry, the provisioning data divided into a plurality of fragments, each fragment comprising at least a portion of the provisioning data; and implementing a provisioning process with the IC device, the provisioning process comprising transferring fragments of the provisioning data to the IC device, each fragment encrypted by a respective cryptographic key of a plurality of cryptographic keys. In Example 1, transferring a fragment of the provisioning data to the IC device may comprise sending a seed value associated with the fragment to the IC device, performing a validation operation on integrity data returned from the IC device responsive to the seed value, the integrity data configured to characterize a portion of the integrated circuitry of the IC device specified by the seed value associated with the fragment, encrypting the fragment with a cryptographic key generated for the fragment in response to validating the integrity data, and sending the encrypted fragment to the IC device.

Example 2: The method of example 1, wherein the integrity data comprises a result of a scan chain operation performed within the specified portion of the integrated circuitry of the IC device.

Example 3: The method of example 2, wherein the scan chain operation comprises shifting input data through the specified portion of the integrated circuitry of the IC device.

Example 4: The method of example 2 or 3, wherein the seed value is further configured to define at least a portion of the input data for the scan chain operation.

Example 5: The method of example 2, 3 or 4, further comprising generating seed values for respective fragments of the plurality of fragments, each seed value configured to cause the IC device to implement a scan chain operation within a different respective portion of the integrated circuitry of the IC device.

Example 6: The method of example 5, wherein each seed value is further configured to define respective input data for the scan chain operation.

Example 7: The method of any previous example, comprising: generating a first seed value for transfer of a first fragment of the provisioning data, the first seed value configured to cause the IC device to return integrity data characterizing a first portion of the integrated circuitry of the IC device; and generating a second seed value for transfer of a second fragment of the provisioning data, the second seed value configured to cause the IC device to return integrity data characterizing a second portion of the integrated circuitry of the IC device different from the first portion.

Example 8: The method of any previous example, wherein transferring the fragment of the provisioning data to the IC device further comprises: generating the cryptographic key to encrypt the fragment based, at least in part, on the seed value associated with the fragment; the IC device to generate a corresponding cryptographic key responsive to the seed value associated with the fragment and to write the encrypted fragment and the corresponding cryptographic key within a memory of the IC device.

Example 9: The method of example 8, wherein the cryptographic key and corresponding cryptographic key are symmetric keys.

Example 10: The method of example 8 or 9, wherein transferring the fragment of the provisioning data to the IC device further comprises: generating the cryptographic key to encrypt the fragment based, at least in part, on the seed value associated with the fragment and the integrity data returned from the IC device responsive to the seed value; the IC device to generate the corresponding cryptographic key based, at least in part, on the seed value associated with the fragment and the integrity data produced at the IC device responsive to the seed value.

Example 11: The method of example 8, 9 or 10, further comprising: transferring a plurality of encrypted fragments to the IC device, each encrypted fragment comprising a respective fragment of the plurality of fragments of the provisioning data encrypted by a respective cryptographic key of the plurality of cryptographic keys; and causing the IC device to reconstruct the provisioning data from the plurality of encrypted fragments and corresponding cryptographic keys stored within the memory of the IC device.

Example 12: The method of any preceding example, wherein transferring the fragment to the IC device further comprises: performing a validation operation on reply data returned from the IC device responsive to the seed value associated with the fragment, the reply data comprising the integrity data and an identifier of the IC device; and terminating the provisioning process in response to failing to validate one or more of the integrity data and the identifier of the IC device.

Example 13: The method of example 12, wherein performing the validation operation on the reply data returned from the IC device responsive to the seed value associated with the fragment comprises one or more of: comparing the integrity data to integrity verification data, the integrity verification data based, at least in part, on the seed value; and comparing the identifier returned from the IC device to an expected IC identifier.

Example 14: The method of any preceding example, further comprising: defining a function configured to be split between a first function and a second function, the IC device to implement the first function to produce integrity data responsive to seed values; and implementing the second function to validate the integrity data returned from the IC device responsive to the seed values.

Example 15: The method of example 14, wherein transferring the fragment to the IC device further comprises: implementing the second function to generate the cryptographic key for the fragment based, at least in part, on the seed value associated with the fragment; the IC device to implement the first function to generate a corresponding cryptographic key at the IC device based, at least in part, on the seed value associated with the fragment.

Example 16: The method of any preceding example, further comprising dividing the provisioning data into the plurality of fragments, each fragment of the plurality of fragments including at least a portion of a user master key of the provisioning data.

Example 17: An apparatus comprising: at least one processor; memory; and a non-transitory computer-readable medium coupled to the at least one processor having instructions stored thereon that, when executed by the at least one processor, cause the at least one processor to implement a provisioning process with an IC device, the provisioning process comprising transferring a plurality of fragments of provisioning data to the IC device, each fragment transferred in a respective secure transfer operation. In Example 17, implementing a secure transfer operation of the provisioning process comprises: sending a seed value to the IC device, the seed value associated with a fragment of the provisioning data to be transferred to the IC device in the secure transfer operation; validating integrity data returned from the IC device responsive to the seed value, the integrity data configured to characterize integrated circuitry within a portion of the IC device specified by the seed value; and sending an encrypted fragment to the IC device in response to validating the integrity data, the encrypted fragment comprising the fragment of the provisioning data encrypted by a cryptographic key generated for the secure transfer operation, such that each fragment transferred to the IC device is encrypted by a different cryptographic key, the IC device to write the encrypted fragment and a corresponding cryptographic key into a memory of the IC device.

Example 18: The apparatus of example 17, wherein implementing the secure transfer operation further comprises generating the cryptographic key based, at least in part, on the seed value and integrity data, the IC device to generate the corresponding cryptographic key based, at least in part, on the seed value and the integrity data.

Example 19: The apparatus of example 17 or 18, wherein the integrity data comprises an output of a scan chain operation performed on the integrated circuitry within the portion of the IC device specified by the seed value.

Example 20: The apparatus of example 19, wherein the seed value defines input data for the scan chain operation.

Example 21. The apparatus of any of examples 17 to 20, wherein validating the integrity data of the secure transfer operation comprises: determining integrity verification data for the secure transfer operation based, at least in part, on the seed value; and comparing the integrity verification data to the integrity data returned from the IC device responsive to the seed value.

Example 22. The apparatus of any of examples 17 to 21, wherein the provisioning process comprises transferring a plurality of encrypted fragments to the memory of the IC device, each encrypted fragment comprising a respective fragment of the provisioning data and being associated with a corresponding cryptographic key, the IC device to reconstruct the provisioning data from the plurality of encrypted fragments and corresponding cryptographic keys responsive to a message.

Example 23: A system for provisioning integrated circuit, IC, devices, comprising: a plurality of IC devices, each IC device comprising first logic coupled to integrated circuitry of the IC device; a computing device comprising a processor and memory; and a provisioning service configured for operation on the computing device and comprising second logic, the provisioning service configured to implement provisioning processes with respective IC devices of the plurality of IC devices, wherein implementing a provisioning process with an IC device comprises transferring a plurality of fragments of provisioning data to the IC device in respective secure transfer operations, wherein to perform a secure transfer operation with the IC device, the provisioning service is configured to: send a seed value associated with a fragment of the provisioning data to the IC device, utilize the second logic to perform a validation operation on integrity data returned from the IC device responsive to the seed value, the integrity data comprising a result of a scan chain operation performed by the first logic within a portion of the IC device specified by the seed value, generate a cryptographic key in response to validating the integrity data, wherein the first logic is configured to generate a corresponding cryptographic key at the IC device, and send the fragment of the provisioning data to the IC device, the fragment encrypted by the cryptographic key generated by the provisioning service, the IC device to write the encrypted fragment and corresponding cryptographic key into a memory of the IC device; and wherein the provisioning service is further configured to cause the first logic to reconstruct the provisioning data from encrypted fragments and corresponding cryptographic keys stored within the memory of the IC device in response to transferring the plurality of fragments of the provisioning data to the IC device.

Example 24: The system of example 23, wherein to perform the secure transfer operation with the IC device, the provisioning service is further configured to: utilize the second logic to generate integrity verification data based, at least in part, on the seed value associated with the fragment;

and compare the integrity verification data to the integrity data returned from the IC device.

Example 25: The system of example 23 or 24, wherein to perform the respective secure transfer operations with the IC device, the provisioning service is further configured to generate seed values for the respective secure transfer operations by use of the second logic, each seed value configured to specify a different portion of the IC device.

Example 26: The system of example 23, 24 or 25, wherein the provisioning service is further configured to maintain records pertaining to the IC devices within a data store, the records including identifiers of the IC devices and a status of the IC devices.

Example 27: The system of example 26, wherein the provisioning service is further configured to: select an IC device for a provisioning process based, at least in part, on a record associated with an identifier of the IC device; update the record to indicate that the selected IC device can be provisioned in response to completing a secure transfer operation with the selected IC device; update the record to indicate that provisioning of the IC device failed in response to failing to validate integrity data in a secure transfer operation performed with the selected IC device; and update the record to indicate that the selected IC device is provisioned in response to successful completion of the provisioning process.

Example 28: An apparatus comprising means for performing any one of the examples 1 through 16.

Example 29: A system comprising means for performing any one of the examples 1 through 16.

Example 30: A computer-readable medium having instructions stored thereon that, when executed by at least one processor, cause the at least one processor to implement any one of the examples 1 to 16. The computer-readable medium may be a non-transitory computer-readable medium, but this example is not limited to a non-transitory computer-readable medium.

Example 31: An apparatus for provisioning an integrated circuit, IC, device, comprising: at least one processor; memory; and a computer-readable medium coupled to the at least one processor having instructions stored thereon that, when executed by the at least one processor, cause the at least one processor to implement a method as defined in any one of claims 1 to 16. The computer-readable medium may be a non-transitory computer-readable medium, but this example is not limited to a non-transitory computer-readable medium.

CONCLUSION

Although implementations of techniques for, and apparatuses enabling, secure provisioning with hardware verification have been described in language specific to features and/or methods, it is to be understood that the subject of the appended claims is not necessarily limited to the specific features or methods described. Rather, the specific features and methods are disclosed as example implementations enabling secure provisioning with hardware validation.

What is claimed is:

1. A method for provisioning an integrated circuit (IC) device, the method comprising:
    accessing provisioning data for an IC device comprising integrated circuitry, the provisioning data divided into a plurality of fragments, each fragment of the plurality of fragments of the provisioning data comprising at least a portion of the provisioning data; and
    implementing a provisioning process with the IC device, the provisioning process comprising transferring one or more fragments of the plurality of fragments of the provisioning data to the IC device, each of the one or more fragments of the plurality of fragments of the provisioning data encrypted by a respective cryptographic key of a plurality of cryptographic keys, wherein transferring a single fragment of the one or more fragments of the plurality of fragments of the provisioning data to the IC device comprises:
        sending a seed value associated with the single fragment to the IC device;
        validating integrity data returned from the IC device responsive to the sending of the seed value;
        characterizing, based on the integrity data, a portion of the integrated circuitry of the IC device specified by the seed value associated with the single fragment;
        encrypting the single fragment with a cryptographic key generated for the single fragment in response to validating the integrity data; and
        sending the encrypted single fragment to the IC device.

2. The method of claim 1, wherein the integrity data comprises a result of a scan chain operation performed within the portion of the integrated circuitry of the IC device specified by the seed value.

3. The method of claim 2, wherein the scan chain operation comprises shifting input data through the specified portion of the integrated circuitry of the IC device.

4. The method of claim 3, wherein the seed value is further configured to define at least a portion of the input data for the scan chain operation.

5. The method of claim 4, further comprising generating the seed values for the one or more fragments of the plurality of fragments of the provisioning data respectively, each seed value configured to cause the IC device to implement the scan chain operation within a different respective portion of the integrated circuitry of the IC device.

6. The method of claim 5, wherein each seed value is further configured to define respective input data for the scan chain operation.

7. The method of claim 1, further comprising:
    generating a first seed value for transfer of a first fragment of the one or more fragments of the provisioning data, the first seed value configured to cause the IC device to return a first integrity data of the integrity data, wherein the first integrity data characterizes a first portion of the integrated circuitry of the IC device; and
    generating a second seed value for transfer of a second fragment of the one or more fragments of the provisioning data, the second seed value configured to cause the IC device to return a second integrity data of the integrity data, wherein the second integrity data characterizes a second portion of the integrated circuitry of the IC device different from the first portion.

8. The method of claim 1, wherein transferring the single fragment of the plurality of fragments of the provisioning data to the IC device further comprises:
    generating the cryptographic key to encrypt the single fragment based, at least in part, on the seed value associated with the single fragment;
    generating, at the IC device, a corresponding cryptographic key responsive to the seed value associated with the single fragment; and
    writing, at the IC device, the encrypted single fragment and the corresponding cryptographic key within a memory of the IC device.

9. The method of claim 8, wherein the cryptographic key and corresponding cryptographic key are symmetric keys.

10. The method of claim 8, wherein transferring the single fragment of the plurality of fragments of the provisioning data to the IC device further comprises:
generating the cryptographic key to encrypt the single fragment based, at least in part, on the seed value associated with the single fragment and the integrity data returned from the IC device responsive to the sending of the seed value; and
generating, at the IC device, the corresponding cryptographic key based, at least in part, on the seed value associated with the single fragment and the integrity data produced at the IC device responsive to the sending of the seed value.

11. The method of claim 8, further comprising:
transferring a plurality of encrypted fragments to the IC device, each encrypted fragment comprising a respective fragment of the plurality of fragments of the provisioning data encrypted by a respective cryptographic key of the plurality of cryptographic keys; and
causing the IC device to reconstruct the provisioning data from the plurality of encrypted fragments and corresponding cryptographic keys stored within the memory of the IC device.

12. The method of claim 1, wherein transferring the single fragment to the IC device further comprises:
validating reply data returned from the IC device responsive to the sending of the seed value associated with the single fragment, the reply data comprising the integrity data and an identifier of the IC device; and
terminating the provisioning process in response to failing to validate one or more of the integrity data and the identifier of the IC device.

13. The method of claim 12, wherein validating the reply data returned from the IC device responsive to the sending of the seed value associated with the single fragment comprises one or more of:
comparing the integrity data to integrity verification data, the integrity verification data based, at least in part, on the seed value; and
comparing the identifier returned from the IC device to an expected IC identifier.

14. The method of claim 1, further comprising:
defining a function configured to be split between a first function and a second function, the IC device to implement the first function to produce integrity data responsive to the sending of the seed value; and
implementing the second function to validate the integrity data returned from the IC device responsive to the sending of the seed value.

15. The method of claim 14, wherein transferring the single fragment to the IC device further comprises:
implementing the second function to generate the cryptographic key for the single fragment based, at least in part, on the seed value associated with the single fragment; and
implementing the first function to generate a corresponding cryptographic key at the IC device based, at least in part, on the seed value associated with the single fragment.

16. The method of claim 1, further comprising dividing the provisioning data into the plurality of fragments, each fragment of the plurality of fragments including at least a portion of a user master key of the provisioning data.

17. An apparatus for provisioning an integrated circuit (IC) device, comprising:
at least one processor;
a memory; and
a non-transitory computer-readable medium coupled to the at least one processor having instructions stored thereon that, when executed by the at least one processor, cause the at least one processor to implement a provisioning process with an IC device, the provisioning process comprising transferring a plurality of fragments of provisioning data to the IC device, each single fragment of the plurality of fragments of the provisioning data transferred in a respective secure transfer operation, wherein implementing a secure transfer operation of the provisioning process comprises:
sending a seed value to the IC device, the seed value associated with a single fragment of the plurality of fragments of the provisioning data to be transferred to the IC device in the secure transfer operation;
validating integrity data returned from the IC device responsive to the sending of the seed value, the integrity data configured to characterize integrated circuitry within a portion of the IC device specified by the seed value; and
sending an encrypted fragment to the IC device in response to the validating of the integrity data, the encrypted fragment comprising the single fragment of the plurality of fragments of the provisioning data encrypted by a cryptographic key generated for the secure transfer operation, such that each single fragment transferred to the IC device is encrypted by a different cryptographic key, the IC device to write the encrypted fragment and a corresponding cryptographic key into a memory of the IC device.

18. The apparatus of claim 17, wherein implementing the secure transfer operation further comprises generating the cryptographic key based, at least in part, on the seed value and integrity data, the IC device to generate the corresponding cryptographic key based, at least in part, on the seed value and the integrity data.

19. The apparatus of claim 17, wherein the integrity data comprises an output of a scan chain operation performed on the integrated circuitry within the portion of the IC device specified by the seed value.

20. The apparatus of claim 19, wherein the seed value defines input data for the scan chain operation.

21. The apparatus of claim 19, wherein validating the integrity data of the secure transfer operation comprises:
determining integrity verification data for the secure transfer operation based, at least in part, on the seed value; and
comparing the integrity verification data to the integrity data returned from the IC device responsive to the sending of the seed value.

22. The apparatus of claim 17, wherein the provisioning process comprises transferring a plurality of encrypted fragments to the memory of the IC device, each encrypted fragment comprising a respective fragment of the provisioning data and being associated with a corresponding cryptographic key, the IC device to reconstruct the provisioning data from the plurality of encrypted fragments and corresponding cryptographic keys responsive to a message.

23. A system for provisioning integrated circuit (IC) devices, comprising:
a plurality of IC devices, each IC device comprising first logic coupled to integrated circuitry of the IC device;
a computing device comprising a processor and memory; and a provisioning service configured for operation on the computing device and comprising second logic, the provisioning service configured to implement provisioning processes with respective IC devices of the plurality of IC devices, wherein implementing a provisioning process with an IC device comprises transferring a plurality of fragments of provisioning data to the IC device in respective secure transfer operations, wherein to perform a secure transfer operation with the IC device, the provisioning service is configured to:
  send a seed value associated with a single fragment of the plurality of fragments of the provisioning data to the IC device,
  utilize the second logic to validate integrity data returned from the IC device responsive to the sending of the seed value, the integrity data comprising a result of a scan chain operation performed by the first logic within a portion of the IC device specified by the seed value,
  generate a cryptographic key in response to the validating of the integrity data, wherein the first logic is configured to generate a corresponding cryptographic key at the IC device, and
  send the single fragment of the plurality of fragments of the provisioning data to the IC device, the single fragment encrypted by the cryptographic key generated by the provisioning service, the IC device to write the encrypted single fragment and corresponding cryptographic key into a memory of the IC device; and
wherein the provisioning service is further configured to cause the first logic to reconstruct the provisioning data from encrypted fragments and corresponding cryptographic keys stored within the memory of the IC device in response to transferring the plurality of fragments of the provisioning data to the IC device.

24. The system of claim 23, wherein to perform the secure transfer operation with the IC device, the provisioning service is further configured to:
  utilize the second logic to generate integrity verification data based, at least in part, on the seed value associated with the single fragment; and
  compare the integrity verification data to the integrity data returned from the IC device.

25. The system of claim 23, wherein to perform the respective secure transfer operations with the IC device, the provisioning service is further configured to generate seed values for the respective secure transfer operations by use of the second logic, each seed value configured to specify a different portion of the IC device.

26. The system of claim 23, wherein the provisioning service is further configured to maintain records pertaining to the IC devices within a data store, the records including identifiers of the IC devices and a status of the IC devices.

27. The system of claim 26, wherein the provisioning service is further configured to:
  select an IC device for a provisioning process based, at least in part, on a record associated with an identifier of the IC device;
  update the record to indicate that the selected IC device can be provisioned in response to completing a secure transfer operation with the selected IC device;
  update the record to indicate that provisioning of the IC device failed in response to failing to validate integrity data in a secure transfer operation performed with the selected IC device; and
  update the record to indicate that the selected IC device is provisioned in response to successful completion of the provisioning process.

\* \* \* \* \*